(12) United States Patent
Tateishi et al.

(10) Patent No.: US 7,132,012 B2
(45) Date of Patent: Nov. 7, 2006

(54) PHTHALOCYANINE COMPOUND, INK, INK JET RECORDING METHOD AND IMAGE FORMING METHOD

(75) Inventors: Keiichi Tateishi, Minami-Ashigara (JP); Yoshiharu Yabuki, Minami-Ashigara (JP)

(73) Assignee: Fuji Photo Film Co., Ltd., Minami-Ashigara-shi (JP)

( * ) Notice: Subject to any disclaimer, the term of this patent is extended or adjusted under 35 U.S.C. 154(b) by 0 days.

(21) Appl. No.: 11/182,003

(22) Filed: Jul. 15, 2005

(65) Prior Publication Data

US 2006/0017792 A1    Jan. 26, 2006

(30) Foreign Application Priority Data

Jul. 15, 2004   (JP) .............................. 2004-208192

(51) Int. Cl.
  *C09D 11/00* (2006.01)
  *C09D 11/02* (2006.01)
(52) U.S. Cl. ................. 106/31.46; 106/31.47; 106/31.49; 106/31.76; 106/31.77; 106/31.78
(58) Field of Classification Search ............ 106/31.49, 106/31.47, 31.46, 31.76, 31.77, 31.78; 540/124, 540/125; 347/100
See application file for complete search history.

(56) References Cited

U.S. PATENT DOCUMENTS

| | | | | |
|---|---|---|---|---|
| 4,657,554 A | * | 4/1987 | Reinert et al. ............. | 540/123 |
| 5,322,760 A | * | 6/1994 | Itoh et al. .................. | 540/124 |
| 6,238,827 B1 | * | 5/2001 | Nakazawa et al. ............. | 430/7 |
| 6,384,027 B1 | * | 5/2002 | Cook ........................ | 540/124 |
| 2005/0132927 A1 | * | 6/2005 | Tateishi et al. .......... | 106/31.47 |

FOREIGN PATENT DOCUMENTS

| | | |
|---|---|---|
| JP | 7-138511 | 5/1995 |
| JP | 2000-303009 | 10/2000 |
| JP | 2000-313837 | 11/2000 |
| JP | 2003-34758 | 2/2003 |
| JP | 2004-75986 | 3/2004 |
| WO | 99/13009 | 3/1999 |
| WO | 99/67334 | 12/1999 |
| WO | 00/08102 | 2/2000 |
| WO | 00/08103 | 2/2000 |
| WO | 02/34844 A1 | 5/2002 |

* cited by examiner

*Primary Examiner*—Helene Klemanski
(74) *Attorney, Agent, or Firm*—Buchanan Ingersoll & Rooney PC

(57) ABSTRACT

An ink comprising a compound represented by formula (I) as defined in the specification Formula (I)

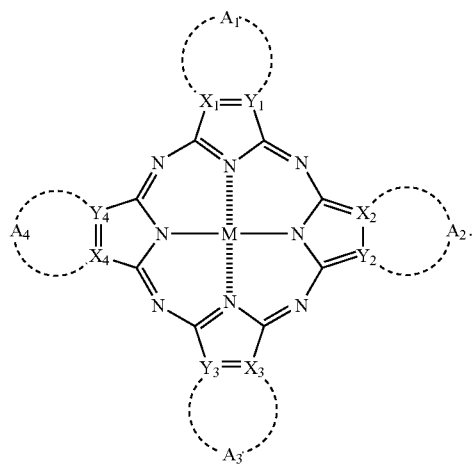

10 Claims, No Drawings

PHTHALOCYANINE COMPOUND, INK, INK JET RECORDING METHOD AND IMAGE FORMING METHOD

BACKGROUND OF THE INVENTION

1. Field of the Invention

The present invention relates to a novel substituted phthalocyanine compound improved in solubility, and excellent in hue and fastness properties and a mixture thereof, an ink containing the phthalocyanine compound (mixture), an ink for ink jet recording (particularly, a water soluble ink), a method for improving the long-term storage stability of an ink, an ink jet recording method, an image forming method, and a method for improving the ozone gas resistance of the formed colored image material.

2. Description of the Related Art

In recent years, as image recording materials, particularly, materials for forming color images have been mainstream. Specifically, recording materials of an ink jet system, recording materials of a heat sensitive transfer system, recording materials of an electrophotographic system, transfer type silver halide light-sensitive materials, printing inks, recording pens, and the like have found widespread use. Whereas, in image pickup devices such as CCDs for photographing equipment, and in LCDs and PDPs for displays, color filters are used for recording/reproducing color images.

For these color image recording materials and color filters, (dyes and pigments) of three primary colors of a so-called additive color mixing process or subtractive color mixing process have been used in order to reproduce or record full-color images. However, in actuality, there is no fast coloring matter having the absorption characteristics capable of realizing a preferred color reproduction region, and resisting various use conditions. Thus, the improvement thereof has been strongly desired.

The ink jet recording method has rapidly come into widespread use, and has been under further development because of the low material cost, the capability of high-speed recording, less noise for recording, and further, easy color recording.

The ink jet recording method includes a continuous method in which droplets are continuously flown, and an on-demand method in which droplets are flown according to image information signals. The ejecting methods include a method in which droplets are applied with a pressure by a piezoelectric element, and ejected, and a method in which bubbles are formed in an ink by heat, so that droplets are ejected, a method utilizing an ultrasonic wave, or a method in which droplets are sucked and ejected by an electrostatic force.

Whereas, as the ink jet recording ink, a water base ink, an oil base ink, or a solid (molten type) ink is used.

The coloring matters for use in such al ink jet recording ink are required to be excellent in solubility or dispersibility in a solvent, to be capable of high density recording, to be good in, to be fast to light, heat, and active gases in the environment (oxidizing gases such as NOx and ozone, and in addition, SOx, and the like), to be excellent in fastness properties to water and chemicals, to be less likely to spread on an image-receiving material because of its good fixability, to be excellent in storability as an ink, to have no toxicity, to have high purity, and further to be available at low cost.

In a color copier or a color laser printer utilizing an electrophotographic method, generally, a toner obtained by dispersing a colorant in resin particles has been widely used.

As the performances required of a color toner, mention may be made of the absorption characteristics capable of realizing a preferred color reproduction region, particularly, high transmittance (transparency) which matters in use for an overhead projector (below, OHP), and various fastness properties under the environmental conditions in which it is used. The toners obtained by dispersing a pigment in particles as a colorant are disclosed in JP-A-62-157051, JP-A-62-255956, and JP-A-6-118715. However, these toners are excellent in light resistance, but are insoluble, and hence tend to agglomerate, unfavorably resulting in a reduction of the transparency of the colored layer and a change in hue of the transparent color. On the other hand, the toners using a dye as a colorant are disclosed in JP-A-3-276161, JP-A-7-209912, and JP-A-8-123085. However, these toners are inversely high in transparency, and shows no change in hue. However, they have a problem in terms of the light resistance.

Heat sensitive transfer recording has the following advantages: the device is compact, and capable of being reduced in cost; the operation and the maintenance are easy; further, running cost is low; and the like. As the performances required of the coloring matter for use in heat sensitive transfer recording, mention may be made of the absorption characteristics capable of realizing a preferred color reproduction region, the compatibility between the thermal transferability and the fixability after transfer, the thermal stability, various fastness properties of the resulting image. However, no conventionally known coloring matter satisfies all these performances. For example, for the purpose of improving the fixability and the light resistance, the heat sensitive transfer recording material and the image forming method, wherein a thermally diffusible coloring matter has been previously added in the image-receiving material, and is allowed to chelate by transition metal ions are proposed in JP-A-60-2398, and the like. However, the absorption characteristics of the chelate coloring matter formed are at an unsatisfactory level, and use of the transition metal also causes environmental problems.

A color filter is required to have high transparency. Therefore, a method referred to as a dyeing method for coloring using a dye has been performed. For example, a dyeable photoresist is subjected to pattern exposure and development, thereby to form a pattern. Then, dyeing is carried out with a dye of the filter color. This method is sequentially repeated for all filter colors. As a result, it is possible to manufacture a color filter. It is also possible to manufacture a color filter with die methods using a positive type resist described in U.S. Pat. No. 4,808,501, JP-A-6-35182, and the like, other than the dyeing method. With these methods, a dye is used, and hence the transmittance is high and the optical characteristics of the color filter are excellent. However, there are limitations on the light resistance, the heat resistance, and the like. Thus, there has been a demand for a coloring matter excellent in various resistances, and high in transparency. On the other hand, a method using an organic pigment excellent in light resistance and heat resistance in place of a dye is widely known. However, with a color filter using a pigment, it has been difficult to obtain such optical characteristics as those of a dye.

The coloring matters for use in the respective applications are required to have in common the following properties. Namely, the absorption characteristics in terms of color reproduction are preferable; fastness properties under the environmental conditions in which they are used, such as the light resistance, heat resistance, moisture resistance, the resistance to an oxidizing gas such as ozone, fastness properties to chemicals such as sulfurous acid gas are good; the molar absorption coefficient is large; and other properties.

However, it is very difficult to seek a coloring matter satisfying these requirements at a high level. Particularly, it is strongly demanded for the coloring matter to have a good cyan hue, to be fast to light, humidity, and heat, and especially, to be fast to an oxidizing gas such as ozone in an environment for printing on an image-receiving material having an ink receptive layer containing porous white inorganic pigment particles. In addition, the compatibility with the ink storage stability is strongly demanded as described later.

The coloring matter skeletons of cyan for use in such ink jet recording ink include those of a phthalocyanine type, anthraquinone type, triphenylmethane type, and other types. A phthalocyanine compound excellent in hue and light fastness property is used. However, it does not have sufficient fastness properties to oxidizing gases, particularly, ozone, and cannot satisfy even the ink stability. This created a demand for the improvement thereof.

As typical phthalocyanine coloring matter most widely reported and used, mention may be made of the phthalocyanine derivatives classified into the following [1] to [6].

[1] Copper phthalocyanine type coloring matters such as Direct Blue 86 or Direct Blue 87 [e.g., a mixture of $Cu\text{-}Pc\text{-}(SO_3Na)_m$: m=1 to 4]. Incidentally, the term "Pc" in the formula and hereinafter used in this specification denotes the phthalocyanine skeleton.

[2] Direct Blue 199, and the phthalocyanine type coloring matters [e.g., a mixture of $Cu\text{-}Pc\text{-}(SO_3Na)_m(SO_2NH_2)_n$: m+n=1 to 4] described in JP-A-62-19023, JP-A-63-28690, JP-A-63-306075, JP-A-63-306076, JP-A-2-131983, JP-A-3-122171, JP-A-3-200883, JP-A-7-138511, and the like.

[3] Phthalocyanine type coloring matters [e.g., $Cu\text{-}Pc\text{-}(CO_2H)_m(CONR_1R_2)_n$: m+n=an integer of 0 to 4] described in JP-A-63-210175, JP-A-63-37176, JP-A-63-304071, JP-A-5171085, WO 00/08102, and the like.

[4] Phthalocyanine type coloring matter [e.g., $Cu\text{-}Pc\text{-}(SO_3H)_m(SO_2NR_1R_2)_n$: m+n=an integer of 0 to 4, and m≠0] described in JP-A-59-30874, JP-A-1-126381, JP-A-1-190770, JP-A-6-16982, JP-A-7-82499, JP-A-8-34942, JP-A-8-60053, JP-A-8-113745, JP-A-8-310116, JP-A-10-140063, JP-A-10-298463, JP-A-11-29729, JP-A-11-320921, and the like, EP 173476A2, EP 468649A1, EP 559309A2, EP 596383A1, DE3411476, U.S. Pat. No. 6,086,955, WO 99/13009, GB 2341868A, and the like.

[5] Phthalocyanine type coloring matters [e.g., $Cu\text{-}Pc\text{-}(SO_3H)_1(SO_2NH_2)_m(SO_2NR_1R_2)_n$: 1+m+n=an integer of 0 to 4] described in JP-A-60-208365, JP-A-61-2772, JP-A-6-57653, JP-A-8-60052, JP-A-8-295819, JP-A-10-130517, JP-A-11-72614, JP-T-11-515047 (the term "JP-T" as used herein means a published Japanese translation of a PCT patent application), JP-T-11-515048, and the like, EP 196901A2, WO 95/29208, WO 98/49239, WO 98/49240, WO 99/50363, WO 99/67334, and the like.

[6] Phthalocyanine type coloring matters [e.g., $Cu\text{-}Pc\text{-}(SO_2NR_1R_2)_n$: n=an integer of 1 to 5] described in JP-A-59-22967, JP-A-61-185576, JP-A-1-95093, JP-A-3-195783, EP 649881A1, WO 00/08101, WO 00/08103, and the like.

Currently commonly and widely used phthalocyanine dyes typified by Direct Blue 87 or Direct Blue 199, and also described in the foregoing publications, and the like feature more excellent light resistance as compared with Magenta and Yellow. However, they tend to cause a problem due to the solubility of the dyes. For example, often, dissolution failure occurs during manufacturing, resulting in manufacturing troubles, or insoluble matters precipitate during product storage or in use, causing problems. Particularly, in the ink jet recording previously stated, there are the following problems: the inferior ink storage stability as in precipitation of a dye or the like entails clogging of a printing head or an ejection failure, which causes noticeable degradation of a printed image; and other problems.

Further, fading also tends to occur due to oxidizing gases such as ozone often cited as an environmental problem recently, resulting in a large reduction of the printing density. This has become a large problem.

Currently, ink jet recording has rapidly expanded the range of field of use. When it is used more and more widely in ordinary households, SOHOs, commercial fields, and the like, it is exposed to various working conditions and use environments. As a result, more often, troubles of the ink storage stability due to the dissolution failure of a cyan dye occurs, or the printed image is exposed to light or active gases in an environment, unfavorably resulting in fading thereof. Therefore, there has been an increasingly strong demand for a coloring matter and an ink composition each having a particularly good hue, excellent in light fastness property and active gases in an environment (such as SOx, other than oxidizing gases such as NOx and ozone), and having high solubility.

Until now, the phthalocyanine coloring matters imparted with the ozone gas resistance are disclosed in respective publications such as JP-A-3-103484, JP-A-4-39365, and JP-A-2000-303009. However, in actuality, all fall short of having both hue and the fastness properties to light and oxidizing gases. Particularly, for the ozone gas resistance, there has been no example, so far, of the report regarding the properties of the coloring matter serving as a guide. Further, although there has been a report of use of the phthalocyanine type coloring matters described in EP 1243626A1, EP 1243627A1, and the like, the density dependence of the fastness properties is large (implementation of fastness only at a high density portion), and light is reflected by occurrence of a bronzing phenomenon at the high density portion. Accordingly, not only the optical density of the recorded image is reduced, but also the hue of the recorded image becomes largely different from the desired one. Thus, in actuality, the coloring matters fall short of the level capable of satisfying the required performances.

Whereas, when the azaphthalocyanine compounds described in WO 02/34844 are used, when each is used as an ink (particularly, a cyan dye), the azaphthalocyanine compounds described above remarkably show a short wavelength shift in hue. As a result, they are not at such a level as to be able to satisfy the absorption characteristics capable of realizing a preferred color reproduction region. Further, the change of the central metal of the metal phthalocyanine compound (e.g., Ni) has some effect on the improvement of the hue (long wavelength shift). This, however, results in the level which cannot be said to be the absorption characteristics capable of realizing a preferred color reproduction region, and is attended with further problems such as a problem of material safety due to the use of Ni.

On the other hand, as an ink of ink jet recording method (hereinafter, the latter is also referred to as an ink jet recording ink), a water base ink is mainly used. The water base ink is basically composed of a coloring matter, water, and an organic solvent, and contains water as a main solvent from the attention to the odor, the human body, and the safety to the surrounding environment. Whereas, as the coloring matter, generally, a water soluble dye such as an acidic dye, a basic dye, a reactive dye, or a direct dye is used.

For such ink jet recording inks (and dye), mention may be made of the following various required characteristics.

Namely, (1) The physical property values such as viscosity, surface tension, specific electric conductivity, density and pH of the ink are proper;

(2) The long-term storage stability of the ink is good;

(3) The dissolved component has high solubility stability, and hence does not cause clogging of the nozzle;

(4) The rapid drying properties on a recording material is good;

(5) The recorded image is sharp, and the light resistance, and the water resistance are good;

and the like.

However, a conventional ink falls short of satisfying all these characteristics.

In the case of a commonly used water base ink, a water soluble dye is used. For this reason, when water splashes on the recorded image, the dye dissolves out, so that the recorded image may become blurred, or vanish. As in this and other cases, there is a large problem in terms of the water resistance. Particularly, the clogging of the head in the ink jet recording method is a problem. Currently, various studies have been made aiming at the ink storage stability:

For example, studies have been made on the methods in which to an ink using a pigment or an oil soluble dye as a coloring matter, or to a water base ink using a water soluble dye, an organic solvent, a resin, or the like is added. However, the ink using a pigment is unfavorably bad in dispersion stability, inferior in storage stability, causes clogging of the nozzle, and causes other problems. Whereas, for the ink using an oil soluble dye, an organic solvent is used. Therefore, there have been problems in terms of the environmental health such as odor, or unfavorably, the reduction of the image quality have been caused because of a large spread of the ink, and other problems have been caused. Whereas, also in the case of the ink to which additives were added, there has been a problem such as inferior storage stability, clogging of the nozzle, or poor flying of an ink because of the increase in viscosity of the ink.

The disclosures in JP-A-2000-303014, JP-A-2000-313837, and the like relate to a phthalocyanine pigment improved in dispersion stability and showing excellent storage stability. However, all fall short of having both hue and the fastness properties to light and oxidizing gases, thus not leading to the provision of products well satisfying market's requirements.

Recently, JP-A-6-340835, JP-A-12-239584, WO 00/08102, and the like describe an ink using a water base dispersion containing a polyester resin colored by a dye or a pigment as a dispersoid. However, even by using this method, the foregoing problems have not been yet solved well. On the other hand, also for the dye, it is described that the compatibility with the resin directly involved in the reduction of the image density, the reduction of the water resistance, the storage stability, clogging of the nozzle, and the like, and the control of the average particle diameter of colored resin fine particles are problems.

Whereas, generally, for the phthalocyanine compound (mixture), as described in WO 00/17275, WO 00/08103, WO 00/08101, WO 98/41853, JP-A-10-36471, and the like, when an unsubstituted phthalocyanine compound is sulfonated, and used as a water soluble dye, it is used as it is in the form of an alkali metal salt, such as a sodium salt, of the sulfonated compound. When it is derived to an oil soluble dye, the one synthesized through the sulfonyl chloridation and amidating reaction after sulfonation can be used.

For a conventionally used aqueous cyan ink for ink jet, a water soluble dye such as a copper phthalocyanine compound having a sulfo group or a salt of a sulfo group as a substituent obtained by sulfonating a copper phthalocyanine compound is used.

In this case, sulfonation may take place at any site of the phthalocyanine nucleus, and furthermore, the number of sites to be sulfonated is difficult to control. Accordingly, when a sulfo group is introduced under such reaction conditions, the site and the number of sulfo groups introduced into the product cannot be specified, and a mixture of those differing in the number of substituents or in the substitution site is inevitably produced.

This results in mixing of a component low in solubility, for example, a component in which sulfonation has occurred only at zero or one site relative to the phthalocyanine nucleus into the mixture. As a result, the solubility tend to be insufficient for use as a water soluble dye. This has caused a demand for the improvement of the solubility.

On the other hand, as an oil soluble dye, a phthalocyanine compound having an ammonium salt of sulfonic acid containing an ion pair of a sulfamoyl group and/or a sulfo group is known. The phthalocyanine compound is manufactured in the following manner. A metal phthalocyanine compound is chlorosulfonated with chlorosulfonic acid. Then, the chlorosulfonated form of the phthalocyanine compound taken and obtained and an amine compound are allowed to react with each other (e.g., RIRONN SEIZOU SENRYOU KAGAKU written by Yutaka Hosoda, fifth edition, issued on Jul. 15, 1968, published by GIHODO Publisher's Co., pages 798 to 799). With this manufacturing method, in the reaction of the chlorosulfonyl form of a phthalocyanine compound and an amine compound, a sulfonic acid amide group is formed. In addition, chlorosulfonyl groups are partially hydrolyzed, and remain as sulfo groups, and a phthalocyanine compound containing an ammonium salt of sulfonic acid in which ion pairs of sulfo groups and an amine compound have been formed.

When the phthalocyanine compound thus obtained is used as a coloring matter for ink jet recording, the solubility of the ink in a solvent is low, which unfavorably makes it impossible to prepare an ink, nor to manufacture an ink with a necessary density, and causes other problems. Further, under the effects of the remaining sulfo groups, blur may occur upon printing on ordinary paper, or the water resistance of the recorded image may be deteriorated, and undesirable effects may be imposed on other various characteristics.

Thus, the various characteristics of the ink, particularly the ink for use in the ink jet recording method largely depend upon the characteristics inherent in the coloring matter. Therefore, it is very important to select a coloring matter satisfying the foregoing various conditions.

JP-A-2003-34758 discloses a phthalocyanine compound (mixture) having a pyridine ring, a pyrazine ring, and a benzene ring. There is a demand for a phthalocyanine compound with limited substituents and substitution sites, and further improved in fastness properties (particularly, ozone resistance).

JP-A-2004-75986 describes a phthalocyanine compound having fastness properties to light, heat, humidity, and active gases in an environment. However, the compound has an ionic hydrophilic group, and hence it is low in solubility in an oil base dye, and inferior in dispersibility. Further, blur occurs upon printing on ordinary paper, or the water resistance of the recorded image is deteriorated. These result in a demand for further improvements thereof.

SUMMARY OF THE INVENTION

The present invention aims to solve the problems in the related art, and to achieve the following objects. Namely, the invention has the following objects:

(1) To provide a novel ink having absorption characteristics excellent in color reproduction, and having sufficient fastness properties to light, heat, humidity, and the active gases in an environment;

(2) To provide various inks having, especially, the characteristics described in (1), and for use as inks for printing of ink jet recording or the like;

(3) To further provide an ink jet recording ink which uses the substituted phthalocyanine compound (mixture), and thereby has a good hue, and high fastness properties to light and the active gases in an environment, particularly, an ozone gas, and can form an image excellent in water resistance, and which is particularly excellent in the long-term storage stability of the ink, an ink jet recording method, and a method for improving the storage stability of the formed image; and (4) To provide a method for making an image fast in which the ozone gas fading resistance of the image recorded product is improved by utilizing the ink jet recording method.

The present inventors closely studied a phthalocyanine compound having good hue and solubility, and high long-term storage stability as an ink, and having high light fastness property and gas fastness property (particularly, an ozone gas). As a result, they found that the foregoing problems can be solved by a phthalocyanine compound (and a mixture thereof) of a specific structure not known in the related art, leading to the completion of the invention. The means for solving the problems are as follows.

Namely, (1) An ink comprising a phthalocyanine compound represented by formula (I):

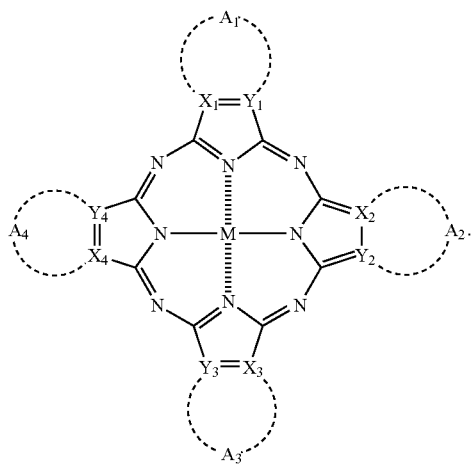

Formula (I)

where $X_1$ to $X_4$ and $Y_1$ to $Y_4$ each independently represents a carbon atom or a nitrogen atom; $A_1$ to $A_4$ each independently represents an atomic group necessary for forming an aromatic ring or a heterocyclic ring with $X_1$ to $X_4$ and $Y_1$ to $Y_4$, with the proviso that all of four rings containing each of A, X and Y are not aromatic rings at the same time; whereas, when all of the four rings containing each of A, X and Y are pyridine rings at the same time, a pyridine ring in which any one of atoms adjacent to each of X and Y in the pyridine ring is a nitrogen atom is excluded; whereas, when all of the four rings containing each of A, X and Y are pyrazine rings at the same time, a pyrazine ring in which both of atoms adjacent to each of X and Y in the pyrazine ring are nitrogen atoms is excluded; whereas, $A_1$ to $A_4$ each may also have a substituent, with the proviso that at least one of $A_1$ to $A_4$ or at least one of the substituents of $A_1$ to $A_4$ has a substituent with two or more carbon atoms, and the total sum of carbon atoms of the substituents of $A_1$ to $A_4$ is 8 or more, and an ionic hydrophilic group is not contained in a molecule; and M represents a hydrogen atom, a metallic element, a metal oxide, a metal hydroxide or a metal halide.

(2) The ink as described in (1) above, wherein the phthalocyanine compound represented by formula (I) is a phthalocyanine compound represented by formula (II):

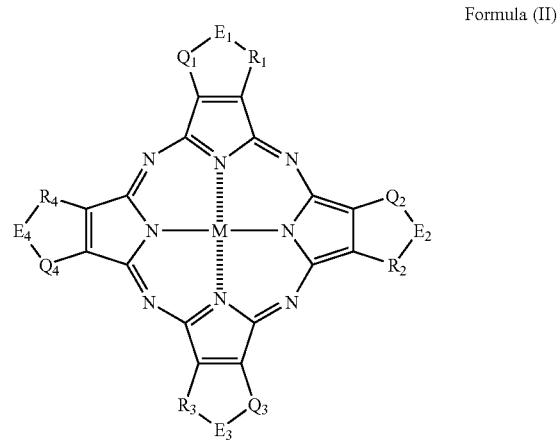

Formula (II)

wherein $Q_1$ to $Q_4$ and $R_1$ to $R_4$ each independently represents a carbon atom, a nitrogen atom, a sulfur atom, an oxygen atom or a phosphorus atom;

$E_1$ to $E_4$ each independently represents an atomic group necessary for forming an aromatic ring or a heterocyclic ring (which may further form a condensed ring with other rings) with $Q_1$ to $Q_4$ and $R_1$ to $R_4$, with the proviso that all of four rings containing each of E, Q, and R are not aromatic rings at the same time; whereas, when all of the four rings are pyridine rings at the same time, a pyridine ring in which any one of each of Q and R is a nitrogen atom is excluded; whereas, a case where all of the four rings are pyrazine rings at the same time is excluded; whereas, $E_1$ to $E_4$ each may also have a substituent, with the proviso that at least one of $E_1$ to $E_4$ or at least one of the substituents of $E_1$ to $E_4$ has a substituent with two or more carbon atoms, and the total sum of carbon atoms of the substituents of $E_1$ to $E_4$ is 8 or more, and an ionic hydrophilic group is not contained in a molecule; and M is defined as the same as in formula (I).

(3) The ink as described in (1) or (2) above, wherein the phthalocyanine compound represented by formula (II) is a phthalocyanine compound represented by formula (III):

Formula (III)

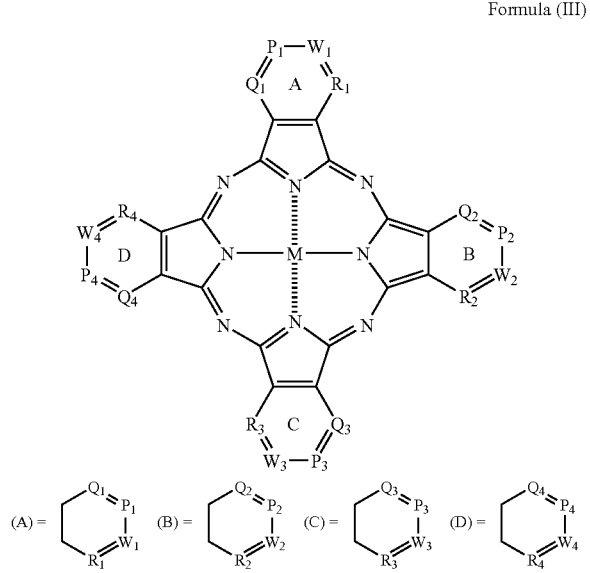

wherein $Q_1$ to $Q_4$, $P_1$ to $P_4$, $W_1$ to $W_4$ and $R_1$ to $R_4$ each independently represents (=C($J_1$)- and or —N=), (=C($J_2$)- and or —N=), (=C($J_3$)- and or —N=) or (=C($J_4$)- and or —N=);

$J_1$ to $J_4$ each independently represents a hydrogen atom or a substituent, with the proviso that all of rings {ring A: (A), ring B: (B), ring C: (C), and ring D: (D)} containing ($Q_1$, $P_1$, $W_1$ and $R_1$), ($Q_2$, $P_2$, $W_2$ and $R_2$), ($Q_3$, $P_3$, $W_3$ and $R_3$) and ($Q_4$, $P_4$, $W_4$ and $R_4$), respectively, are not aromatic rings at the same time; whereas, when all of the four rings are pyridine rings at the same time, a pyridine ring in which any one of $Q_1$ and $R_1$ is a nitrogen atom, a pyridine ring in which any one of $Q_2$ and $R_2$ is a nitrogen atom, a pyridine ring in which any one of $Q_3$ and $R_3$ is a nitrogen atom and a pyridine ring in which any one of $Q_4$ and $R_4$ is a nitrogen atom are excluded; whereas, a case where all of the four rings are pyrazine rings at the same time is excluded; whereas, when $J_1$ to $J_4$ each represents a substituent, $J_1$ to $J_4$ may each further have a substituent, with proviso that at least one of $J_1$ to $J_4$ or at least one of the substituents which $J_1$ to $J_4$ have, has a substituent with two or more carbon atoms, and the total sum of the carbon atoms of the substituents of $J_1$ to $J_4$ is 8 or more, and an ionic hydrophilic group is not contained in a molecule; and M is defined as the same as in formula (II).

(4) The ink as described in any of (1) to (3) above, wherein in the phthalocyanine compound represented by formula (III), at least one heterocyclic ring of the four rings (A), (B), (C) and (D) is represented by formula (IV):

Formula (IV)

wherein K represents an atomic group necessary for forming a 6-membered nitrogen-containing heterocyclic ring; and U represents a bonding site with a phthalocyanine skeleton.

(5) The ink as described in (3) or (4) above, wherein in the phthalocyanine compound represented by formula (III), at least one of the four rings (A), (B), (C) and (D) represents an aromatic ring, and at least one of the four rings (A), (B), (C) and (D) represents a pyridine ring or a pyrazine ring.

(6) The ink as described in any of (3) to (5) above, wherein in the phthalocyanine compound represented by formula (III), the at least one aromatic ring of the four rings (A), (B), (C) and (D) is represented by formula (V):

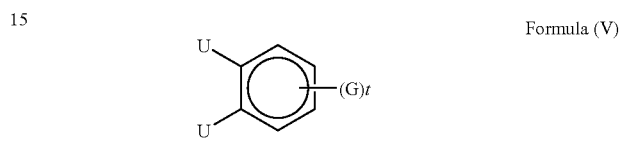

Formula (V)

wherein G represents —SO-$Z_1$, —$SO_2$-$Z_1$, —$SO_2$N$Z_1Z_2$, —CON$Z_1Z_2$, —$CO_2Z_1$, or —CO$Z_1$;

t represents an integer of 0 to 4;

$Z_1$ may be the same or different, and represents a substituted or unsubstituted alkyl group having a total of 1 to 20 carbon atoms, a substituted or unsubstituted cycloalkyl group having a total of 3 to 20 carbon atoms, a substituted or unsubstituted alkenyl group having a total of 2 to 20 carbon atoms, a substituted or unsubstituted alkynyl group having a total of 2 to 12 carbon atoms, a substituted or unsubstituted aralkyl group having a total of 7 to 20 carbon atoms, a substituted or unsubstituted aryl group having a total of 6 to 20 carbon atoms, or a substituted or unsubstituted heterocyclic group having a total of 4 to 20 carbon atoms;

$Z_2$ may be the same or different, and represents a hydrogen atom, a substituted or unsubstituted alkyl group having a total of 1 to 20 carbon atoms, a substituted or unsubstituted cycloalkyl group having a total of 3 to 20 carbon atoms, a substituted or unsubstituted alkenyl group having a total of 2 to 20 carbon atoms, a substituted or unsubstituted alkynyl group having a total of 2 to 12 carbon atoms, a substituted or unsubstituted aralkyl group having a total of 7 to 20 carbon atoms, a substituted or unsubstituted aryl group having a total of 6 to 20 carbon atoms or a substituted or unsubstituted heterocyclic group having a total of 4 to 20 carbon atoms; and U represents a bonding site with a phthalocyanine skeleton.

(7) The ink as described in any of (3) to (6) above, wherein the at least one aromatic ring of the four rings (A), (B), (C) and (D) is represented by formula (V-1):

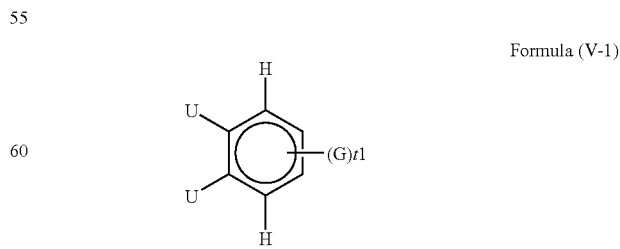

Formula (V-1)

wherein G is defined as the same as in formula (V);

t1 represents an integer of 0 to 2; and

U represents a bonding site with a phthalocyanine skeleton.

(8) The ink as described in any of (1) to (7) above, wherein the ink is an ink jet recording ink.

(9) An ink jet recording method, which comprises forming an image with an ink jet recording ink as described in (8) above on an image-receiving material comprising a support and an ink receptive layer containing white inorganic pigment particles.

(10) An image forming method, which comprises forming an image by utilizing an ink as described in any of (1) to (7) above or an ink jet recording ink as described in (8) above.

(11) A phthalocyanine compound represented by formula (III):

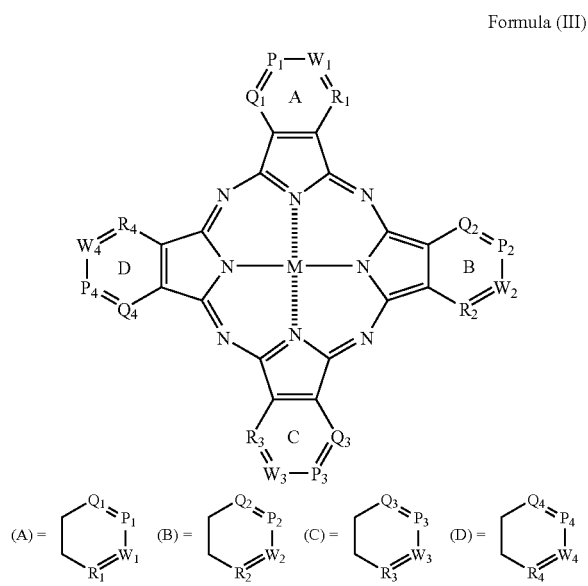

Formula (III)

wherein $Q_1$ to $Q_4$, $P_1$ to $P_4$, $W_1$ to $W_4$ and $R_1$ to $R_4$ each independently represents ($=C(J_1)$- and or $-N=$), ($=C(J_2)$- and or $-N=$), ($=C(J_3)$- and or $-N=$) or ($=C(J_4)$- and or $-N=$);

$J_1$ to $J_4$ each independently represents a hydrogen atom or a substituent, with the proviso that all of rings {ring A: (A), ring B: (B), ring C: (C), and ring D: (D)} containing ($Q_1$, $P_1$, $W_1$ and $R_1$), ($Q_2$, $P_2$, $W_2$ and $R_2$), ($Q_3$, $P_3$, $W_3$ and $R_3$) and ($Q_4$, $P_4$, $W_4$ and $R_4$), respectively, are not aromatic rings at the same time; whereas, when all of the four rings are pyridine rings at the same time, a pyridine ring in which any one of $Q_1$ and $R_1$ is a nitrogen atom, a pyridine ring in which any one of $Q_2$ and $R_2$ is a nitrogen atom, a pyridine ring in which any one of $Q_3$ and $R_3$ is a nitrogen atom and a pyridine ring in which any one of $Q_4$ and $R_4$ is a nitrogen atom are excluded; whereas, a case where all of the four rings are pyrazine rings at the same time is excluded; whereas, when $J_1$ to $J_4$ each represents a substituent, $J_1$ to $J_4$ may each further have a substituent, with proviso that at least one of $J_1$ to $J_4$ or at least one of the substituents which $J_1$ to $J_4$ have, has a substituent with two or more carbon atoms, and the total sum of the carbon atoms of the substituents of $J_1$ to $J_4$ is 8 or more, and an ionic hydrophilic group is not contained in a molecule; and M represents a hydrogen atom, a metallic element, a metal oxide, a metal hydroxide or a metal halide.

DETAILED DESCRIPTION OF THE INVENTION

Below, the present invention will be described in more details. The ink in the invention denotes a composition containing a coloring material such as a dye or a pigment, and it can be preferably used for image formation.

[Phthalocyanine Compound]

The phthalocyanine compounds represented by the general formulae (I) to (III) for use in the invention are each a substituted phthalocyanine compound (mixture) obtained by introducing at least specific ring {e.g., (IV) in the general formulae} to a specific phthalocyanine nucleus represented by, for example, the general formula (III), and introducing at least one specific substituent {e.g., (V) in the general formulae} to a specific substitution site. In the invention, for synthesis of phthalocyanine compounds, all the possible phthalocyanine mixtures {a mixing ratio of the general formula (IV) and the general formula (V)} may be included. Only a specific mixture in a specific mixing ratio {e.g., the general formula (IV)/the general formula (V)=99.9/0.1 to 0.1/99.9 (eq./e q.)} may be used. Alternatively, several kinds of those may be used as a mixture. Therefore, by using a mixture in which phthalocyanine compounds having a plurality of specific substituents are present, it is possible to inhibit the crystallization. Thus, the improvement of the storage stability of the coloring matter (phthalocyanine compound) in an ink is expectable.

In the invention, in order to reduce the reactivity with ozone which is an electrophilic reagent, it is desirable that the oxidation potential is made more electropositive than 1.0 V (vs SCE) by introducing an electron withdrawing group in the phthalocyanine skeleton. The more electropositive oxidation potential is more preferred. The oxidation potential is more preferably, more electropositive than 1.1 V (vs SCE), and most preferably, more electropositive than 1.15 V (vs SCE).

The inventors have conducted a study on the ozone gas fastness properties of a colored image. As a result, they found as follows. There is a correlation between the oxidation potential of the compound for use in the colored image and the ozone gas fastness property thereof, and use of the phthalocyanine compound with a value of the oxidation potential of more electropositive than 1.0 V with respect to the saturated calomel electrode (SCE) more improves the ozone gas fastness property.

The reason for the improvement of the ozone gas fastness property of the colored image can be explained by the relationship between the HOMO (highest occupied molecular orbital) and LUMO (lowest unoccupied molecular orbital) of the compound and the ozone gas. Namely, conceivably, the coloring compound is oxidized by the reaction between the HOMO of the coloring compound and the LUMO of an ozone gas, resulting in a reduction of the ozone gas fastness property of the colored image. Therefore, in order to improve the ozone gas fastness property, it is only essential that the HOMO of the compound is lowered to reduce the reactivity with the ozone gas.

The value of the oxidation potential denotes the ease of transfer of electrons from the sample to the electrode. The larger value (the more electropositive oxidation potential) denotes the less liability for electrons to transfer from the sample to the electrode, in other words, the lower susceptibility to oxidation. In terms of the structure of the compound, the oxidation potential becomes more electropositive by introducing an electron withdrawing group, and the oxidation potential becomes more electronegative by introducing an electron donating group.

The method for measuring the oxidation potential will be described in details below. The potential denotes the potential at which the compound undergoes withdrawal of an electron of the compound at an anode in voltammetry. It is considered to be approximately in agreement with the energy level of HOMO in the ground state of the compound.

The value of the oxidation potential (Eox) can be determined with ease by those skilled in the art. This method is described in, for example, New Instrumental Methods in Electrochemistry written by P. Delahay (1954, published by Interscience Publisher Co.), Electrochemical Methods written by A. J. Bard et al., (1980, published by John Wiley & Sons Co.), and Electrochemical Measuring Method written by Akira Fujishima, et al., (1984, published by GIHODO Publisher's Co.).

The measurement of the oxidation potential will be specifically described. The oxidation potential is determined in the following manner. In a solvent such as dimethylformamide or acetonitrile containing a supporting electrolyte such as sodium perchlorate or tetrapropylammonium perchlorate, a test sample is dissolved in a concentration of $1\times10^{-2}$ to $1\times10^{-6}$ mol.dm$^{-3}$. The oxidation potential is determined as the value with respect to SCE (saturated calomel electrode) using cyclic voltammetry. Whereas, as the usable supporting electrolyte and solvent, proper ones can be selected according to the oxidation potential and the solubility of the supporting electrolyte. Regarding the usable supporting electrolyte and solvent, there is a description on pages 101 to 118 in Denki Kagaku Sokuiteihou (Electrochemical Measuring Method) written by Akira Fujishima, et al., (1984, published by GIHODO Publisher's Co.).

The value of the oxidation potential may deviate by about several tens millivolts under the influences of the liquid junction potential and the liquid resistance of the sample solution. However, calibration using a reference sample (e.g., hydroquinone) can ensure the reproducibility of the value of the measured potential.

As the oxidation potential in the invention, the value measured in N,N-dimethylformamide containing tetrapropyl ammonium perchlorate in an amount of 0.1 mol.dm$^{-3}$ (the concentration of the compound is $1\times10^{-3}$ mol.dm$^{-3}$) as a supporting electrolyte is used.

Whereas, the oxidation potential also differs according to the structure of the compound. Therefore, in order to reduce the reactivity with ozone which is an electrophilic reagent, a coloring matter structure which is inherently electropositive in oxidation potential is preferably selected not only from the viewpoint of the ozone gas fastness property, but also from the viewpoint of the molecular design because an electron withdrawing group or an electron donating group can be arbitrarily introduced for adjusting other fastness properties, hue, physical properties, and the like.

For example, in order to reduce the reactivity with ozone which is an electrophilic reagent, it is preferable that the oxidation potential is made electropositive by [1] introducing a hetero atom (e.g., nitrogen atom); or [2] introducing an electron withdrawing group to a given site in the structure of the compound. Therefore, when the Hammett's substituent constant σp value, which is the scale of the electron withdrawing property and the electron donating property of a substituent, is used, it is possible to make the oxidation potential more electropositive by introducing a substituent with a large σp value.

The Hammett's substituent constant σp value will be explained. The Hammett's rule is an empirical rule proposed by L. P. Hammett in 1935 in order to discuss quantitatively the effect of a substituent on the reaction or equilibrium of benzene derivatives. The propriety of the rule is widely recognized at present. The substituent constants determined by Hammett's rule include the σp value and the σm value. These values can be found widely in common literature. For example, these are specifically described in Lange's Handbook of Chemistry) 12th Edition, compiled by J. A. Dean, (1979, McGraw Hill) and Kagaku No Ryouiki, a special issue, No. 122, pp. 96 to 103 (1979 Nankoudo).

The inventors conducted a study on the hue, fastness properties, crystallinity, and storage stability of several phthalocyanine compounds. As a result, they found as follows. By using a phthalocyanine compound (mixture) obtained by introducing at least one specific substituent {e.g., (IV) in the general formulae} to a specific substitution site, and introducing at least one specific substituent {e.g., the general formula (V)}, the foregoing problems can be solved. This enables the compatibility between the good hue and the image fastness properties and the ink solution long-term stability with time.

Below, the phthalocyanine compound represented by the following general formula (I) for use in the ink of the invention will be described in details.

Formula (I)

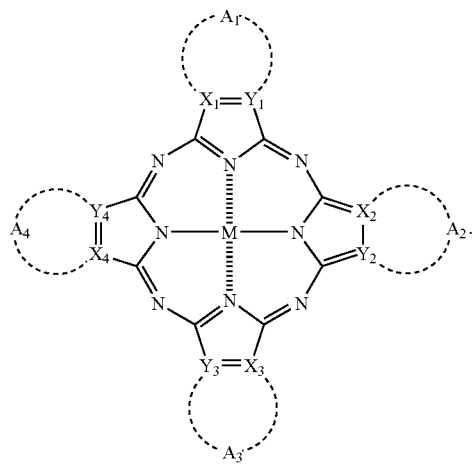

The phthalocyanine compound represented by the general formula (I) of the invention includes the compound, a salt thereof, and a hydrate thereof.

In the general formula (I), $X_1$ to $X_4$ and $Y_1$ to $Y_4$ are each independently preferably a carbon atom or a nitrogen atom, and more preferably a carbon atom. Each bond between $X_1$—$Y_1$, $X_2$—$Y_2$, $X_3$—$Y_3$, and $X_4$—$Y_4$ may be either a single bond or a double bond according to their respective atomic species and the heterocyclic ring species of $A_1$ to $A_4$ described below.

In the general formula (I), $A_1$ to $A_4$ each independently represents an atomic group necessary for forming an aromatic ring or a heterocyclic ring (which may further form a condensed ring with other rings) with $X_1$ to $X_4$ and $Y_1$ to $Y_4$. The aromatic ring denotes an aromatic ring in which the ring forming atoms are only carbon atoms, unless otherwise stated. Specifically, a benzene ring may be mentioned. The aromatic ring may further be condensed with other aromatic ring, heterocyclic ring, or an aliphatic ring. When the heterocyclic ring is formed, the atomic group is preferably composed of at least two selected from a carbon atom, a nitrogen atom, a sulfur atom, and an oxygen atom. Out of the heterocyclic rings composed of $A_1$ to $A_4$, $X_1$ to $X_4$, and $Y_1$ to $Y_4$, particularly, a 5- or 6-membered heterocyclic ring is preferred. Preferred examples of the heterocyclic ring composed of $A_1$ to $A_4$, $X_1$ to $X_4$, and $Y_1$ to $Y_4$ may include pyridine, pyrazine, imidazole, pyrazole, thiazole, isothiazole, oxazole, pyrrole, pyrazolone, indole, isoxazole, thiophene, furan, pyran, penthiophene, quinoline, isoquinoline, pyridazine, pyrimidine, and pyridone. However, all of four rings composed of each A, X, and Y are not aromatic rings at the same time. Whereas, when all of the four rings composed of each A, X, and Y are pyridine rings at the same time, the pyridine rings in which any one of atoms adjacent to each X and Y in the pyridine ring is a nitrogen atom are excluded. Whereas, when all of the four rings composed of each A, X, and Y are pyrazine rings at the same time, the pyrazine rings in which both of atoms adjacent to each X and Y in the pyrazine ring are nitrogen atoms are excluded.

Whereas, $A_1$ to $A_4$ each may also have a substituent. As the substituents, a halogen atom, an alkyl group, a cycloalkyl group, an alkenyl group, ail aralkyl group, an aryl group, a heterocyclic ring group, a cyano group, a hydroxyl group, a nitro group, a amino group, an alkylamino group, an alkoxy group, an aryloxy group, an amido group, an arylamino group, ureido group, a sulfamoylamino group, an alkylthio group, an arylthio group, an alkoxycarbonylamino group, a sulfonamido group, a carbamoyl group, a sulfamoyl group, a sulfonyl group, an alkoxycarbonyl group, a heterocyclicoxy group, an azo group, an acyloxy group, a carbamoyloxy group, a silyloxy group, an aryloxycarbonyl group, an aryloxycarbonylamino group, an imido group, a heterocyclicthio group, a sulfinyl group, a phosphonyl group, and an acyl group are preferred. These groups may each further have a substituent.

Out of these, a halogen atom, alkyl group, a cycloalkyl group, an alkenyl group, an aralkyl group, an aryl group, a heterocyclic group, a cyano group, an alkoxy group, an amido group, an ureido group, a sulfonamido group, a carbamoyl group, a sulfamoyl group, a sulfonyl group, and an alkoxycarbonyl group are preferred. Particularly, a halogen atom, an alkyl group, a cycloalkyl group, an alkenyl group, an aralkyl group, an aryl group, a heterocyclic group, a cyano group, a carbamoyl group, a sulfamoyl group, a sulfonyl group, and an alkoxycarbonyl group are preferred. A sulfamoyl group, and a sulfonyl group are most preferred.

At least one of $A_1$ to $A_4$, or at least one of the substituents of $A_1$ to $A_4$ has a substituent with two or more carbon atoms, and the total sum of the carbon atoms of the substituents of $A_1$ to $A_4$ is 8 or more, and an ionic hydrophilic group is not contained in the molecule.

The alkyl groups represented by the substituents, which $A_1$ to $A_4$ can have, include an alkyl group having a substituent and an unsubstituted alkyl group. As the alkyl groups, alkyl groups each having 1 to 20 carbon atoms exclusive of its substituents is preferred. Out of these, particularly, an alkyl group having 1 to 12 carbon atoms is preferred. Particularly, because of the solubility, straight-chain alkyl groups and or branched alkyl groups having 1 to 8 carbon atoms are preferred. Especially, those having asymmetric carbons (used in the form of a racemic body) are particularly preferred. Examples of the substituent may include a hydroxyl group, an alkoxy group, a cyano group, and a halogen atom. Examples of the alkyl group may include methyl, ethyl, butyl, isopropyl, t-butyl, hydroxyethyl, methoxyethyl, cyanoethyl, and trifluoromethyl.

The cycloalkyl groups represented by the substituents, which $A_1$ to $A_4$ may have, include a cycloalkyl group having a substituent and an unsubstituted cycloalkyl group. As cycloalkyl groups, cycloalkyl groups each having 3 to 20 carbon atoms exclusive of its substituents are preferred. Out of these, particularly, a cycloalkyl group having 5 to 12 carbon atoms is preferred. Particularly, because of the solubility, branched cycloalkyl groups each having 4 to 8 carbon atoms are preferred. Especially, those having asymmetric carbons (used in the form of a racemic body) are particularly preferred. Examples of the cycloalkyl group may include a cyclohexyl group.

The alkenyl groups represented by the substituents, which $A_1$ to $A_4$ may have, include an alkenyl group having a substituent and an unsubstituted alkenyl group. As alkenyl groups, alkenyl groups each having 2 to 20 carbon atoms exclusive of its substituents are preferred. Out of these, particularly, an alkenyl group having 2 to 12 carbon atoms is preferred. Particularly, because of the solubility, a branched alkenyl group having 3 to 12 carbon atoms is preferred. Especially, those having asymmetric carbons (used in the form of a racemic body) are particularly preferred. Examples of the alkenyl group may include a vinyl group and an allyl group.

The alkynyl groups represented by the substituents, which $A_1$ to $A_4$ may have, include an alkynyl group having a substituent and an unsubstituted alkynyl group. As the alkynyl groups, alkynyl groups each having 2 to 20 carbon atoms exclusive of its substituents are preferred. Out of these, particularly, an alkynyl group having 2 to 12 carbon atoms is preferred. Particularly, because of the solubility, a branched alkynyl group having 4 to 12 carbon atoms is preferred. Especially, those having asymmetric carbons (used in the form of a racemic body) are particularly preferred.

The aralkyl groups represented by the substituents, which $A_1$ to $A_4$ may have, include an aralkyl group having a substituent and an unsubstituted aralkyl group. As the aralkyl groups, aralkyl groups each having 7 to 20 carbon atoms exclusive of its substituents are preferred. Out of these, particularly, an aralkyl group having 7 to 12 carbon atoms is preferred. Particularly, because of the solubility, a branched aralkyl group having 9 to 12 carbon atoms is preferred. Especially, those having asymmetric carbons (used in the form of a racemic body) are particularly preferred. Examples of the aralkyl group may include a benzyl group and a 2-phenethyl group.

The aryl groups represented by the substituents, which $A_1$ to $A_4$ may have, include an aryl group having a substituent and an unsubstituted aryl group. As the aryl groups, aryl groups each having 6 to 40 carbon atoms are preferred. Out of these, particularly, an aryl group having 6 to 12 carbon atoms is preferred. As particularly preferred examples of the substituent, because of the solubility, a branched aralkyl group having 7 to 12 carbon atoms is preferred. Especially, those having asymmetric carbons (used in the form of a racemic body) are particularly preferred. Examples of the substituent may include an alkyl group, an alkoxy group, a halogen atom, and an alkylamino group. Examples of the aryl group may include phenyl, p-tolyl, p-methoxyphenyl, and o-chlorophenyl.

The heterocyclic groups represented by the substituents, which $A_1$ to $A_4$ may have, include a heterocyclic group having a substituent and an unsubstituted heterocyclic group, which may further form a condensed ring with other rings. The heterocyclic groups are preferably 5-membered or 6-membered heterocyclic groups. Further, they may be either aromatic heterocyclic groups or nonaromatic heterocyclic groups.

As the heterocyclic groups represented by $A_1$ to $A_4$ (e.g., for pyridine, substitution is possible at the position 2, 3, or 4), mention may be made of pyridine, pyrazine, pyrimidine, pyridazine, triazine, quinoline, isoquinoline, quinazoline, cinnoline, phthalazine, quinoxaline, pyrrole, indole, furan, benzofuran, thiophene, benzothiophene, pyrazole, imidazole, benzimidazole, triazole, oxazole, benzoxazole, thiazole, benzothiazole, isothiazole, benzisothiazole, thiadiazole, isoxazole, benzisoxazole, pyrrolidine, piperidine, piperazine, imidazolidine, thiazoline, and the like.

Out of these, aromatic heterocyclic groups are preferred. The preferred examples thereof will be listed in the same manner as previously done. Mention may be made of pyridine, pyrazine, pyrimidine, pyridazine, triazine, pyrazole, imidazole, benzimidazole, triazole, thiazole, benzothiazole, isothiazole, benzisothiazole, and thiadiazole.

As the halogen atoms represented by the substituents which $A_1$ to $A_4$ may have, mention may be made of a fluorine atom, a chlorine atom, and a bromine atom.

The alkylamino groups represented by the substituents, which $A_1$ to $A_4$ may have, include an alkylamino group having a substituent and an unsubstituted alkylamino group. As the alkylamino groups, alkylamino groups each having 1 to 6 carbon atoms exclusive of its substituents are preferred. Examples of the alkylamino group may include a methylamino group and a diethyl amino group.

The alkyloxy groups represented by the substituents, which $A_1$ to $A_4$ may have, include an alkyloxy group having a substituent and an unsubstituted alkyloxy group. As the alkyloxy groups exclusive of its substituents, alkyloxy groups having 1 to 12 carbon atoms are preferred. Examples of the substituent may include an alkyloxy group and a hydroxyl group. Examples of the alkyloxy group may include a methoxy group, an ethoxy group, an isopropoxy group, a methoxyethoxy group, and a hydroxyethoxy group.

The aryloxy groups represented by the substituents, which $A_1$ to $A_4$ may have, include an aryloxy group having a substituent and an unsubstituted aryloxy group. As the aryloxy groups, aryloxy groups each having 6 to 30 carbon atoms are preferred. Examples of the substituents may include an alkoxy group. Examples of the aryloxy group may include a phenoxy group, a p-methoxyphenoxy group and an o-methoxyphenoxy group.

The acylamino groups represented by the substituents, which $A_1$ to $A_4$ may have, include an amido group having a substituent and an unsubstituted amido group. As the acylamino groups, acylamino groups each having 2 to 12 carbon atoms exclusive of its substituents are preferred. Examples of the acylamino group may include an acetamido group, a propionamido group, and a benzamido group.

The arylamino groups represented by the substituents, which $A_1$ to $A_4$ may have, include an arylamino group having a substituent and an unsubstituted arylamino group. As the arylamino groups, arylamino groups having 6 to 30 carbon atoms are preferred. Examples of the substituents may include a halogen atom. Examples of the arylamino group may include an anilino group and a 2-chloroanilino group.

The ureido groups represented by the substituents, which $A_1$ to $A_4$ may have, include an ureido group having a substituent and an unsubstituted aryloxy group. As the ureido groups, ureido groups each having 1 to 12 carbon atoms exclusive of its substituents are preferred. Examples of the substituents may include an alkyl group and an aryl group. Examples of the ureido group may include a 3-methylureido group, a 3,3-dimethylureido group, and a 3-phenylureido group.

The sulfamoylamino group represented by the substituents, which $A_1$ to $A_4$ may have, include a sulfamoylamino group having a substituent and an unsubstituted sulfamoylamino group. Examples of the substituents may include an alkyl group. Examples of the sulfamoylamino group may include a N,N-dipropylsulfamoylamino group.

The alkylthio groups represented by the substituents, which $A_1$ to $A_4$ may, have, include an alkylthio group having a substituent and an unsubstituted alkylthio group. As the alkylthio groups, alkylthio groups each having 1 to 12 carbon atoms exclusive of its substituents are preferred. Examples of the alkylthio group may include a methylthio group and an ethylthio group.

The arythio groups represented by the substituents, which $A_1$ to $A_4$ may have, include an arylthio group having a substituent and an unsubstituted arylthio group. As the arylthio groups, arylthio groups having 6 to 30 carbon atoms are preferred. Examples of the substituents may include an alkyl group. Examples of the arylthio group may include a phenylthio group and a p-tolylthio group.

The alkyloxycarbonylamino groups represented by the substituents, which $A_1$ to $A_4$ may have, include an alkyloxycarbonylamino group having a substituent and an unsubstituted alkyloxycarbonylamino group. As the alkyloxycarbonylamino groups, alkyloxycarbonylamino groups each having 2 to 12 carbon atoms exclusive of its substituents are preferred. Examples of the alkyloxycarbonylamino group may include an ethoxycarbonylamino group.

The sulfonamido groups represented by the substituents, which $A_1$ to $A_4$ may have, include an sulfonamido group having a substituent and an unsubstituted sulfonamido group. As the sulfonamido groups, sulfonamido groups each having 1 to 12 carbon atoms exclusive of its substituents are preferred. Examples of the sulfonamido group may include methanesulfonamido and benzenesulfonamido.

The carbamoyl groups represented by the substituents, which $A_1$ to $A_4$ may have, include a carbamoyl group having a substituent and an unsubstituted carbamoyl group. Examples of the substituents may include an alkyl group. Examples of the carbamoyl group may include a methylcarbamoyl group and a dimethylcarbamoyl group.

The sulfamoyl groups represented by the substituents, which $A_1$ to $A_4$ may have, include a sulfamoyl group having a substituent and an unsubstituted sulfamoyl group. Examples of the substituents may include an alkyl group and an aryl group. Examples of the sulfamoyl group may include a dimethylsulfamoyl group and a di-(2-hydroxyethyl)sulfamoyl group, and a phenylsulfamoyl group.

The sulfonyl groups represented by the substituents, which $A_1$ to $A_4$ may have, include an alkylsulfonyl group and an arylsulfonyl group. Examples of the sulfonyl group may include a 3-isopropyloxy propylsulfonyl group and a 3-methoxycarbonylphenylsulfonyl group.

The alkoxycarbonyl groups represented by the substituents, which $A_1$ to $A_4$ may have, include an alkoxycarbonyl group having a substituent and an unsubstituted alkoxycarbonyl group. As the alkoxycarbonyl groups, alkoxycarbonyl groups each having 2 to 12 carbon atoms exclusive of its substituents are preferred. Examples of the alkoxycarbonyl group may include a methoxycarbonyl group and an ethoxycarbonyl group.

The heterocyclicoxy groups represented by the substituents, which $A_1$ to $A_4$ may have, include a heterocyclicoxy group having a substituent and an unsubstituted heterocyclicoxy group. As the heterocyclicoxy groups, heterocyclicoxy groups each having a 5-membered or 6-membered heterocyclic ring are preferred. Examples of the substituents may include a hydroxyl group. Examples of the heterocyclicoxy group may include a 2-tetrahydropyranyloxy group.

The azo groups represented by the substituents, which $A_1$ to $A_4$ may have, include an azo group having a substituent and an unsubstituted azo group. Examples of the azo group may include a p-nitrophenylazo group.

The acyloxy groups represented by the substituents, which $A_1$ to $A_4$ may have, include an acyloxy group having a substituent and an unsubstituted acyloxy group. As the acyloxy groups, acyloxy groups each having 1 to 12 carbon atoms exclusive of its substituents are preferred. Examples of the acyloxy group may include an acetoxy group and a benzoyloxy group.

The carbamoyloxy groups represented by the substituents, which $A_1$ to $A_4$ may have, include a carbamoyloxy group having a substituent and an unsubstituted carbamoyl oxy group. Examples of the substituents may include an alkyl group. Examples of the carbamoyloxy group may include a N-methylcarbamoyloxy group.

The silyloxy groups represented by the substituents, which $A_1$ to $A_4$ may have, include a silyloxy group having a substituent and an unsubstituted silyloxy group. Examples of the substituents may include an alkyl group. Examples of the silyloxy group may include a trimethylsilyloxy group.

The aryloxycarbonyl groups represented by the substituents, which $A_1$ to $A_4$ may have, include an aryloxycarbonyl group having a substituent and an unsubstituted aryloxycarbonyl group. As the aryloxycarbonyl groups, aryloxycarbonyl groups each having 7 to 30 carbon atoms are preferred. Examples of the an loxycarbonyl group may include a phenoxycarbonyl group.

The aryloxycarbonylamino groups represented by the substituents, which $A_1$ to $A_4$ may have, include an aryloxycarbonylamino group having a substituent and an unsubstituted aryloxycarbonylamino group. As the aryloxycarbonylamino groups, aryloxycarbonylamino groups each having 7 to 12 carbon atoms exclusive of its substituents are preferred. Examples of the aryloxycarbonylamino group may include a phenoxycarbonylamino group.

The imido groups represented by the substituents, which $A_1$ to $A_4$ may have, include an imido group having a substituent and an unsubstituted imido group. Examples of the imido group may include a N-phthalimido group and a N-succinimido group.

The heterocyclicthio groups represented by the substituents, which $A_1$ to $A_4$ may have, include a heterocyclicthio group having a substituent and an unsubstituted a heterocyclicthio group.

The heterocyclicthio group preferably has a 5-membered or 6-membered heterocyclic ring. Examples of the heterocyclicthio group may include a 2-pyridylthio group.

The sulfinyl groups represented by the substituents, which $A_1$ to $A_4$ may have, include an alkylsulfinyl group and an arylsulfinyl group. Examples of the sulfinyl group may include a 3-isopropyloxy propylsulfinyl group and a 3-methoxycarbonyl phenylsulfinyl group.

The phosphoryl groups represented by the substituents, which $A_1$ to $A_4$ may have, include a phosphoryl group having a substituent and an unsubstituted a phosphoryl group. Examples of the phosphoryl group may include a phenoxyphosphoryl group and a phenylphosphoryl group.

The acyl groups represented by the substituents, which $A_1$ to $A_4$ may have, include an acyl group having a substituent and an unsubstituted acyl group. As the acyl groups, acyl groups each having 1 to 12 carbon atoms exclusive of its substituents are preferred. Examples of the acyl group may include an acetyl group and a benzoyl group.

It is preferable that, the phthalocyanine compound represented by the general formula (I) has, per molecule, therein, at least one oleophilic group having 2 or more (preferably 60 or less, and more preferably 30 or less) carbon atoms, and has at least one oleophilic group having preferably 3 or more carbon atoms. Especially the total sum of the carbon atoms of the oleophilic groups is preferably 8 or more (preferably 240 or less, and more preferably 120 or less). Especially, the total sum of the carbon atoms of the oleophilic groups is in particular preferably 10 or more (preferably 120 or less, and more preferably 100 or less).

Further, the phthalocyanine compounds represented by the general formula (I) each do not contain an ionic hydrophilic group in the molecule, and are not water soluble. In the invention, the ionic hydrophilic group is ionized in water to form ions with ease (such as a sulfo group or a phosphono group) or a substituent present in the form of a salt. The free substituents with a pKa of 3 or more (such as a carboxyl group) do not correspond thereto.

For the phthalocyanine compound represented by the general formula (I), the sum of the carbon atoms of the substituents in one molecule of the phthalocyanine compound is 8 or more. This results in particularly good solubility or dispersibility in the oleophilic medium.

M represents a hydrogen atom, a metallic element, a metal oxide, a metal hydroxide, or a metal halide.

As M, preferably, other than a hydrogen atom, mention may be made of, as a metallic element, Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi, or the like. Out of these, Cu, Ni, Zn, and Al are preferred and Cu is most preferred.

As a metal oxide, mention may be preferably $VQ_1$ GeO, or the like. Whereas, as a metal hydroxide, mention may be preferably made of $Si(OH)_2$, $Cr(OH)_2$, $Sn(OH)_2$, or the like. Further, as a metal halide, mention may be made of AlCl, $SiCl_2$, VCl, $VCl_2$, $VOCl$, $FeCl_2$, GaCl, ZrCl, or the like.

Whereas, as for the phthalocyanine compound represented by the general formula (I), Pc (phthalocyanine ring) may form a dimer (Pc-M-L-M-Pc) or a trimer through L (divalent linking group). In this case, Ms which are present in plural number may be the same or different.

The divalent linking group represented by L is preferable an oxy group —O—, a thio group —S—, a carbonyl group —CO—, a sulfonyl group —$SO_2$—, an imino group —NH—, a methylene group —$CH_2$—, or a group formed by combining two or more of these.

Incidentally, for the preferred combination of the substituents in the compound represented by the general formula (I), a compound where at least one of various substituents is the foregoing preferred group is preferred, a compound where a larger number of various substituents are the foregoing preferred groups is more preferred, and a compound where all the substituents are the foregoing preferred groups is most preferred.

Out of the phthalocyanine compounds represented by the general formula (I), a phthalocyanine compound having a structure represented by the following general formula (II) is preferred. Below, the phthalocyanine compound represented by the general formula (II) of the invention will be described in details.

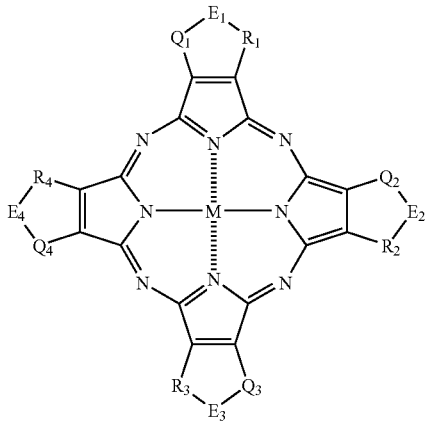

Formula (II)

In the general formula (II), $Q_1$ to $Q_4$ and $R_1$ to $R_4$ each independently represents a carbon atom, a nitrogen atom, a sulfur atom, an oxygen atom or a phosphorus atom. Especially, they each preferably represent a carbon atom, a sulfur atom, a nitrogen atom, or an oxygen atom, and each more preferably represent a carbon atom or a nitrogen atom.

$E_1$ to $E_4$ each independently represents an atomic group necessary for forming an aromatic ring or a heterocyclic ring (which may further form a condensed ring with other rings) with $Q_1$ to $Q_4$ and $R_1$ to $R_4$. When they each form a heterocyclic ring, the atomic group is preferably composed of at least two selected from a carbon atom, a nitrogen atom, a sulfur atom, and an oxygen atoms. Whereas, preferred examples of the heterocyclic rings composed with $E_1$ to $E_4$, $Q_1$ to $Q_4$, and $R_1$ to $R_4$ are the same as the examples of the heterocyclic rings composed of $A_1$ to $A_4$, $X_1$ to $X_4$, and $Y_1$ to $Y_4$. However, all of four rings composed of each E, Q, and R are not aromatic rings at the same time. Whereas, when all of the four rings are pyridine rings at the same time, the pyridine rings in which any one of each Q and R is a nitrogen atom are excluded. Further, the cases where all of the four rings are pyrazine rings at the same time are excluded.

Whereas, $E_1$ to $E_4$ each may also have a substituent. The substituents are defined as the same as the substituents, which $A_1$ to $A_4$ shown in the general formula (I) may have, and the preferred examples thereof are also the same. These groups may each also further have substituents.

It is preferable that, the phthalocyanine compound represented by the general formula (II) has, per molecule, therein, at least one oleophilic group having 2 or more (preferably 60 or less, more preferably 30 or less) carbon atoms, and has at least one oleophilic group having preferably 3 or more carbon atoms. Especially, the total sum of the carbon atoms of the oleophilic groups is preferably 8 or more (preferably 240 or less, and more preferably 120 or less). Especially, the total sum of the carbon atoms of the oleophilic groups is in particular preferably 10 or more (preferably 120 or less, and more preferably 100 or less).

For the phthalocyanine compound represented by the general formula (II), the sum of the carbon atoms of the substituents in one molecule of the phthalocyanine compound is 8 or more. This results in particularly good solubility or dispersibility in the oleophilic medium.

Out of the phthalocyanine compounds represented by the general formula (II), particularly preferred combination of the substituents are the same as the particularly preferred combination of the substituents in the general formula (I).

Incidentally, for the preferred combination of the substituents in the compound represented by the general formula (II), a compound where at least one of various substituents is the foregoing preferred group is preferred, a compound where a larger number of various substituents are the foregoing preferred groups is more preferred, and a compound where all the substituents are the foregoing preferred groups is most preferred.

Out of the phthalocyanine compounds represented by the general formula (II), a phthalocyanine compound having a structure represented by the following general formula (III) is further preferred. Below, the phthalocyanine compound represented by the general formula (III) of the invention will be described in details.

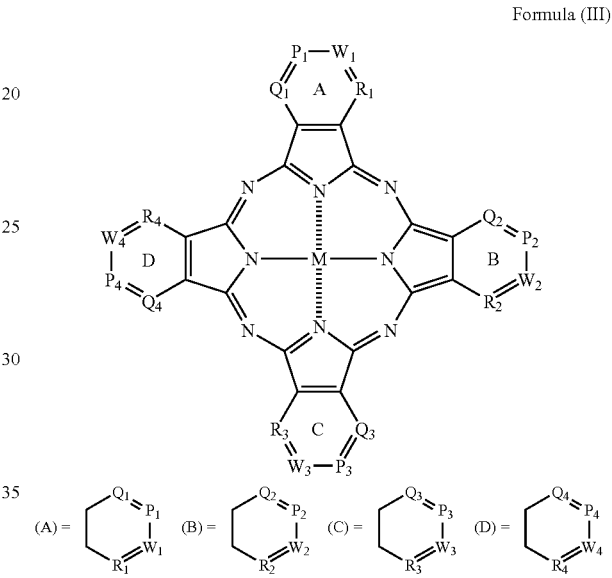

Formula (III)

In the general formula (III), $Q_1$ to $Q_4$, $P_1$ to $P_4$, $W_1$ to $W_4$, and $R_1$ to $R_4$ each independently represents (=C(J_1)- and or —N=), (=C(J_2)_p and or N=), (=C(J_3)- and or —N=), or (=C(J_4)- and or —N=).

However, all of rings {ring A: (A), ring B: (B), ring C: (C), and ring D: (D)} composed of ($Q_1$, $P_1$, $W_1$, and $R_1$), ($Q_2$, $P_2$, $W_2$, and $R_2$), ($Q_3$, $P_3$, $W_3$, and $R_3$), and ($Q_4$, $P_4$, $W_4$, and $R_4$), respectively, are not aromatic rings at the same time.

M is defined as the same as those in the general formula (II), and preferred examples thereof are also the same.

Particularly, a phthalocyanine compound in which at least one of the rings {ring A: (A), ring B: (B), ring C: (C), and ring D: (D)} composed of ($Q_1$, $P_1$, $W_1$, and $R_1$), ($Q_2$, $P_2$, $W_2$, and $R_2$), ($Q_3$, $P_3$, $W_3$, and $R_3$), and ($Q_4$, $P_4$, $W_4$, and $R_4$), respectively, represents a nitrogen-containing heterocyclic ring is preferred.

$J_1$ to $J_4$ each independently represents a hydrogen atom and or a substituent.

Whereas, when $J_1$ to $J_4$ each represent a substituent, they may each further have a substituent. However, at least one of $J_1$ to $J_4$, or at least one of the substituents, which $J_1$ to $J_4$ have, has an oleophilic group with two or more carbon atoms, as a substituent.

Further, a phthalocyanine compound in which at least one of the rings {ring A: (A), ring B: (B), ring C: (C), and ring D: (D)} composed of ($Q_1$, $P_1$, $W_1$, and $R_1$), ($Q_2$, $P_2$, $W_2$, and $R_2$), ($Q_3$, $P_3$, $W_3$, and $R_3$), and ($Q_4$, $P_4$, $W_4$, and $R_4$), respectively, represents a nitrogen-containing heterocyclic ring represented by the following general formula (IV) is preferred.

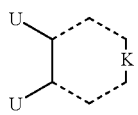

Formula (IV)

However, when all of the four of the ring A: (A), the ring B: (B), the ring C: (C), and the ring D: (D) are pyridine rings at the same time, the pyridine rings in which either ones of ($Q_1$ and $R_1$), ($Q_2$ and $R_2$), ($Q_3$ and $R_3$), and ($Q_4$ and $R_4$) are nitrogen atoms are excluded.

Whereas, the cases where all of the four of the ring A: (A), the ring B: (B), the ring C: (C), and the ring D: (D) are pyrazine rings at the same time are excluded.

Further preferably, the ones in which at least one of (preferably at least two of) the rings {ring A: (A), ring B: (B), ring C: (C), and ring D: (D)} composed of ($Q_1$, $P_1$, $W_1$, and $R_1$), ($Q_2$, $P_2$, $W_2$, and $R_2$), ($Q_3$, $P_3$, $W_3$, and $R_3$), and ($Q_4$, $P_4$, $W_4$, and $R_4$), respectively, represents an aromatic ring, and at least one represents a pyridine ring or a pyrazine ring are preferred.

Out of these, particularly, a phthalocyanine compound in which at least one (preferably, at least two) of the rings {ring A: (A), ring B: (B), ring C: (C), and ring D: (D)} composed of ($Q_1$, $P_1$, $W_1$, and $R_1$), ($Q_2$, $P_2$, $W_2$, and $R_2$), ($Q_3$, $P_3$, $W_3$, and $R_3$), and ($Q_4$, $P_4$, $W_4$, and $R_4$), respectively, represents an aromatic ring represented by the general formula (V) is preferred.

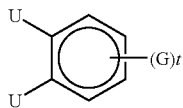

Formula (V)

In the general formula (V), G represents, —SO-$Z_1$, —$SO_2$-$Z_1$, —$SO_2NZ_1Z_2$, —$CONZ_1Z_2$, —$CO_2Z_1$, or —$COZ_1$.

Particularly, —$SO_2$-$Z_1$, —$SO_2NZ_1Z_2$, and —$CONZ_1Z_2$ are preferred. Out of these, —$SO_2$-$Z_1$ and —$SO_2NZ_1Z_2$ are preferred —$SO_2$-$Z_1$ is most preferred.

$Z_1$ may be the same or different, and represents preferably a substituted or unsubstituted alkyl group having a total of 1 to 20 carbon atoms, a substituted or unsubstituted cycloalkyl group having a total of 3 to 20 carbon atoms, a substituted or unsubstituted alkenyl group having a total of 2 to 20 carbon atoms, a substituted or unsubstituted alkynyl group having a total of 2 to 12 carbon atoms, a substituted or unsubstituted aralkyl group having a total of 7 to 20 carbon atoms, a substituted or unsubstituted aryl group having a total of 6 to 20 carbon atoms, or a substituted or unsubstituted heterocyclic group having a total of 4 to 20 carbon atoms. Out of these, $Z_1$ represents preferably a substituted or unsubstituted alkyl group having a total of 1 to 12 carbon atoms, a substituted or unsubstituted aryl group having a total of 6 to 18 carbon atoms, or a substituted or unsubstituted heterocyclic group having a total of 4 to 12 carbon atoms, and most preferably a substituted or unsubstituted alkyl group having a total of 1 to 12 carbon atoms.

$Z_2$ may be the same or different, and represents preferably a hydrogen atom, a substituted or unsubstituted alkyl group having a total of 1 to 20 carbon atoms, a substituted or unsubstituted cycloalkyl group having a total of 3 to 20 carbon atoms, a substituted or unsubstituted alkenyl group having a total of 2 to 20 carbon atoms, a substituted or unsubstituted alkynyl group having a total of 2 to 12 carbon atoms, a substituted or unsubstituted aralkyl group having a total of 7 to 20 carbon atoms, a substituted or unsubstituted aryl group having a total of 6 to 20 carbon atoms, or a substituted or unsubstituted heterocyclic group having a total of 4 to 20 carbon atoms. Out of these. $Z_2$ represents preferably a hydrogen atom, a substituted or unsubstituted alkyl groups having a total of 1 to 12 carbon atoms, a substituted or unsubstituted aryl group having a total of 6 to 18 carbon atoms, or a substituted or unsubstituted heterocyclic group having a total of 4 to 12 carbon atoms, further preferably a hydrogen atom, or a substituted alkyl group having a total of 1 to 12 alkyl group, and most preferably a hydrogen atom.

Incidentally, $Z_1$ and/or $Z_2$ may further have such substituents as mentioned as the substituents which $A_1$ to $A_4$ may have. It is preferable that at least one of $Z_1$ and/or $Z_2$ represents a substituent having two or more carbon atoms (preferably, 50 or less carbon atoms, and more preferably 30 or less carbon atoms), and that the total sum of the carbon atoms of the substituents represented by $Z_1$ and/or $Z_2$ is 8 or more (preferably, 200 or less, and more preferably 120 or less). Further, it is in particular preferable that at least one of $Z_1$ and/or $Z_2$ represents a substituent having two or more carbon atoms (preferably, 50 or less carbon atoms, and more preferably 30 or less carbon atoms), and that the total sum of the carbon atoms of the substituents represented by $Z_1$ and/or $Z_2$ is 10 or more (preferably, 200 or less, and more preferably 120 or less). It is most preferable that at least one of $Z_1$ and/or $Z_2$ represents a substituent having two or more carbon atoms (preferably, 50 or less carbon atoms, and more preferably 30 or less carbon atoms), and that the total sum of carbon atoms of the substituents represented by $Z_1$ and/or $Z_2$ is 10 or more (preferably, 120 or less, and more preferably 100 or less).

t represents an integer of 0 to 4, and in particular preferably 1 to 2, and most preferably 1.

The general formula (V) is preferably the general formula (V-1). In the general formula (V-1), G and the preferred range thereof are the same as those for the general formula (V). t represent an integer of 0 to 2, and preferably 1 or 2, and more preferably 1.

Out of the aromatic rings represented by the general formula (V), particularly, an aromatic ring represented by the following general formula (VI) is preferred.

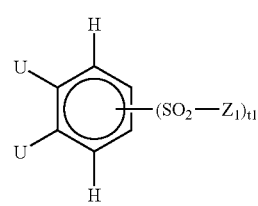

Formula (VI)

In the general formula (VI), $Z_1$ is defined as the same as $Z_1$ in the general formula (V), and the preferred examples thereof are also the same. t1 and U are defined as the same as t1 and U in the general formula (V-1), respectively, and the preferred examples thereof are also the same.

The particularly preferred combinations as the phthalocyanine compounds represented by the general formula (III) are as follows.

(i) A phthalocyanine compound in which at least one of the rings {ring A: (A), ring B: (B), ring C: (C), and ring D:

(D)} composed of ($Q_1$, $P_1$, $W_1$, and $R_1$), ($Q_2$, $P_2$, $W_2$, and $R_2$), ($Q_3$, $P_3$, $W_3$, and $R_3$), and ($Q_4$, $P_4$, $W_4$, and $R_4$), respectively, represents a heterocyclic ring is preferred.

(ii) A phthalocyanine compound in which at least one of the rings {ring A: (A), ring B: (B), ring C: (C), and ring D: (D)} composed of ($Q_1$, $P_1$, $W_1$, and $R_1$), ($Q_2$, $P_2$, $W_2$, and $R_2$), ($Q_3$, $P_3$, $W_3$, and $R_3$), and ($Q_4$, $P_4$, $W_4$, and $R_4$), respectively, represents a nitrogen-containing 6-membered heterocyclic ring is preferred. However, when all of the four of the ring A: (A), the ring B: (B), the ring C: (C), and the ring D: (D) are pyridine rings at the same time, the pyridine rings in which either ones of ($Q_1$ and $R_1$), ($Q_2$ and $R_2$), ($Q_3$ and $R_3$), and ($Q_4$ and $R_4$) are nitrogen atoms are excluded. Whereas, the cases where all of the four of the ring A: (A), the ring B: (B), the ring C: (C), and the ring D: (D) are pyrazine rings at the same time are excluded.

(iii) The one in which at least one of the rings {ring A: (A), ring B: (B), ring C: (C), and ring D: (D)} composed of ($Q_1$, $P_1$, $W_1$, and $R_1$), ($Q_2$, $P_2$, $W_2$, and $R_2$), ($Q_3$, $P_3$, $W_3$, and $R_3$), and ($Q_4$, $P_4$, $W_4$, and $R_4$), respectively, represents an aromatic ring, and at least one represents a pyridine ring or a pyrazine ring is preferred. Out of these, particularly, a phthalocyanine compound in which at least one of the rings {ring A: (A), ring B: (B), ring C: (C), and ring D: (D)} composed of ($Q_1$, $P_1$, $W_1$, and $R_1$), ($Q_2$, $P_2$, $W_2$, and $R_2$), ($Q_3$, $P_3$, $W_3$, and $R_3$), ($Q_4$, $P_4$, $W_4$, and $R_4$), respectively, represents an aromatic ring substituted with a sulfinyl group, a sulfonyl group, or a sulfamoyl group, having a substituent with two or more carbon atoms is preferred. Further, a phthalocyanine compound in which at least one of the rings {ring A: (A), ring B: (B), ring C: (C), and ring D: (D)} composed of ($Q_1$, $P_1$, $W_1$, and $R_1$), ($Q_2$, $P_2$, $W_2$, and $R_2$), ($Q_3$, $P_3$, $W_3$, and $R_3$), and ($Q_4$, $P_4$, $W_4$, and $R_4$), respectively, represents an aromatic ring substituted with a sulfonyl group or a sulfamoyl group, having a substituent with two or more carbon atoms is preferred. A phthalocyanine compound in which at least one of the rings {ring A: (A), ring B: (B), ring C: (C), and ring D: (D)} composed of ($Q_1$, $P_1$, $W_1$, and $R_1$), ($Q_2$, $P_2$, $W_2$, and $R_2$), ($Q_3$, $P_3$, $W_3$, and $R_3$), and ($Q_4$, $P_4$, $W_4$, and $R_4$), respectively, represents an aromatic ring substituted with a sulfonyl group having a substituent with two or more carbon atoms is most preferred.

(iv) M is preferably a hydrogen atom, a metal atom, or an oxide, a hydroxide, or a halide thereof, especially preferably Cu, Ni, Zn, Al, or the like, and most preferably Cu.

(v) The phthalocyanine compound has preferably a molecular weight (average) in the range of 995 to 2500, further preferably a molecular weight in the range of 995 to 2000, especially preferably a molecular weight in the range of 995 to 1800, and in particular most preferably a molecular weight in the range of 995 to 1600.

(vi) It is preferable that, the phthalocyanine compound represented by the general formula (III) has, per molecule, therein, at least one oleophilic group having 2 or more (preferably 60 or less, and more preferably 30 or less) carbon atoms, and has at least one oleophilic group having preferably 3 or more carbon atoms. Especially, the total sum of the carbon atoms of the oleophilic groups is preferably 8 or more (preferably 240 or less, and more preferably 120 or less). Especially, the total sum of the carbon atoms of the oleophilic groups is in particular preferably 10 or more (preferably 120 or less, and more preferably 100 or less).

The phthalocyanine compound represented by the general formulae (I), (II), or (III) of the invention is a novel oleophilic compound of a specific structure (in which particularly, the benzene ring of the phthalocyanine nucleus has been substituted with a heterocyclic ring and or an aromatic ring substituted with a specific substituent). It is useful as an oil soluble dye for ink jet and the oil soluble dye synthesizing intermediate. Further, it is a compound which may be a useful chemical/pharmaceutical/agrichemical organic compound intermediate.

In the general formula (V), $Z_1$ is each independently preferably a group represented by $A_1$-L-$A_2$-Q.

$A_1$ and $A_2$ each independently represents a substituted or unsubstituted alkylene, a substituted or unsubstituted phenylene, a substituted or unsubstituted naphthylene, or a substituted or unsubstituted heterocyclic group. They each are preferably a substituted or unsubstituted alkylene or a substituted or unsubstituted phenylene, and especially, in particular preferably a substituted or unsubstituted alkylene.

More specifically, a straight-chain or branched alkylene group having 1 to 18 carbon atoms {e.g., for a straight-chain alkylene, —$(CH_2)_n$—: n represents an integer of 1 to 18} is preferred. Particularly, a straight-chain or branched alkylene group having 1 to 8 carbon atoms is preferred. Especially, a straight-chain or branched alkylene group having 2 to 6 carbon atoms is preferred.

L represents a divalent linking group, and preferably an oxy group (—O—), a thio group (—S—), carbonyl (—CO—), a sulfonyl group (—$SO_2$—), an imino group (—NR—), sulfamoyl (—$SO_2$NR—), a carbamoyl group (—CONR—), an alkoxycarbonyl group (—$CO_2$—), an acylamino group (—NRCO—), or a sulfonamido group (—$NRSO_2$—), especially preferably, an oxy group (—O—), sulfamoyl (—$SO_2$NR—), a carbamoyl group (—CONR—), or an alkoxycarbonyl group (—$CO_2$—), and in particular preferably, sulfamoyl (—$SO_2$NR—), or an alkoxycarbonyl group (—$CO_2$—).

In these cases, R in each of the formulae representing the specific examples of the linking group for explaining L represents a hydrogen atom, an alkyl group, an aryl group, or a heterocyclic group, preferably a hydrogen atom or an alkyl group, and in particular preferably a hydrogen atom.

Q represents a hydrogen atom or a substituent. Preferred examples of the substituent are defined as the same as the examples of the substituent mentioned as the groups which may each further have a substituent in the general formula (I).

More specifically, an alkyloxy group (e.g., each group such as methoxy, ethoxy, 2-methoxyethoxy, 3-isopropyloxy, or 2-methanesulfonylethoxy), or an aryloxy group (e.g., each group such as phenoxy, 2-methylphenoxy, 4-t-butylphenoxy, 4-methoxyphenoxy, or 3-t-butyloxycarbamoylphenoxy) is preferred. Particularly, a straight-chain or branched alkyloxy group having 1 to 18 carbon atoms is most preferred. Especially, a straight-chain or branched alkyloxy group having 1 to 8 carbon atoms is most preferred.

The most preferred substituent $Z_1$ represented by the general formula (VI) is a group represented by -$A_1$-L-$A_2$-Q, and the general formula (VI) preferably has at least one (preferably one) —$SO_2$-$Z_1$.

The $A_1$ and $A_2$ each independently represents a substituted or unsubstituted alkylene, a substituted or unsubstituted phenylene, a substituted or unsubstituted naphthylene, or a substituted or unsubstituted heterocyclic group, preferably, a substituted or unsubstituted alkylene, or a substituted or unsubstituted phenylene, especially preferably, a straight-chain or branched alkylene group having 1 to 18 carbon atoms {e.g., for straight-chain alkylene, —$(CH_2)_n$—: n represents an integer of 1 to 18}, in particular preferably a straight-chain or branched alkylene group having 1 to 8 carbon atoms, and especially preferably a straight-chain or branched alkylene group having 2 to 6 carbon atoms.

L represents a divalent linking group, and preferably an oxy group (—O—), a thio group (—S—), carbonyl (—CO—), a sulfonyl group (—SO$_2$—), an imino group (—NR—), sulfamoyl (—SO$_2$NR—), a carbamoyl group (—CONR—), an alkoxycarbonyl group (—CO$_2$—), an acylamino group (—NRCO—), or a sulfonamido group (—NRSO$_2$—), especially preferably, an oxy group (—O—), sulfamoyl (—SO$_2$NR—), a carbamoyl group (—CONR—), or an alkoxycarbonyl group (—CO$_2$—), and in particular preferably, sulfamoyl (—SO$_2$NR—), or an alkoxycarbonyl group (—CO$_2$—).

In these cases, R in each of the formulae representing the specific examples of the linking group for explaining the L represents a hydrogen atom, an alkyl group, an aryl group, or a heterocyclic group, preferably a hydrogen atom or an alkyl group, and in particular preferably a hydrogen atom.

The Q represents a hydrogen atom or a substituent, preferably, an alkyloxy group (e.g., each group such as methoxy, ethoxy, 2-methoxyethoxy, or 3-isopropyloxy), or an aryloxy group (e.g., each group such as phenoxy, 2-methylphenoxy, 4-t-butylphenoxy, or 4-methoxyphenoxy), in particular most preferably, a straight-chain or branched alkyloxy group having 1 to 18 carbon atoms, and especially, most preferably a straight-chain or branched alkyloxy group having 1 to 8 carbon atoms.

Incidentally, for the preferred combination of the substituents of the compound represented by the general formula (IV), a compound in which at least one of various substituents is the foregoing preferred substituent is preferred, a compound in which a larger number of various substituents are the foregoing preferred substituents is more preferred, and a compound in which all the substituents are the foregoing preferred groups is most preferred.

The phthalocyanine compound represented by the general formula (III) of the invention can be derived by allowing, for example, a dicarbonitrile derivative (general formula a) and/or a 1,3-diiminoisoindoline derivative (general formula b) represented by the following formulae to react with a metal derivative represented by the general formula (VII). For the synthesis of an oil-soluble group-substituted phthalocyanine compound, there are a method in which the one obtained by previously introducing an oil soluble group to the general formula a and/or the general formula b is used as a raw material, and a method in which a phthalocyanine compound is obtained, and then, an oil soluble group is introduced thereto, and the compound is made oil soluble.

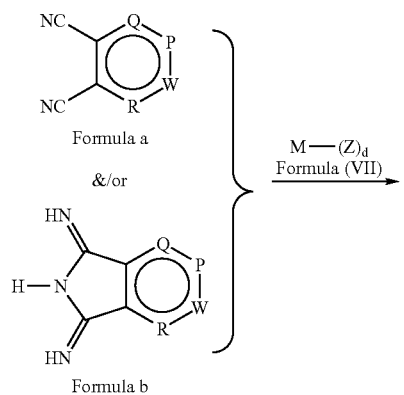

Formula a

&/or

Formula b

M—(Z)$_d$
Formula (VII)

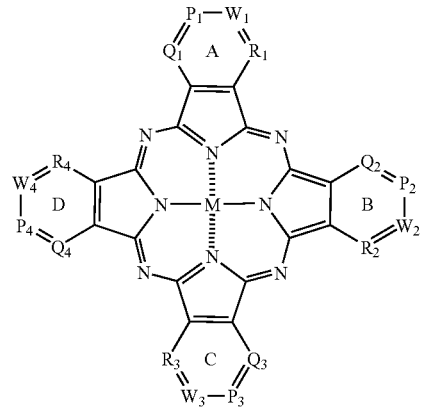

Formula (III)

In the respective formulae, Q, P, W, and R correspond to Q$_1$ to Q$_4$, P$_1$ to P$_4$, W$_1$ to W$_4$, and R$_1$ to R$_4$ in the general formula (III), respectively.

When any one (or more) of the ring (A), the ring (B), the ring (C), and the ring (D) in the phthalocyanine compound represented by the general formula (III) represents a heterocyclic group (in particular preferably a nitrogen-containing heterocyclic ring), and any one of the ring (A), the ring (B), the ring (C), and the ring (D) in the substituted phthalocyanine compound represented by the general formula (III) represents an aromatic ring, the phthalocyanine compound represented by the general formula (III) can be manufactured by, for example, using the dicarbonitrile derivative (general formula a) and/or a 1,3-diiminoisoindoline derivative (general formula b) in which the Q, P, W, and R ring forms a heterocyclic ring (in particular preferably, a nitrogen-containing heterocyclic ring), and the dicarbonitrile derivative (general formula a) and/or 1,3-diiminoisoindoline derivative (general formula b) in which the Q, P, W, and R ring forms an aromatic ring as raw materials.

In the method for producing the phthalocyanine compounds represented by the general formulae (I) to (III) of the invention, the reaction conditions for the dicarbonitrile derivative (general formula a) and/or 1,3-diiminoisoindoline derivative (general formula b) represented by the formulae and a metal derivative represented by the general formula (VII) will be described in details.

The acid for use in the invention has no particular restriction. However, any of organic compounds and inorganic compounds are preferred so long as the they have a dissociation exponent pKa in an aqueous solution at 25° C. of 7.0 or less. pKa represents the logarithmic value of the inverse of the acid dissociation exponent, and indicates the value determined at an ionic strength of 0.1 and at 25° C. The acids with a pKa of 0.0 to 7.0 may be any of in organic acids such as phosphoric acid, and organic acids such as phosphoric acid, malonic acid, and citric acid. However, the acids having a pKa of 0.0 to 7.0 producing effects by the foregoing improvement are organic acids. Further, even for the organic acids, an organic acid having a carboxyl group is most preferred. The organic acids having a pKa of 0.0 to 7.0 may be either monobasic organic acids or polybasic organic acids. For the polybasic organic acids, when the pKa falls within the range of 0.0 to 7.0, the acids can be used in the form of a metal salt (e.g., sodium or potassium salt), or an ammonium salt. Whereas, the organic acids having a pKa of 0.0 to 7.0 can also be used in mixture of two or more thereof. Preferred specific examples of the organic acid having a pKa 0.0 to 7.0 for use in the invention may include various organic acids including aliphatic type monobasic organic acids such as formic acid, acetic acid, monochloroacetic acid, monobromoacetic acid, glycolic acid, propionic acid, monochloropropionic acid, lactic acid, pyruvic acid, acrylic acid, butyric acid, isobutyric acid, pivalic acid, aminobutyric acid, valeric acid, and isovaleric acid; amino acid type compounds such as asparagine, alanine, arginine, ethionine, glycine, glutamine, cysteine, serine, methionine, and leucine; aromatic type monobasic organic acids such as benzoic acid, and mono-, such as chloro- or hydroxy-, substituted benzoic acid, and nicotinic acid; aliphatic type dibasic organic acids such as oxalic acid, malonic acid, succinic acid, tartaric acid, malic acid, maleic acid, fumaric acid, oxalacetic acid, glutaric acid, and adipic acid; amino acid type dibasic organic acids such as aspartic acid, glutamic acid, glutaric acid, cystine, and ascorbic acid; aromatic dibasic organic acids such as phthalic acid and terephthalic acid; and tribasic organic acids such as citric acid. In the invention, out of the organic acids, aliphatic type monobasic organic acids are preferred, and formic acid, acetic acid, and propionic acid are most preferred.

The compound with a pKa of 7.0 or less is used in an amount of 0.05 to 20 equivalents based on the amount of the dicarbonitrile derivative (general formula a) and/or 1,3-diiminoisoindoline derivative (general formula b) represented by the formulae, and preferably charged in a 0.1 to 10-fold amount. This provides the effect of inhibiting the decomposition of the dicarbonitrile derivative (general formula a) and/or 1,3-diiminoisoindoline derivative (general formula b) represented by the formulae. When the acid with a pKa of 7.0 or less is used in an amount of less than 0.05 time the amount of the dicarbonitrile derivative (general formula a) and/or 1,3-diiminoisoindoline derivative (general formula b) represented by the formulae, to be used, the decomposition of the dicarbonitrile derivative (general formula a) and/or 1,3-diiminoisoindoline derivative (general formula b) represented by the formulae is insufficiently inhibited. On the other hand, when the acid with a pKa of 7.0 or less is used in an amount of more than 20 times the amount of the dicarbonitrile derivative (general formula a) and/or 1,3-diiminoisoindoline derivative (general formula b) represented by the formulae, to be used, the reaction system shifts to the acid side, so that the reaction becomes less likely to proceed. Whereas, a base is excessively used until a buffer solution occurs, so that a salt of the acid and the base may occur in the form of a crystal.

The bases usable in this reaction are inorganic bases or organic bases. As the inorganic bases, for example, inorganic bases such as lithium carbonate, sodium carbonate, potassium carbonate, sodium hydrogencarbonate, lithium hydroxide, and potassium hydroxide are usable. As the organic bases, for example, triethylamine, tributylamine, diisopropylethylamine, pyridine, and dimethylaminopyridine are usable. In addition, organic acid salts such as lithium acetate, potassium acetate, sodium oxalate, and disodium ethylenediaminetetraacetate salt are also usable. However, these bases each are dissolved in a reaction solvent, and thus serve as a buffer solution. For this reason, a base with a higher solubility is preferred, and an organic base or an organic acid salt including alkali metal ions is most preferred. Out of the alkali metal ions, lithium ions, sodium ions, and potassium ions are preferred, and especially, an organic acid salt of lithium ions or sodium ions is most preferred. The base is used in an amount of 0.05 to 30.0 equivalents, and preferably 0.5 to 15.0 equivalents based on the amount of the dicarbonitrile derivative (general formula a) and/or 1,3-diiminoisoindoline derivative (general formula b) represented by the formulae, to be used.

The buffer solution is a solution having a large buffer action on the changes in concentration of a given component in the solution. For example, a mixed solution of a weak acid (AH) such as acetic acid and the conjugate base thereof ($A^-$) can control the changes in pH to a minimal level even when a small amount of $H^+$ or $OH^-$ is added. The system containing a weak base (B) and the conjugate acid thereof ($BH^+$) also shows the same action. Practical pH buffer solutions can be found in a large number of common documents. For example, there is a detailed description in Rikagaku Jiten, the fifth edition, (1999, Iwanami Shoten, Publishers), edited by Saburou Nagakura.

With the method for producing a phthalocyanine compound of the invention, a dicarbonitrile derivative (general formula a) and/or a 1,3-diiminoisoindoline derivative (general formula b) represented by the formulae is desirably allowed to react with a metal derivative represented by the general formula (VII) in the presence of the acid with a pKa of 7.0 or less. As the reaction conditions in this case, the reaction temperature is 30 to 220° C., preferably 40 to 200° C., further preferably 50 to 180° C. When the reaction temperature is less than 30° C., the reaction rate remarkably decreases, uneconomically resulting in a marked increase in length of time required for the synthesis. Whereas, when the synthesis is carried out at a high temperature of more than 220° C., the amount of by-products unfavorably increases.

As the metal derivatives represented by the general formula (VII) to be added for the reaction of the invention, other than a metal or a metal for a metal oxide, or a metal hydroxide, to be introduced, a metal chloride, or a metal acetate, and as a complex, a metal aquo complex and an ammine complex are usable.

In the general formula (VII), as preferred M, mention may be made of a metal atom, or a oxide, a hydroxide, and a halide thereof.

As a metal atom, mention may be made of Li, Na, K, Mg, Ti, Zr, V, Nb, Ta, Cr, Mo, W, Mn, Fe, Co, Ni, Ru, Rh, Pd, Os, Ir, Pt, Cu, Ag, Au, Zn, Cd, Hg, Al, Ga, In, Si, Ge, Sn, Pb, Sb, Bi, or the like.

As an oxide, mention may be made of VO, TiO, GeO, or the like.

As a hydroxide, mention may be made of $Si(OH)_2$, $Cr(OH)_2$, $Sn(OH)_2$, or the like.

As a halide, mention may be made of AlCl, $SiCl_2$, VCl, $VCl_2$, VOCl, FeCl, GaCl, ZrCl, or the like.

Especially, M is preferably Cu, Ni, Zn, Al, or the like, and most preferably Cu.

In the general formula (VII), Z represents a monovalent or divalent ligand such as a halogen atom, an acetic acid anion, acetylacetonate, or oxygen, and d represents an integer of 1 to 4.

Specific examples of the metal derivative {the metal derivative represented by the general formula (VII)} may include halides of Al, Si, Ti, V, Mn, Fe, Co, Ni, Cu, Zn, Ge, Ru, Rh, Pd, In, Sn, Pt, Pb, and the like, carboxylic acid derivatives, sulfate, nitrate, carbonyl compounds, oxides, and complexes. More specifically, mention may be made of copper chloride, copper bromide, copper iodide, copper acetate, nickel chloride, nickel bromide, nickel acetate, cobalt chloride, cobalt bromide, cobalt acetate, iron chloride, zinc chloride, zinc bromide, zinc iodide, zinc acetate, vanadium chloride, vanadium oxytrichloride, palladium chloride, palladium acetate, aluminum chloride, manganese chloride, manganese acetate, acetyl acetone manganese, manganese chloride, lead chloride, lead acetate, indium chloride, titanium chloride, tin chloride, and the like.

Out of these, especially, cupric chloride ($CuCl_2$), and copper acetate are preferred, and particularly, cupric chloride ($CuCl_2$) is preferred.

The amount of it to be used is preferably 0.01- to 10-fold equivalents, further preferably 0.05- to 5-fold equivalents, and in particular preferably 0.1- to 3-fold equivalents based on the amount of a dicarbonitrile derivative (general formula a) and/or a 1,3-diiminoisoindoline derivative (general formula b) represented by the formulae.

Whereas, in the invention, a catalyst may be used at the same time. As the catalysts of the invention, all the catalysts commonly used for the synthesis of a phthalocyanine compound may be used. Examples thereof may include molybdenum compounds such as ammonium molybdate, molybdic acid, ammonium phosphomolybdate, and molybdenum oxide, tungsten compounds such as ammonium tungstate, and ammonium phosphotungstate, arsenic-vanadium compounds, boric acid, or halides or oxyhalides of titanium, tin, and antimony. Out of these, ammonium molybdate is excellent.

As the solvents for use in the invention, common organic solvents may be used. Out of these, organic solvents having a hydroxyl group, and polar solvents (e.g., acetonitrile, formamide, N,N-dimethylformamide, N,N-dimethylacetamide, dimethyl sulfoxide, sulfolane, propylene carbonate N-methyl-2-pyrrolidone, N-vinyl-2-pyrrolidone, and N,N-diethyldodecanamide) are preferred. More preferred examples of alcohol may include methanol, ethanol, n-propanol, isopropanol, n-pentanol, n-heptanol, n-octanol, cyclohexanol, benzyl alcohol, phenethyl alcohol, phenylpropyl alcohol, furfuryl alcohol, and anise alcohol. Further, not only mono- but also oligo- (particularly, di- and tri-), and poly-$C_2$ to $C_4$-alkylene glycols (in brief, "glycols"), and mono-$C_1$ to $C_8$-alkyl- and monoaryl ethers (in brief, "glycol monoether") are also preferred. Whereas, ethylene-based compounds are also advantageous. Examples thereof may include ethylene glycol, 1,2- or 1,3-propylene glycol, diethylene glycol, butylene glycol, tri- or tetra-ethylene glycol, di-, tri-, or tetra-propylene glycol, polyethylene- or polypropylene glycol, ethylene glycol monomethyl-, -monoethyl-, -monopropyl-, -monobutyl- or -monohexyl ether, propylene glycol monomethyl-, -monoethyl-, monopropyl-, -monobutyl or -monohexyl ether, di-, tri-, or tetra-ethylene glycol monomethyl-, -monoethyl- or monobutyl ether, di-, tri-, or tetra-propylene glycol monomethyl-, and -monoethyl- or -monobutyl ether or ethylene- or propylene glycol monophenyl ether. Out of these, methanol, ethanol, isopropanol, ethylene glycol, 1,2- or 1,3-propylene glycol, diethylene glycol, tri- or tetraethylene glycol, and di-, tri-, or tetrapropylene glycol are preferred, methanol, ethanol, isopropanol, ethylene glycol, and diethylene glycol are more preferred, and particularly, ethylene glycol, or diethylene glycol is most preferred.

Further, in the invention, an industrially used inactive solvent may also be used. Examples thereof may include nitrobenzene, trichlorobenzene, chloronaphthalene, methylnaphthalene, naphthalene, alkylbenzene, paraffin, naphthene, and kerosine.

These may be used alone, or in an appropriate mixture of two or more thereof so long as the mixture is a combination of the solvents not affecting one another. The amount of the solvents to be used is 1 to 100 times by weight, preferably 1 to 20 times by weight, and further preferably 1 to 5 times by weight based on the amount of the dicarbonitrile derivative (general formula a) and/or 1,3-diiminoisoindoline derivative (general formula b) represented by the formulae.

For this reaction, the execution of the reaction for a long time entails a concern about the stability of the objective product and the occurrence of the side reaction, and is uneconomical. The reaction time is preferably less than 10 hours, further preferably less than 8 hours, and still further preferably less than 6 hours.

With the method for producing the phthalocyanine compound of the invention, the product (phthalocyanine compound) obtainable by theses reactions is available with purification, or without purification after having been treated according to a common post-treatment of an organic synthesis reaction.

Namely, for example, the one freed from the reaction system is available without purification, or by carrying out purification operations by recrystallization, column chromatography, and the like alone or in combination.

Alternatively, after the completion of the reaction, the reaction solvent is distilled away, or is not distilled away, and the product is poured into water or ice, followed by neutralization, or not followed by neutralization. The thus freed one is available without purification, or by carrying out purification operations by recrystallization, column chromatography, and the like alone or in combination.

Further alternatively, after the completion of the reaction, the reaction solvent is distilled away, or is not distilled away, and the product is poured into water or ice, followed by neutralization, or not followed by neutralization. The one extracted with an organic solvent/aqueous solution is available without purification, or by carrying out purification operations by recrystallization, column chromatography, and the like alone or in combination.

In summary, the method for producing the phthalocyanine compound of the invention is preferably a production method including the combination of the following i) to viii).

(i) The acids for use in the invention have no particular restriction. However, any of organic compounds and inorganic compounds are preferred so long as the they have a dissociation exponent pKa of the acid or the conjugate acid in an aqueous solution at 25° C. of 7.0 or less. Out of these, organic acids having a pKa of 0.0 to 7.0 are preferred, and an organic acid having a carboxyl group is most preferred. Out of the organic acids, aliphatic type monobasic organic acids are preferred, and formic acid, acetic acid, and propionic acid are most preferred.

(ii) As the bases, inorganic bases or organic bases including alkali metals are usable. As the inorganic bases, for example, inorganic bases such as lithium carbonate, sodium carbonate, potassium carbonate, sodium hydrogencarbonate, lithium hydroxide, and potassium hydroxide are usable. As the organic bases, for example, triethylamine, tributylamine, diisopropylethylamine, pyridine, and dimethylaminopyridine are usable. In addition, organic acid salts such as lithium acetate, potassium acetate, sodium oxalate, disodium ethylenediaminetetraacetate salt are also usable.

(iii) As for the reaction conditions, the reaction temperature is 30 to 220° C., preferably 40 to 200° C., and in particular preferably 50 to 180° C.

(iv) As metals or metal oxides capable of being introduced, mention may be made of VO, TiO, Mn, Fe, Co, Ni, Cu, Zn, Pd, Cd, Mg, Al, and the like. Out of these, Ni, Cu, Zn, and Al are preferred. Whereas, the salt is in particular preferably in the form of chloride or acetate. The amount of it to be used is preferably 0.1- to 3-fold equivalents based on the amount of a dicarbonitrile derivative (general formula a) and/or a 1,3-diiminoisoindoline derivative (general formula b) represented by the formulae.

(v) The solvent is most preferably methanol, ethanol, isopropanol, ethylene glycol, or diethylene glycol. The amount of the solvent to be used is in particular preferably 1 to 5 times by weight based on the amount of the dicarbonitrile derivative (general formula a) and/or 1,3-diiminoisoindoline derivative (general formula b) represented by the formulae.

(vi) The reaction time is in particular preferably less than 6 hours (preferably 20 minutes or more).

Below, in the correlation between the structure and the performance of the phthalocyanine compound of the invention, with regard to (1) the oxidation potential of the phthalocyanine compound for use in an image forming ink, and (2) the structural features of the substituted phthalocyanine compound, a description will be separately given to (1) and (2).

(1) Oxidation potential of the phthalocyanine compound:

In the method for producing the phthalocyanine compound of the invention, by selecting a substituent having a large electron withdrawing property as the soluble group or the substituent, it is possible to control the oxidation potential of the resulting phthalocyanine dye to be high (electropositive). As a result, it becomes possible to more suppress the reactivity to active gases (e.g., oxidizing gases) such as ozone and singlet oxygen, which cal provide a coloring matter having resistances to active gases.

All the phthalocyanine compounds of the invention each have an oxidation potential more electropositive than 1.0 V (v SCE), and the following has been found out. It is very important for the improvement of the fastness properties of the formed images that the compounds have the physical values.

Namely, this is a very important structural feature (control of the oxidation potential of the phthalocyanine dye mixture) as a means for implementing the improvement of the storability (such as light resistance or the ozone gas resistance) of the formed image which is one of the objects of the invention.

In this specification, the term "ozone gas resistance" represents the resistance to an ozone gas as a typical example, and also covers the resistances to oxidizing atmospheres other than ozone gas. Namely, the phthalocyanine compounds represented by the general formula (1) in accordance with the invention each have a feature of high resistances to oxidizing gases present in the common environment, such as nitrogen oxides often in car exhaust fumes, sulfur oxides often in thermal power plants or factories, ozone gas generated through the photochemical radical chain reaction of these by sunlight, oxygen/nitrogen or oxygen/hydrogen radical-rich photochemical smog, and hydrogen peroxide radicals generated from the sites where specific chemicals are used, such as beauty shops. Therefore, when the oxidation degradation of images restricts the image life as in outdoor advertisement, the information of the railroad, and the like, by using the phthalocyanine compounds in accordance with the invention as the image forming materials, it is possible to improve the oxidizing atmosphere resistance, i.e., so-called ozone gas resistance.

(2) Ink stability with time of the phthalocyanine compound. The study on the hue, fastness properties, crystallinity, and storage stability of the phthalocyanine compound indicated as follows. By using the phthalocyanine compound in which at least one specific substituent has been introduced to a specific substitution site {for example, a sulfonyl group has been introduced to at least one site in the four aromatic rings of the phthalocyanine nucleus}, and at least one specific substituent {for example, at least one of the four rings in the phthalocyanine nucleus being a nitrogen-containing 6-membered heterocyclic group} has been mixed, it is possible to solve the foregoing problems. This allows the compatibility among the good hue, the image fastness properties, and the ink solution long-term stability with time.

Specifically, this is conceivably achieved by the phthalocyanine compound of the invention having [1] good spectral absorption characteristics (the dicarbonitrile derivative (general formula a) and/or the 3-diiminoisoindoline derivative (general formula b) is used as main raw material); [2] high image fastness properties (high oxidation potential the introduction of a sulfonyl group, a sulfamoyl group, or a nitrogen-containing heterocyclic ring, for example, suppresses the fading due to the oxidation reaction between the phthalocyanine compound and an ozone gas which is an electrophilic reagent); [3] high solubility in the ink composition; [4] the property of imparting good ink solution stability with time, resulting from the introduction of only a specific number of specific soluble groups into specific substitution sites (in an optimum mixing ratio of at least one or more dicarbonitrile derivatives (general formula a) and/or 3-diiminoisoindoline derivatives (general formula b)).

The effects of improvement of the hue/light fastness property/ozone gas resistance and the like, and the impartment of the characteristics required of the ink (coloring composition) given by the structural features of these specific substituents are not expectable at all from the foregoing related art.

Below specific examples (dyes 101 to 125) of the phthalocyanine compounds of the invention, represented by the general formula (III) will be shown. However, the invention is not limited to these specific examples.

In the table, examples of the four rings (A), (B), (C) and (D) of the phthalocyanine nucleus are derived from charging ratio (eq./eq.) of the dicarbonitrile derivatives (general formula a) and/or 1,3-diiminoisoindoline derivatives (general formula b) different in structure for the condensation reaction in the synthesis of the phthalocyanine compound of the invention, which denotes the average of the mixing ratio of the resulting phthalocyanine compounds.

TABLE 1
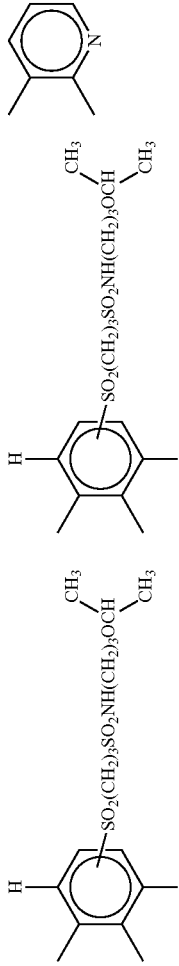
In the table, specific examples of respective combinations of (A), (B), (C) and (D) may be each independently in random order.
| Compound | M | (A) | (B) | (C) | (D) |
|---|---|---|---|---|---|
| 101 | Cu | 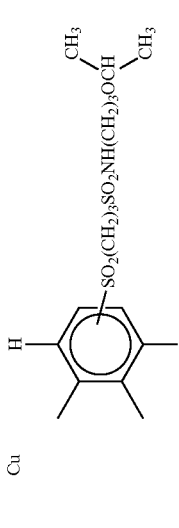 | 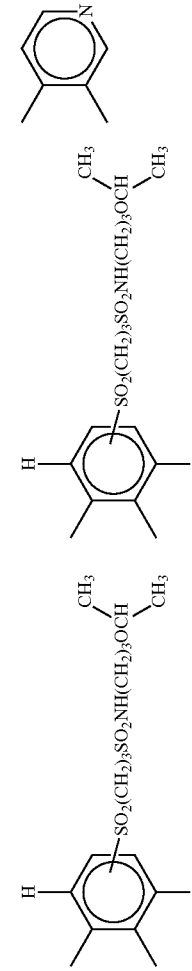 | 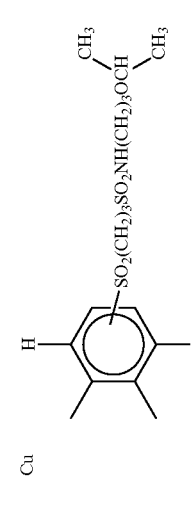 | 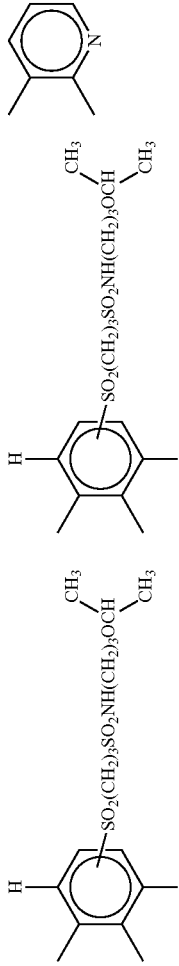 |
| 102 | Cu | 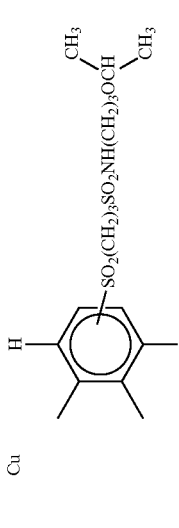 | 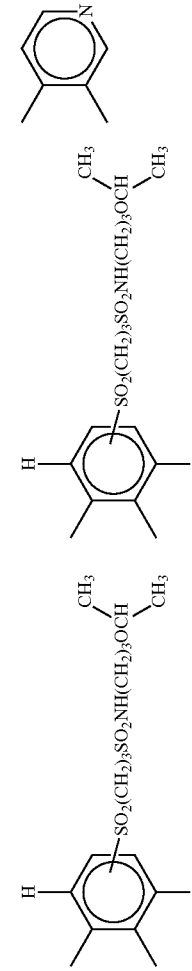 | 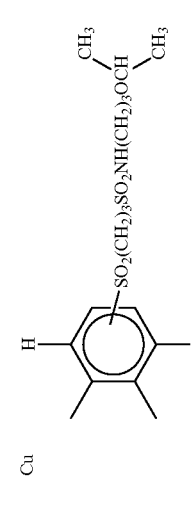 | 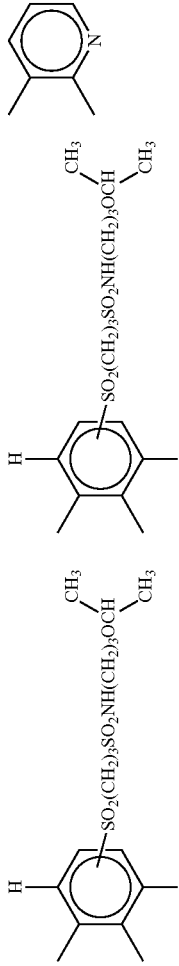 |
| 103 | Cu | 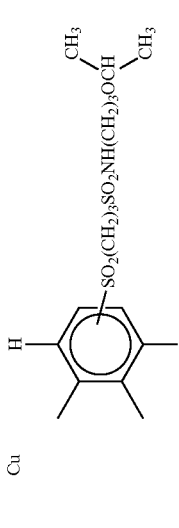 | 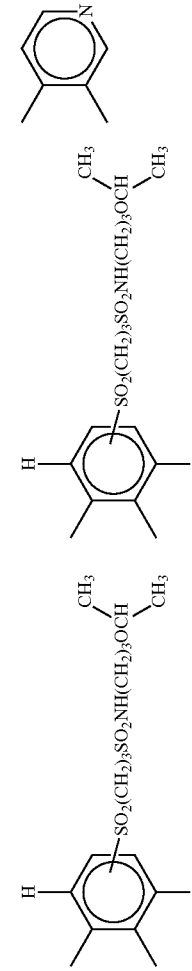 | 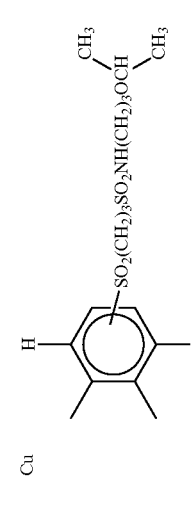 |  |

TABLE 1-continued $$M-Pc\begin{matrix}(A)\\(B)\\(C)\\(D)\end{matrix}$$

In the table, specific examples of respective combinations of (A), (B), (C) and (D) may be each independently in random order.

| Compound | M | (A) | (B) | (C) | (D) |
|---|---|---|---|---|---|
| 104 | Cu | 2,3-dimethyl-5-(SO$_2$(CH$_2$)$_3$SO$_2$NH(CH$_2$)$_3$OCH(CH$_3$)OCH$_3$)phenyl | 2,3-dimethyl-5-(SO$_2$(CH$_2$)$_3$SO$_2$NH(CH$_2$)$_3$OCH(CH$_3$)OCH$_3$)phenyl | 2,3-dimethylpyridyl | 2,3-dimethylpyridyl |
| 105 | Cu | 2,3-dimethyl-5-(SO$_2$(CH$_2$)$_3$SO$_2$NH(CH$_2$)$_3$OCH(CH$_3$)OCH$_3$)phenyl | 2,3-dimethyl-5-(SO$_2$(CH$_2$)$_3$SO$_2$NH(CH$_2$)$_3$OCH(CH$_3$)OCH$_3$)phenyl | 3,4-dimethylpyridyl | 3,4-dimethylpyridyl |

TABLE 2

$$M-Pc\begin{matrix}(A)\\(B)\\(C)\\(D)\end{matrix}$$

In the table, specific examples of respective combinations of (A), (B), (C) and (D) may be each independently in random order.

| Compound | M | (A) | (B) | (C) | (D) |
|---|---|---|---|---|---|
| 106 | Cu | benzene ring with H, H, CH₃, SO₂(CH₂)₃CO₂CHCH₂OCH₃ with CH₃ branch | benzene ring with H, H, CH₃, SO₂(CH₂)₃CO₂CHCH₂OCH₃ with CH₃ branch | benzene ring with H, H, CH₃, SO₂(CH₂)₃CO₂CHCH₂OCH₃ with CH₃ branch | pyridine ring (N at one position) |
| 107 | Cu | benzene ring with H, H, CH₃, SO₂(CH₂)₃CO₂CHCH₂OCH₃ with CH₃ branch | benzene ring with H, H, CH₃, SO₂(CH₂)₃CO₂CHCH₂OCH₃ with CH₃ branch | benzene ring with H, H, CH₃, SO₂(CH₂)₃CO₂CHCH₂OCH₃ with CH₃ branch | pyridine ring (N at other position) |
| 108 | Cu | benzene ring with H, H, CH₃, SO₂(CH₂)₃CO₂CHCH₂OCH₃ with CH₃ branch | benzene ring with H, H, CH₃, SO₂(CH₂)₃CO₂CHCH₂OCH₃ with CH₃ branch | benzene ring with H, H, CH₃, SO₂(CH₂)₃CO₂CHCH₂OCH₃ with CH₃ branch | pyrazine ring (two N) |

TABLE 2-continued

In the table, specific examples of respective combinations of (A), (B), (C) and (D) may be each independently in random order.

| Compound | M | (A) | (B) | (C) | (D) |
|---|---|---|---|---|---|
| 109 | Cu | 2,3-dimethylphenyl-SO₂(CH₂)₃CO₂CHCH₂OCH₃ with CH₃ | 2,3-dimethylphenyl-SO₂(CH₂)₃CO₂CHCH₂OCH₃ with CH₃ | 2,3-dimethylpyridine | 2,3-dimethylpyridine |
| 110 | Cu | 2,3-dimethylphenyl-SO₂(CH₂)₃CO₂CHCH₂OCH₃ with CH₃ | 2,3-dimethylphenyl-SO₂(CH₂)₃CO₂CHCH₂OCH₃ with CH₃ | 3-methylpyridine | 3-methylpyridine |

TABLE 3

$$M-Pc\begin{matrix}(A)\\(B)\\(C)\\(D)\end{matrix}$$

In the table, specific examples of respective combinations of (A), (B), (C) and (D) may be each independently in random order

| Compound | M | (A) | (B) | (C) | (D) |
|---|---|---|---|---|---|
| 111 | Cu | 3-($CO_2CH_2CH_2OCH_3$)-phenyl-$SO_2$-(tetramethylphenyl, H) | 3-($CO_2CH_2CH_2OCH_3$)-phenyl-$SO_2$-(tetramethylphenyl, H) | 3-($CO_2CH_2CH_2OCH_3$)-phenyl-$SO_2$-(tetramethylphenyl, H) | 3-methylpyridin-2-yl |
| 112 | Cu | 3-($CO_2CH_2CH_2OCH_3$)-phenyl-$SO_2$-(tetramethylphenyl, H) | 3-($CO_2CH_2CH_2OCH_3$)-phenyl-$SO_2$-(tetramethylphenyl, H) | 3-($CO_2CH_2CH_2OCH_3$)-phenyl-$SO_2$-(tetramethylphenyl, H) | 3-methylpyridin-4-yl |
| 113 | Cu | 3-($CO_2CH_2CH_2OCH_3$)-phenyl-$SO_2$-(tetramethylphenyl, H) | 3-($CO_2CH_2CH_2OCH_3$)-phenyl-$SO_2$-(tetramethylphenyl, H) | 3-($CO_2CH_2CH_2OCH_3$)-phenyl-$SO_2$-(tetramethylphenyl, H) | 3-methylpyrazin-2-yl |

TABLE 3-continued
In the table, specific examples of respective combinations of (A), (B), (C) and (D) may be each independently in random order
| Compound | M | (A) | (B) | (C) | (D) |
|---|---|---|---|---|---|
| 114 | Cu | 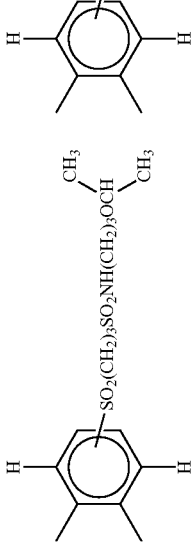 | 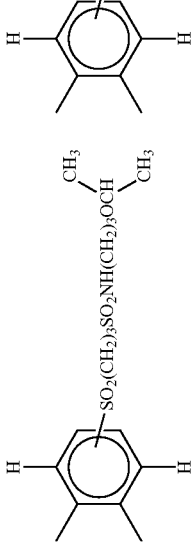 | 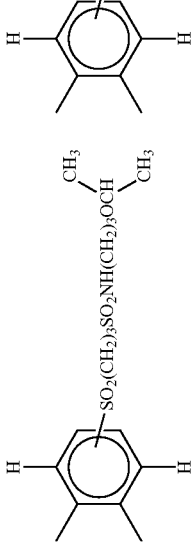 | 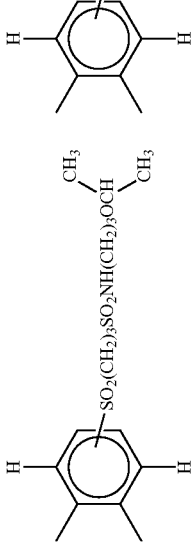 |
| 115 | Cu | 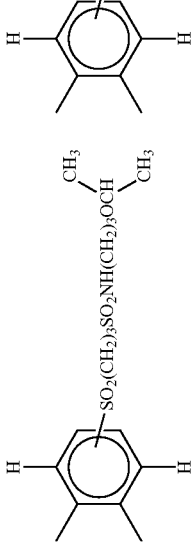 | 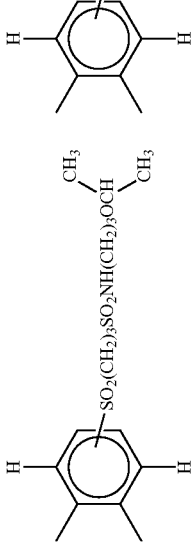 | 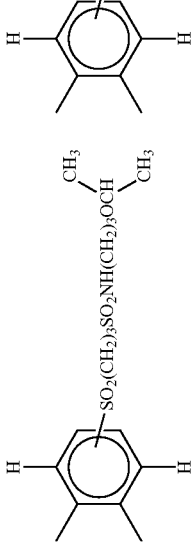 | 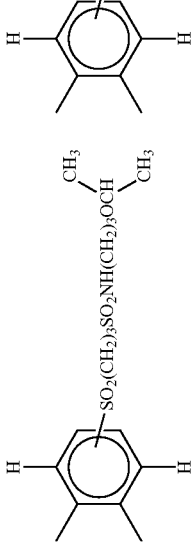 |

TABLE 4

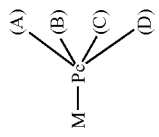

In the table, specific examples of respective combinations of (A), (B), (C) and (D) may be each independently in random order.

| Compound | M | (A) | (B) | (C) | (D) |
|---|---|---|---|---|---|
| 116 | Cu | phenyl with CH3 and SO2NH(CH2)3OCH(CH3)2 | phenyl with CH3 and SO2NH(CH2)3OCH(CH3)2 | phenyl with CH3 and SO2NH(CH2)3OCH(CH3)2 | pyridine |
| 117 | Cu | phenyl with CH3 and SO2NH(CH2)3OCH(CH3)2 | phenyl with CH3 and SO2NH(CH2)3OCH(CH3)2 | phenyl with CH3 and SO2NH(CH2)3OCH(CH3)2 | pyridine |
| 118 | Cu | phenyl with CH3 and SO2NH(CH2)3OCH(CH3)2 | phenyl with CH3 and SO2NH(CH2)3OCH(CH3)2 | phenyl with CH3 and SO2NH(CH2)3OCH(CH3)2 | pyrazine |

TABLE 4-continued
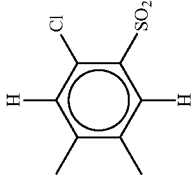
In the table, specific examples of respective combinations of (A), (B), (C) and (D) may be each independently in random order.
| Compound | M | (A) | (B) | (C) | (D) |
|---|---|---|---|---|---|
| 119 | Cu |  | 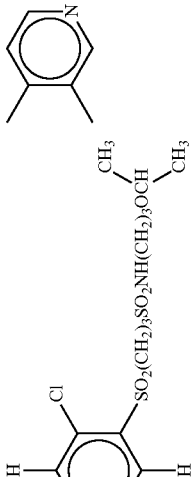 |  | 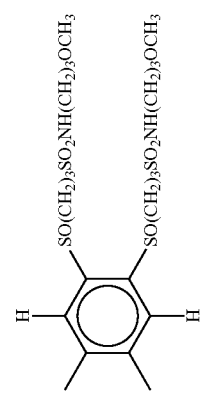 |
| 120 | Cu | 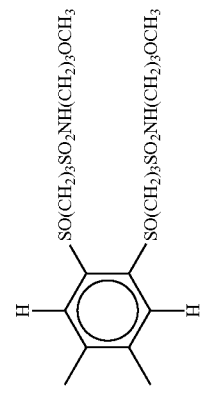 | 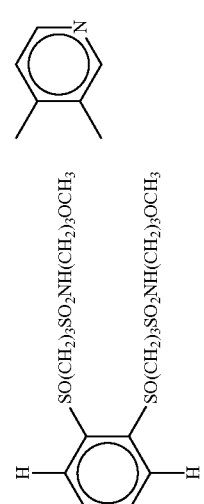 |  | |

TABLE 5
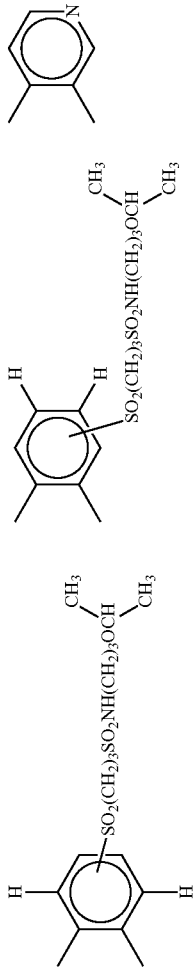
In the table, specific examples of respective combinations of (A), (B), (C) and (D) may be each independently in random order.
| Compound | M | (A) | (B) | (C) | (D) |
|---|---|---|---|---|---|
| 121 | Cu |  | 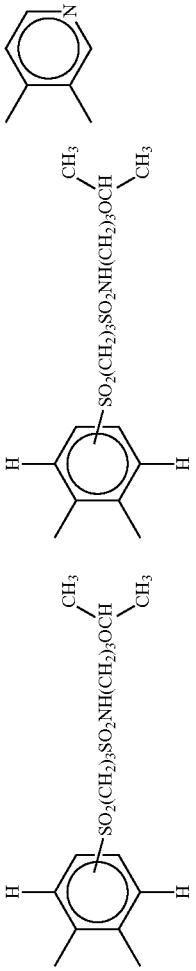 | 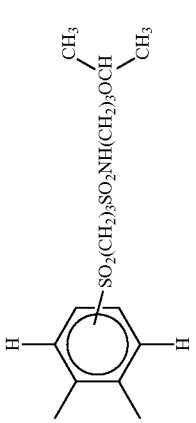 | 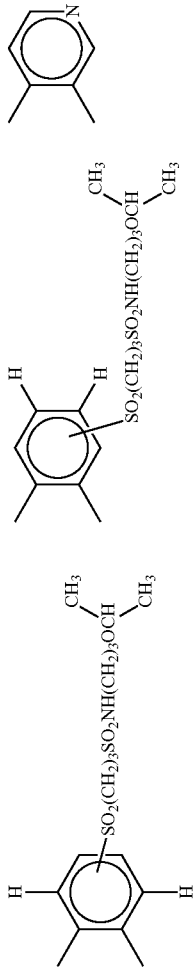 |
| 122 | Ni |  | 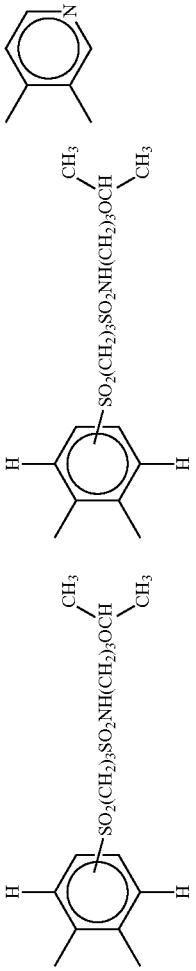 | 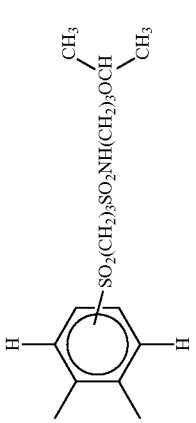 | 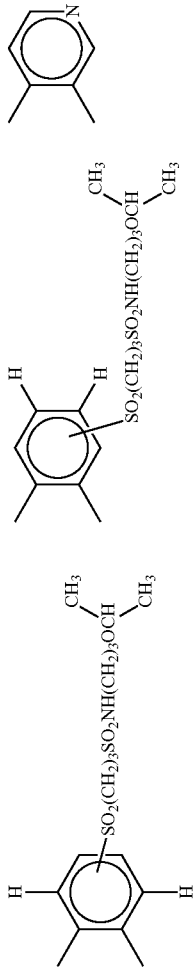 |
| 123 | Zn |  | 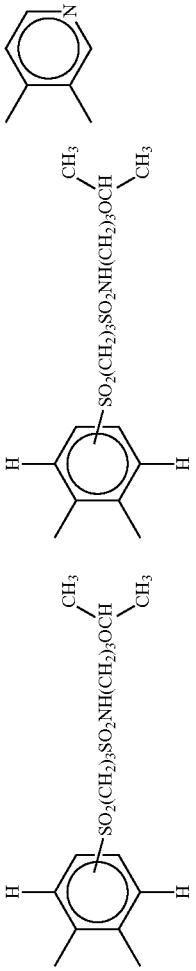 | 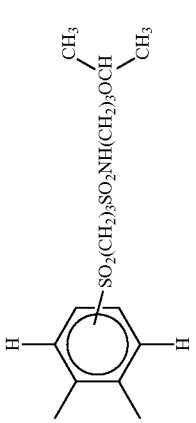 | |

TABLE 5-continued $$M-Pc \begin{matrix} (A) \\ (B) \\ (C) \\ (D) \end{matrix}$$

In the table, specific examples of respective combinations of (A), (B), (C) and (D) may be each independently in random order.

| Compound | M | (A) | (B) | (C) | (D) |
|---|---|---|---|---|---|
| 124 | Pb | xylyl-SO$_2$(CH$_2$)$_3$SO$_2$NH(CH$_2$)$_3$OCH(CH$_3$)OCH$_3$ | xylyl-SO$_2$(CH$_2$)$_3$SO$_2$NH(CH$_2$)$_3$OCH(CH$_3$)OCH$_3$ | xylyl-SO$_2$(CH$_2$)$_3$SO$_2$NH(CH$_2$)$_3$OCH(CH$_3$)OCH$_3$ | 3,4-dimethylpyridyl |
| 125 | Cu | xylyl-SO$_2$(CH$_2$)$_3$SO$_2$NH(CH$_2$)$_3$OCH(CH$_3$)OCH$_3$ | xylyl-SO$_2$(CH$_2$)$_3$SO$_2$NH(CH$_2$)$_3$OCH(CH$_3$)OCH$_3$ | xylyl-SO$_2$NH(CH$_2$)$_3$OCH(CH$_3$)OCH$_3$ | 3,4-dimethylpyridyl |

Conventionally, the phthalocyanine compounds have been used as mixtures of isomers different in introduction site of a specific substituent (in some cases, the number of substituents introduced). The compounds of the invention (compounds represented by the general formulae (1) to (III): phthalocyanine compounds of a specific structure in which s specific number of specific substituents have been selectively introduced to specific sites) are novel compounds of a specific structure, conventionally not recognized separately. The performances resulting from the specific structure are very useful as in an ink jet dye imparted with high performances and the dye synthesizing intermediate.

More specifically, as the uses of the phthalocyanine compound (mixture) of the invention, mention may be made of materials for forming images, particularly, color images. Specifically, mention may be made of recording materials for ink jet recording (ink), and in addition, heat sensitive transfer type recording materials, pressure sensitive recording materials, recording materials using an electrophotographic system, transfer type silver halide light-sensitive materials, printing inks, recording pens, and the like. Preferably, mention may be made of recording materials for ink jet recording (ink), heat sensitive transfer type recording materials, and recording materials using an electrophotographic system. Further preferably, mention may be made of recording materials for ink jet recording (ink). Whereas, the compounds are also applicable to color filters for use in solid-state image pickup devices such as LCDs and CCDs described in U.S. Pat. No. 4,808,501, JP-A-6-35182, and the like, and dyeing solutions for dyeing various fibers. The phthalocyanine compounds of the invention are usable by having been adjusted in physical properties such as solubility, dispersibility, thermal transfer property suitable for the intended use by substituents. Further, the coloring matters in the invention are also usable in dissolved state, in emulsion dispersed state, and further in solid dispersion state according to the system used.

[Ink Jet Recording Ink]

Then, the ink jet recording ink of the invention will be described.

The ink jet recording ink of the invention can be manufactured by dissolving and/or dispersing the phthalocyanine compound (mixture) in an oleophilic medium (medium) or an aqueous medium (medium). It is preferably an ink manufactured by directly adding the phthalocyanine compound (mixture), or adding an emulsified dispersion of the phthalocyanine compound (mixture) in an aqueous medium. The aqueous medium preferably contains an organic solvent and a surfactant.

If required, other additives may be contained in such a range not to impair the effects of the invention. Examples of other additives may include known additives such as an anti-drying agent (wetting agent), an antifading agent, an emulsion stabilizer, a penetration accelerator, a UV absorber, an antiseptic agent, an antifungal agent, a pH adjuster, a surface tension regulator, an antifoaming agent, a viscosity modifier, a dispersant, a dispersion stabilizer, a rust inhibitor, and a chelating agent. These various additives may be preferably added in the aqueous medium. Alternatively, after preparation of a dye dispersion, they may be added to the dispersion, or they may be added to an oil phase or a water phase for the preparation of a dye dispersion.

The anti-drying agent is preferably used for the purpose of preventing an ink jet outlet from being clogged with the ink due to drying.

As the anti-drying agents, water soluble organic solvents having a lower vapor pressure than that of water are preferred. Specific examples thereof may include polyhydric alcohols typified by ethylene glycol, propylene glycol, diethylene glycol, polyethylene glycol, thiodiglycol, dithiodiglycol, 2-methyl-1,3-propanediol, 1,2,6-hexanetriol, an acetylene glycol derivative, glycerin, and trimethylolpropane; lower alkyl ethers of polyhydric alcohols such as ethylene glycol monomethyl (or ethyl) ether, diethylene glycol monomethyl (or ethyl) ether, and triethylene glycol monomethyl (or butyl) ether, heterocyclic rings such as 2-pyrrolidone, N-methyl-2-pyrrolidone, 1,3-dimethyl-2-imidazolidinone, and N-ethylmorpholine; sulfur-containing compounds such as sulfolane, dimethyl sulfoxide, and 3-sulfolene; multifunctional compounds such as diacetone alcohol and diethanolamine; and urea derivatives. Out of these, polyhydric alcohols such as glycerin and diethylene glycol are more preferred. Further, the foregoing anti-drying agents may be used alone, or in combination of two or more thereof. The anti-drying agents are preferably contained in an ink in an amount of 10 to 50 weight %.

The penetration accelerator is preferably used for the purpose of allowing an ink jet ink to penetrate paper better. The penetration accelerators usable include alcohols such as ethanol, isopropanol, butanol, di(tri)ethylene glycol monobutyl ether, and 1,2-hexanediol, sodium laurylsulfate, sodium oleate, nonionic surfactants, and the like. These generally produce the sufficient effect when contained in an ink in an amount of 5 to 30 weight %, and are preferably added in an amount within such a range that no blur of printing and no print through occur.

The UV absorber is used for the purpose of improving the storage stability of an image. The UV absorbers usable are benzotriazole type compounds described in JP-A-58-185677, JP-A-61-190537, JP-A-2-782, JP-A-5-197075, and JP-A-9-34057, and the like, benzophenone type compounds described in JP-A-46-2784 and JP-A-5-194483, U.S. Pat. No. 3,214,463, and the like, cinnamic acid type compounds described in JP-B-48-30492 and JP-B-56-21141, JP-A-10-88106, and the like, triazine type compounds described in JP-A-4-298503, JP-A-8-53427, JP-A-8-239368, and JP-A-10-182621, JP-T-8-501291, and the like, and the compounds described in Research Disclosure, No. 24239, and the compounds typified, by stilbene type and benzoxazole type compounds, which absorb ultraviolet rays to emit fluorescence, so-called fluorescent brightening agents.

The antifading agent is used for the purpose of improving the storage stability of an image. The antifading agents usable are various organic and metal complex antifading agents. The organic antifading agents include hydroquinones, alkoxyphenols, dialkoxyphenols, phenols, anilines, amines, indans, chromans, alkoxyanilines, heterocyclic rings, and the like. Metal complexes include nickel complexes, zinc complexes, and the like. More specifically, the compounds described in patents cited in Research Disclosure, No. 17643, Items VII-I to J, ibid., No. 15162, ibid., No. 18716, page 650, left-side column, ibid., No. 36544, page 527, ibid., No. 307105, page 872, and ibid., No. 15162, and the compounds contained in the general formulae and compound examples of typical compounds described in JP-A No. 62-215272, pages 127 to 137 can be used.

The antifungal agents for use in the invention may include sodium dehydroacetate, sodium benzoate, sodium pyridinethione-1-oxide, ethyl p-hydroxybenzoate, and 1,2-benzisothiazolin-3-one, and salts thereof. These are preferably used in an ink each in an amount of 0.02 to 1.00 weight %

The pH adjusters usable are neutralizers (organic bases and inorganic alkalis). The pH adjuster is preferably added so that the ink jet recording ink has a pH of 6 to 10, and more preferably added so as to achieve a pH of 7 to 10 for the purpose of improving the storage stability of the ink jet recording ink.

Preferred examples of the surfactants may include: anionic surfactants such as fatty acid salts, alkyl sulfuric acid ester salts, alkyl benzenesulfonic acid salts, alkyl naphthalenesulfonic acid salts, dialkyl sulfosuccinic acid salts, alkyl phosphoric acid ester salts, naphthalenesulfonic acid formalin condensate, and polyoxyethylenealkylsulfuric acid ester salts; and nonionic surfactants such as polyoxyethylenealkyl ether, polyoxyethylenealkyl allyl ether, polyoxyethylene fatty acid esters, sorbitan fatty acid esters, polyoxyethylenesorbitan fatty acid esters, polyoxyethylenealkylamine, glycerin fatty acid esters, and oxyethyleneoxypropylene block copolymers. Whereas, SURFYNOLS (Air Products & Chemicals Co.), which is an acetylene type polyoxyethylene oxide surfactant, is also preferably used. Still further, amine oxide type amphoteric surfactants such as N,N-dimethyl-N-alkylamine oxide, and the like are also preferred. The ones described as surfactants in JP-A-59-157636 pp. (37)–(38), and Research Disclosure No. 308119 (1989) may also be used.

The surface tension regulators include the nonionic, cationic, or anionic surfactants. Incidentally, the surface tension of the ink jet ink of the invention is preferably 25 to 70 mN/m, and further preferably 25 to 60 mN/m. Whereas, the viscosity of the ink jet recording ink of the invention is preferably 30 mPa·s or less. It is further more preferably regulated to 20 mPa·s or less.

As the antifoaming agents, fluorine type and silicone type compounds, chelating agents typified by EDTA, and the like may also be used, if required.

When the phthalocyanine compound of the invention is dispersed in an aqueous medium, preferably, as described in respective publications of JP-A-11-286637, JP-A-2001-240763 (Japanese Patent Application No. 2000-78491), JP-A-2001-262039 (Japanese Patent Application No. 2000-80259), JP-A-2001-247788 (Japanese Patent Application No. 2000-62370), and the like, colored fine particles containing a coloring matter and an oil soluble polymer are dispersed in an aqueous medium, or as in respective specifications of JP-A-2001-262018 (Japanese Patent Application No. 2000-78454), JP-A-2001-240763 (Japanese Patent Application No. 2000-78491), JP-A-2001-335734 (JP-A-2000-203856), and JP-A-2000-203857, the compound of the invention dissolved in a high boiling point organic solvent is dispersed in an aqueous medium. As the specific method for dispersing the compound of the invention in an aqueous medium, the oil soluble polymer to be used, the high boiling point organic solvent, additives, and the amount of the materials used, those described in the foregoing patent publications and the like may be preferably used. Alternatively, the phthalocyanine compound may also be dispersed in the form of fine particles still in solid form. For dispersion, a dispersant or a surfactant is usable. As the dispersing devices, there can be used a simple stirrer or impeller stirring system, an in-line stirring system, a mill system (such as a colloid mill, a ball mill, a sand mill, an attritor, a roll mill, or an agitator mill), an ultrasonic system, a high-pressure emulsifying and dispersing system (high-pressure homogenizer; as specific commercially available devices, Gaulin Homogenizer, Microfluidizer, DeBEE2000, and the like). The details of the method for preparing the ink jet recording ink are described in, other than the foregoing patents, respective publications of JP-A-5-148436, JP-A-5-295312, JP-A-7-97541, JP-A-782515, JP-A-7-118584, JP-A-11-286637, JP-A-2001-2271003 (Japanese Patent Application No. 2000-87539), which is usable for the preparation of the ink jet recording ink of the invention.

As the aqueous medium, a mixture containing water as a main component, and if desired, containing a water-miscible organic solvent added is preferably used. Examples of the water-miscible organic solvent may include alcohols (e.g., methanol, ethanol, propanol, isopropanol, butanol, isobutanol, sec-butanol, t-butanol, pentanol, hexanol, cyclohexanol, and benzylalcohol), polyhydric alcohols (e.g., ethylene glycol, diethylene glycol, triethylene glycol, polyethylene glycol, propylene glycol, dipropylene glycol, polypropylene glycol, butylene glycol, hexanediol, pentanediol, glycerin, hexanetriol, and thiodiglycol), glycol derivatives (e.g., ethylene glycol monomethyl ether, ethylene glycol monoethyl ether, ethylene glycol monobutyl ether, diethylene glycol monomethyl ether, diethylene glycol monobutyl ether, propylene glycol monomethyl ether, propylene glycol monobutyl ether, dipropylene glycol monomethyl ether, triethylene glycol monomethyl ether, ethylene glycol diacetate, ethylene glycol monoethyl ether acetate, triethylene glycol monomethyl ether, triethylene glycol monoethyl ether, and ethylene glycol monophenyl ether), amines (e.g., ethanolamine, diethanolamine, triethanolamine, N-methyldiethanolamine N-ethyldiethanolamine, morpholine, N-ethylmorpholine, ethylenediamine, diethylenetriamine, triethylenetetramine, polyethyleneimine, and tetramethylpropylenediamine), and other polar solvents (e.g., formamide, N,N-dimethylformamide, N,N-dimethylacetamide, dimethyl sulfoxide, sulfolane, 2-pyrrolidone, N-methyl-2-pyrolidone, N-vinyl-2-pyrolidone, 2-oxazolidone, 1,3-dimethyl-2-imidazolidinone, acetonitrile, and acetone). Incidentally, these water-miscible organic solvents may also be used in combination of two or more thereof.

The phthalocyanine compound is preferably contained in an amount of 0.2 part by weight or more and 10 parts by weight or less per 100 parts by weight of the ink jet recording ink of the invention. Further, for the ink jet recording ink of the invention, other coloring matters may be used in combination with the phthalocyanine compound. When two or more coloring matters are used in combination, the total amount of the coloring matters contained preferably falls within the foregoing range.

The ink jet recording ink of the invention preferably has a viscosity of 30 mPa·s or less. Whereas, it preferably has a surface tension of 25 mN/m or more and 70 mN/m or less. The viscosity and the surface tension can be adjusted by the addition of various additives such as a viscosity modifier, a surface tension regulator, a specific resistance modifier, a film modifier, an UV absorber, an antioxidant, an antifading agent, an antifungal agent, a rust inhibitor, a dispersant, and a surfactant.

The ink jet recording ink of the invention may be used not only for the formation of a monochrome image but also for the formation of a full color image. For the formation of a full color image, a magenta tone ink, a cyan tone ink, and a yellow tone ink may be used. Further, for adjusting the tone, a black tone ink may further be used.

As the applicable yellow dyes, any ones are usable. Mention may be made of aryl or heteryl azo dyes having, for example, phenols, naphthols, anilines, heterocyclic rings such as pyrazolone and pyridone or open-chain active methylene compounds as coupling components (which are hereinafter referred to as coupler component); azomethine dyes having, for example, open-chain active methylene compounds as coupler components; methine dyes such as benzylidene dyes and monomethineoxonol dyes; and quinone dyes such as naphthoquinone dyes and anthraquinone dyes. As dye species other than these dyes, mention may be made of quinophthalone dyes, nitro-nitroso dyes, acridine dyes, and acridinone dyes.

As the applicable magenta dyes, any ones are usable. Mention may be made of aryl or heteryl azo dyes having, for example, phenols, naphthols or anilines as coupler components; azomethine dyes having, for examples, pyrazolones or pyrazolotriazoles as coupler components; methine dyes such as arylidene dyes, styryl dyes, merocyanine dyes, cyanine dyes, and oxonol dyes; carbonium dyes such as diphenylmethane dyes, triphenylmethane dyes, and xanthene dyes; quinone dyes such as naphthoquinone, anthraquinone, and anthrapyridone; and condensation polycyclic dyes such as dioxazine dyes.

As the applicable cyan dyes, any ones are usable. Mention may be made of aryl or heteryl azo dyes having, for example, phenols, naphthols or anilines as coupler components; azomethine dyes having, for example, phenols, naphthols or heterocyclic rings such as pyrrolotriazole as coupler components; polymethine dyes such as cyanine dyes, oxonol dyes, and merocyanine dyes; carbonium dyes such as diphenylmethane dyes, triphenylmethane dyes, and xanthene dyes; phthalocyanine dyes containing the phthalocyanine compounds of the invention; anthraquinone dyes; and indigo-thioindigo dyes.

The respective dyes may be the ones which do not show each color of yellow, magenta, and cyan until parts of chromophores dissociate. In that case, counter cations may be inorganic cations such as alkali metal ions and ammonium ions, or organic cations such as pyridinium ions and quaternary ammonium salt ions, or further, polymer cations having them as partial structures.

As the applicable black materials, mention may be made of, other than disazo, trisazo, and tetraazo dyes, a dispersion of carbon black.

[Ink Jet Recording Method]

The ink jet recording method of the invention provides energy to the ink jet recording ink, and forms images on known image-receiving materials, i.e., ordinary paper and resin-coated paper, such as ink jet-specific paper, film, electrophotographic common paper, cloth, glass, metal, ceramic, or the like described in JP-A-8-169172, JP-A-8-27693, JP-A-2-276670, JP-A-7-276789, JP-A-9-323475, JP-A-62-238783, JP-A-10-153989, JP-A-10-217473, JP-A-10-235995, JP-A-10-337947, JP-A-10-217597, and JP-A-10-337947.

For the formation of an image, polymer fine particle dispersion (which is also referred to as a polymer latex) may be used in combination for the purpose of imparting the glossiness or the water resistance, or improving the weather resistance. The timing of imparting the polymer latex to the image-receiving material may be before or after imparting the colorant or simultaneously with it. Accordingly, the receiving site may be in the image-receiving paper or in the ink. Alternatively, the polymer latex may be used in the form of a liquid material of the polymer latex alone. Specifically, the methods described in respective specifications of Japanese Patent Application Nos. 2000-363090, 2000-315231, 2000-354380, 2000-343944, 2000-268952, 2000-299465, and 2000-297365, and the like may be preferably used.

Below, a description will be given to the recording paper and the recording film for use in ink jet printing with the ink of the invention.

Each usable support in the recording paper and the recording film is the one manufactured in the following manner, or the like. To the material composed of chemical pulp such as LBKP or NBKP, mechanical pulp such as GP, PGW, RMP, TMP, CTMP, CMP or CGP, waste paper pulp such as DIP, or the like, if required, additives such as a conventionally known pigment, a binder, a sizing agent, a fixing agent, a cationic agent, and a paper strength reinforcing agent are mixed, and the mixture is subjected to various devices such as a Fourdrinier paper machine and a cylinder paper machine. Other than these supports, the support may be any of synthetic paper and plastic film sheet. Desirably, the thickness of the support is 10 to 250 μm, and the weighing capacity thereof is 10 to 250 g/m$^2$.

An image receiving layer and a back coating layer may also be provided on the support as it is. Alternatively, after size press coating, or after formation of an anchor coating layer, with starch, polyvinyl alcohol or the like, the image receiving layer and the back coating layer may also be provided thereon. Further, the support may be subjected to flattening processing by a calender device such as a machine calender, a TG calender or a soft calender. As the supports in the invention, a sheet of paper having surfaces each laminated with a film of polyolefin (e.g., polyethylene, polystyrene, polyethylene terephthalate, or polybutene, or copolymers thereof), and a plastic film are more preferably used.

Preferably, a white pigment (e.g., titanium oxide or zinc oxide) or a tinting dye (e.g., cobalt blue, ultramarine, or neodymium oxide) is added into the polyolefin.

The ink receptive layer to be provided on the support contains a pigment and an aqueous binder. Preferred pigments are white pigments. Examples of the white pigment may include white inorganic pigments such as calcium carbonate, kaolin, talc, clay, diatomaceous earth, synthetic amorphous silica, aluminum silicate, magnesium silicate, calcium silicate, aluminum hydroxide, alumina, lithopone, zeolite, barium sulfate, calcium sulfate, titanium dioxide, zinc sulfide, and zinc carbonate, and organic pigments such as styrene-based pigments, acrylic pigments, urea resins, and melamine resins. The white pigment contained in the ink receptive layer is preferably a porous inorganic pigment, and particularly preferably, a white inorganic pigment fine particles of synthetic amorphous silica having a large pore area. As the synthetic amorphous silica, either silicic anhydride obtained by a dry production process and silicic hydrate obtained by a wet production process can be used. However, particularly, silicic hydrate is desirably used.

Examples of the aqueous binder to be contained in the ink receptive layer may include water soluble high polymers such as polyvinyl alcohol, silanol-modified polyvinyl alcohol, starch, cationic starch, casein, gelatin, carboxymethylcellulose, hydroxyethylcellulose, polyvinylpyrrolidone, polyalkylene oxide, and polyalkylene oxide derivatives, and water-dispersible high polymers such as styrenebutadiene latex and acrylic emulsion. These aqueous binders may be used alone, or in combination of two or more thereof. In the invention, out of these, particularly, polyvinyl alcohol, and silanol-modified polyvinyl alcohol are preferred in terms of the adhesion to the pigment and the peel resistance of the ink receptive layer.

The image receiving layer may contain, other than the pigment and the aqueous binder, a mordant, a waterproof agent, a light resistance improver, a surfactant, and other additives.

It is preferable that the mordant to be added into the image receiving layer is immobilized. To this end, a polymer mordant is preferably used.

The polymer mordant is described in each publication of: JP-A-48-28325, JP-A-54-74430, JP-A-54-124726, JP-A-55-22766, JP-A-55-142339, JP-A-60-23850, JP-A-60-23851, JP-A-60-23852, JP-A-60-23853, JP-A-60-57836, JP-A-60-60643, JP-A-60-118834. JP-A-60-122940, JP-A-60-122941, JP-A-60-122942, JP-A-60-235134, and JP-A-1-161236, and U.S. Pat. Nos. 2,484,430, 2,548,564, 3,148,061, 3,309,690, 4,115,124, 4,124,386, 4,193,800, 4,273,853, 4,282,305, and 4,450,224. The image receiving materials containing the polymer mordants described on pages 212 to 215 in JP-A-1-161236 are particularly preferred. When the polymer mordants described in the same publication are used, it is possible to obtain an image of excellent image quality, and to improve the light resistance of the image.

The waterproof agent is effective for making the image resistant to water. A cationic resin is particularly desirable as the waterproof agent. Examples of the cationic resin may include polyamidepolyamine epichlorohydrin, polyethyleneimine, polyaminesulfone, dimethyldiallylammonium chloride polymer, and cationic polyacrylamide, and colloidal silica. Out of these cation resins, particularly, polyamidepolyamine epichlorohydrin is preferred. The content of the cationic resin is preferably 1 to 15 weight %, and particularly preferably 3 to 10 weight % based on the total solid content of the ink receptive layer.

As the light resistance improvers, mention may be made of zinc sulfate, zing oxide, hindered amine type antioxidant, benzotriazole type UV absorber such as benzophenone, and the like. Out of these, zinc sulfate is in particular preferred.

The surfactant functions as a coating aid, a releasing aid, a slipping aid, or an antistatic agent. The surfactants are described in each publication of JP-A-62-173463 and JP-A-62-183457. Organofluoro compounds may also be used in place of the surfactant. The organofluoro compounds are preferably hydrophobic. Examples of the organofluoro compounds may include a fluorine-based surfactants, oily fluorine-based compounds (e.g., fluorine oil), and solid fluorine compound resins (e.g., tetrafluoroethylene resin). The organofluoro compounds are described in each publication of JP-B-57-9053 (column 8 to 17), and JP-A-61-20994 and JP-A-62-135826. As other additives to be added to the ink receptive layer, mention may be made of a pigment dispersing agent, a thickener, an antifoaming agent, dyes, a fluorescent brightening agent, an antiseptic agent, a pH adjuster, a matting agent, a hardening agent, and the like. Incidentally, the ink receptive layer may be formed in either one layer or two layers.

It is also possible to provide a back coating layer on the recording paper or the recording film. As the components which can be added to the layer, mention may be made of a white pigment, an aqueous binder, and other components. Examples of the white pigment to be contained in the back coating layer may include: white inorganic pigments such as light calcium carbonate, heavy calcium carbonate, kaolin, talc, calcium sulfate, barium sulfate, titanium dioxide, zinc oxide, zinc sulfide, zinc carbonate, satin white, aluminum silicate, diatomaceous earth, calcium silicate, magnesium silicate, synthetic amorphous silica, colloidal silica, colloidal alumina, pseudoboehmite, aluminum hydroxide, alumina, lithopone, zeolite, hydrated halloysite, magnesium carbonate, and magnesium hydroxide, organic pigments such as styrene-based plastic pigments, acrylic plastic pigments, polyethylene, micro capsules, urea resins, and melamine resins.

Examples of the aqueous binder to be contained in the back coating layer may include: water soluble high polymers such as styrene/maleate copolymer, styrene/acrylate copolymer, polyvinyl alcohol, silanol-modified polyvinyl alcohol, starch, cationic starch, casein, gelatin, carboxymethylcellulose, hydroxyethylcellulose, and polyvinylpyrrolidone, and water-dispersible high polymers such as styrenebutadiene latexes and acrylic emulsions. As other components to be contained in the back coating layer, mention may be made of an antifoaming agent, a foam inhibitor, dyes, a fluorescent brightening agent, an antiseptic agent, a waterproof agent, and the like.

A polymer latex may also be added to the constituent layers (including the back layers) of the ink jet recording paper and the recording film. The polymer latex is used for the purpose of improvements of the film properties such as dimensional stabilization, curl prevention, adhesion prevention, and film crack prevention. The polymer latex is described in each publication of JP-A-62-245258, JP-A-62-136648, and JP-A-62-110066. Addition of the polymer latex having a low glass transition temperature (of 40° C. or less) to a mordant-containing layer can prevent the layer from cracking or curing. Further, addition of the polymer latex having a high glass transition temperature to the back coating layer can also prevent curling thereof.

As for the ink of the invention, the ink jet recording method has no restriction. The ink of the invention can be used in known methods such as: a charge control method in which the ink is ejected by utilizing electrostatic attraction; a drop on demand method (pressure pulse method) utilizing the vibration pressure of a piezoelectric element; an acoustic ink jet method in which electric signals are converted to acoustic beams, the beams are applied to the ink, and the emission pressure is utilized to eject the ink; and a thermal ink method in which the ink is heated to form bubbles, and the generated pressure is utilized. The ink jet recording methods include: a method in which a large number of drops of a low-density ink referred to as a photo ink are ejected in small volumes; a method in which the image quality is improved by using a plurality of inks having substantially the same hue and different densities; and a method utilizing a colorless, transparent ink.

[Color Toner]

The color toner composition of the invention is characterized by including at least one of the phthalocyanine compound represented by the general formula (I). The color toner composition of the invention contains, other than the coloring matter in the invention, if required, a binder resin for color toner, a release agent, a charge control agent, and a carrier.

The phthalocyanine compound of the invention is preferably contained in an amount of 0.1 part by weight or more (preferably, 15 parts by weight or less), and in particular preferably contained in an amount of 1.0 part by weight or more (preferably, 10 parts by weight or less) per 100 parts by weight of the color toner composition of the invention.

As the color toner binder resins for introducing the phthalocyanine compound of the invention, all the commonly used binders are usable. For example, styrene type resins, acrylic type resins, styrene/acrylic type resins, and polyester resins may be mentioned.

To the toner, inorganic fine powder and organic fine particles may be externally added for the purposes of improving the fluidity, controlling the electric charge, or other purposes. Silica fine particles or titania fine particles, surface-treated with a coupling agent containing an alkyl group are preferably used. Incidentally, these preferably have a number average primary particle diameter of 10 to 500 nm, and preferably are added into the toner in an amount of 0.1 to 20 weight %.

All the release agents which have been conventionally used may be used as the release agents. Specifically, mention may be made of olefins such as low-molecular-weight polypropylenes, low-molecular-weight polyethylenes, and ethylene/propylene copolymers, microcrystalline wax, carnauba wax, sazol wax, paraffin wax, and the like. These are each preferably added into the toner composition in an amount of 1 to 5 weight %.

The charge control agent may be added, if required. They are preferably achromatic from the viewpoint of color-forming property. Examples thereof may include those having a quaternary ammonium salt structure or a calyx allene structure.

The carrier to be used may be either an uncoated carrier composed of only magnetic material particles of iron, ferrite, or the like, or a resin-coated carrier obtained by coating the surface of a magnetic material particle with a resin or the like. The average particle diameter of this carrier is preferably 30 to 150 μm in terms of volume average particle diameter.

The method for forming an image, to which the color toner composition of the invention is applicable, has nor particular restriction. Examples of the method include a method in which color images are repeatedly formed on a photosensitive material, and then transferred, to form an image; and a method in which images formed on a photosensitive material are transferred to an intermediate transfer material and the like sequentially, then a color image is formed on the intermediate transfer material or the like, and then is transferred to an image-forming member such as paper, to form a color image.

[Color Filter]

As the methods for forming a color filter, there is a method in which first, a pattern is formed with a photoresist, followed by dyeing, or a method in which as disclosed in JP-A-4-163552, JP-A-4-128703, and JP-A-4-175753, a pattern is formed by a photoresist to which a coloring matter has been added.

As the methods used for introducing the phthalocyanine compound of the invention into a color filter, any of these methods may be used. As the preferred method, mention may be made of the following method for forming a color filter as described in JP-A-4-175753 or JP-A-6-35182. A positive type resist composition containing a thermosetting resin, a quinonediazido compound, a crosslinking agent, a colorant, and a solvent is coated on a substrate. Then, it is exposed to light through a mask to develop the exposed area. As a result, a positive type resist pattern is formed, and the entire surface of the positive type resist pattern is exposed to light. Then, the positive type resist pattern after exposure is hardened. Alternatively, according to an ordinary method, a black matrix is formed, which can provide a R, G, and B primary color type or Y, M, and C complementary color type color filter.

As the thermosetting resin, quinonediazido compound, crosslinking agent, and solvent, for use in this step, and the amounts thereof, those described in the foregoing patents may be preferably used.

EXAMPLES

Below, examples of the invention will be described. However, the invention is by no way limited to these examples.

Example 1

(Manufacturing of Ink Solution A)

5.3 g of a phthalocyanine compound (specific compound example 102; oil soluble dye) and 7.04 g of sodium dioctylsulfosuccinate were dissolved in 4.22 g of the following high boiling point organic solvent (s-2), 5.63 g of the following high boiling point organic solvent (s-II), and 50 ml of ethyl acetate at 70° C. To the resulting solution, 500 ml of deionized water was added with stirring by means of a magnetic stirrer. Thus, an O/W type coarse particle dispersion was manufactured. Then, the coarse particle dispersion was allowed to pass through a Microfluidizer (MICROFLUIDEX INC.) under a pressure of 60 MPa (600 bar) five times to be finely reduced in size of particles. Further, the resulting emulsion was subjected to desolvation by means of a rotary evaporator until there was no odor of ethyl acetate. To the microfine emulsion of a hydrophobic dye thus obtained, 140 g of diethylene glycol, 50 g of glycerin, 7 g of SURFYNOL 465 (Air Products & Chemical Co.), and 900 ml added to manufacture an ink solution A,

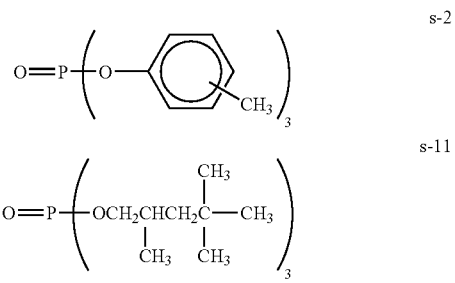

(Manufacturing of Ink Solutions B to G)

Ink solutions B to E were manufactured in the same manner as with the ink solution A, except that the phthalocyanine compound of the ink A (specific compound example 102; oil soluble dye) was changed to the phthalocyanine compound (oil soluble dye) of Table-6 below. Whereas, comparative ink solutions 101, 102, 103, and 104 were manufactured in the same manner as the comparative ink solutions, except that the dye of the ink solution A was changed to the following comparative compounds.

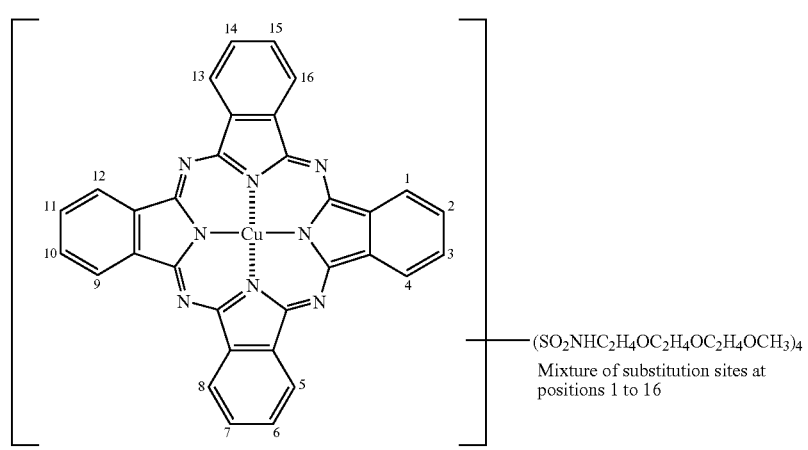

Comparative Compound 1

Comparative Compound 2
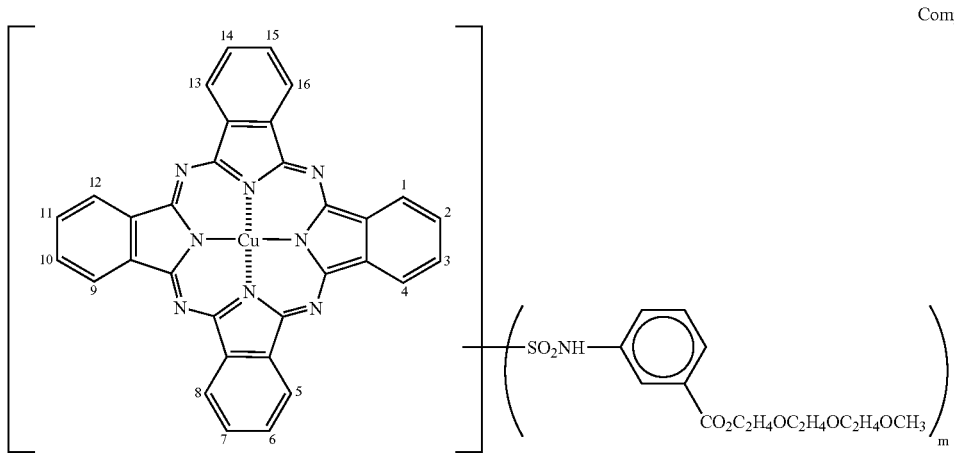
Mixture of substitution sites at positions 1 to 16
Mixture of the numbers of substitutions m = 4, 3 and 2
Comparative Compound 3
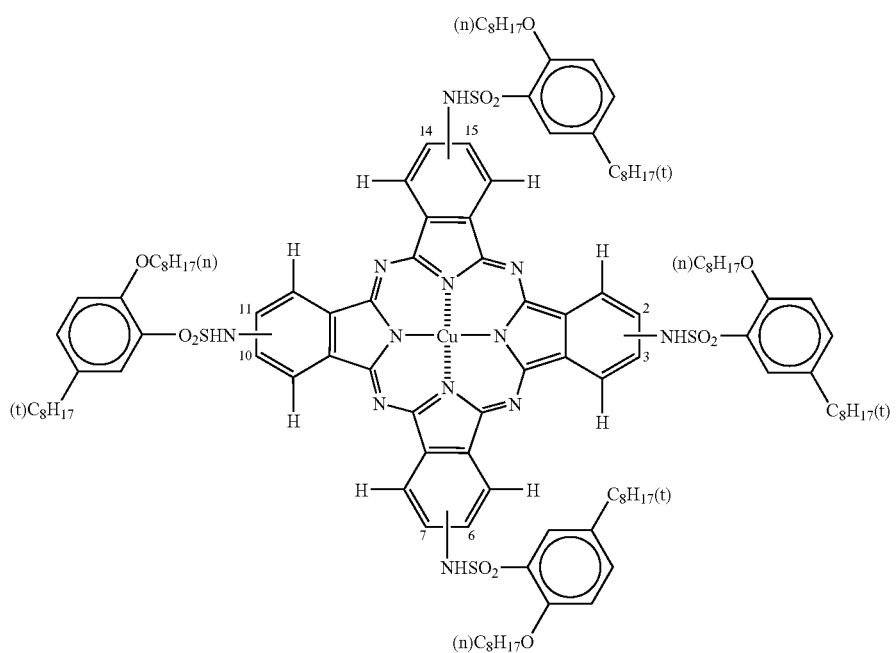

-continued

Comparative Compound 4

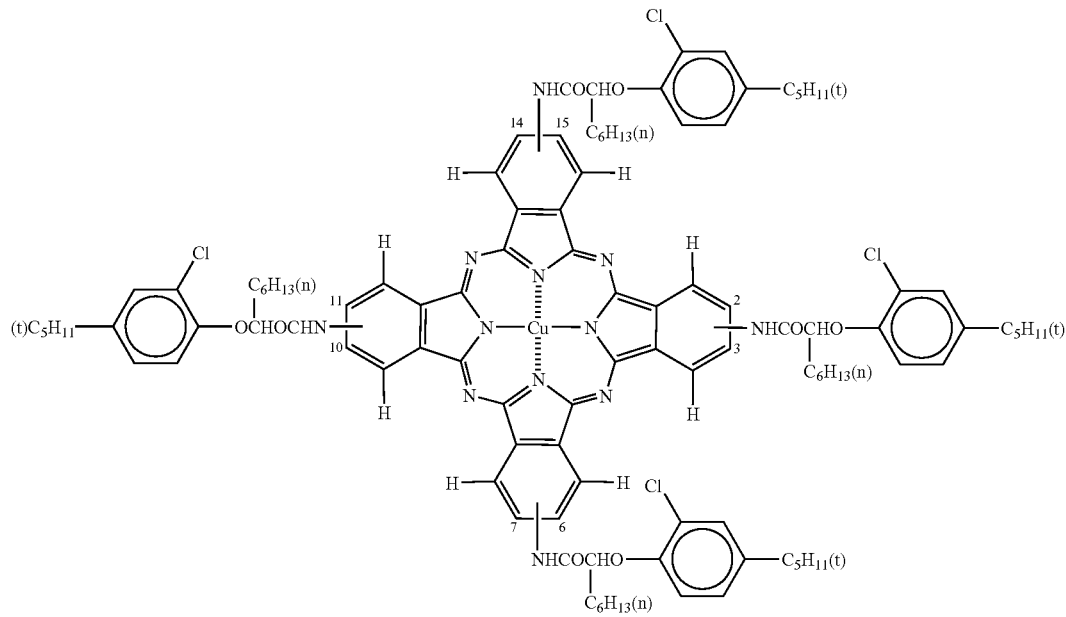

When the dye was changed, it was used so that the amount thereof was equimolar to the amount of the ink solution A.

(Image Recording and Evaluation)

For the ink jet inks of the foregoing respective ink solutions A to E, and the comparative ink solutions 101 to 103, the following evaluations were carried out. The results are shown in Table-6.

Incidentally, in Table-6, for "tone", "paper dependency", "water resistance", and "light resistance", each ink jet ink was evaluated after recording of images on photo paper sheets <gloss> manufactured by EPSON Corp (KA450PSK, EPSON) by an ink jet printer (manufactured by Epson Corp; PM-700C).

<Tone>

The image formed on the photo paper sheet <gloss> was subjected to colorimetry of the reflection spectrum at intervals of 10 nm in the region of 390 to 730 nm by means of GRETAG SPM100-II (manufactured by GRETAG Co.), and from this, a* and b* were calculated based on the CIE (International Commission on Illumination) L*a*b* color space system.

By comparing with the standard cyan color sample of JAPAN Colour (a color when solid batches of galley proofs from respective companies, provided from 21 companies as members of the Japan Federation of Printing Industries were subjected to colorimetry, and the printing was performed using Japan Color Ink SF-90 and Japan Paper so as to give a smallest color difference (ΔE) from the average value) of JNC (aggregate corporation Japan Printing Machinery Association), the preferred tone as clean was defined as follows:

L*: in the range of 53.6±0.2,

○: a* (in the range of −35.9±6) and b* (in the range of −50.4±6)

Δ: only one of a* and b* (in the preferred region defined with ○ above)

x: neither a* nor b* (both out of the preferred region defined with ○ above)

Herein, the colorimetry value of the color sample of the standard cyan of JAPAN Color used as a reference will be shown below.

L*: 53.6±0.2,
a*: −37.4±0.2,
b*: −50.2±0.2,
ΔE: 0.4 (0.1 to 0.7)

(1) Printer: MAN Roland R-704, ink: JAPAN Color SF-90, paper: TOKUHISHI ART
(2) Colorimetry: Colorimeter: X-rite 938, 0/45, D50, 2 deg., black backing <Paper Dependency>

The image formed on the photo paper sheet <gloss>, and the image separately formed on professional photo paper PR101 (manufactured by CANON Co.; QB JPRA4) were compared in terms of the tone. The case where the difference between both the images was small was rated as A (good), and the case where the difference between both the images was large was rated as B (bad). Thus, rating on a scale of two levels was conducted.

<Water Resistance>

The photo paper sheet <gloss> having an image formed thereon was dried at room temperature for 1 hour, then dipped in deionized water for 10 seconds, and naturally dried at room temperature. The blurring was observed. The case of no blurring was rated as A; the case of slight blurring, as B; and the case of much blurring, as C. Thus, rating on a scale of three levels was conducted.

<Light Resistance>

The photo paper sheet <gloss> having an image formed thereon was irradiated with xenon light (85000 lx) by means of a weather meter (Atlas C. 165) for 14 days. Then, the image densities before and after xenon irradiation were measured by means of a reflection densitometer (X-Rite 310TR), and evaluation was carried out based on the coloring matter residual ratio. Incidentally, the measurements were carried out at 3 points with reflection densities of 1, 1.5, and 2.0.

The case where the coloring matter residual ratios at all densities were 70% or more was rated as A. The case where the ratios at one or two points were less than 70% was rated as B. The case where the ratios at all the densities were less than 70% was rated as C. Thus, rating on a scale of three levels was conducted.

<Dark Heat Storability>

The photo paper sheet <gloss> having an image formed thereon was stored for 14 days under the conditions of 80° C. and 15% RH. Then, the image densities before and after storage were measured by means of a reflection densitometer (X-Rite 310TR), and evaluation was carried out based on the coloring matter residual ratio. Incidentally, the coloring matter residual ratio was evaluated at 3 points with reflection densities of 1, 1.5, and 2.0. The case where the coloring matter residual ratios at all densities were 90% or more was rated as A. The case where the ratios at two points were less than 90% was rated as B. The case where the ratios at all the densities were less than 90% was rated as C.

<Ozone Gas Resistance>

A Siemens-type ozonizer was applied with an a.c. voltage of 5 kV, while passing a dry air through the double glass tube thereof. By the use of this, a box was set to be at an ozone gas concentration of 0.5±0.1 ppm, and at room temperature and to be dark place. In the box, the photo gloss paper having an image formed thereon was allowed to stand for 14 days. Then, the image densities before and after standing under an ozone gas were measured by means of a reflection densitometer (X-Rite 310TR), and evaluation was carried out based on the coloring matter residual ratio. Incidentally, the measurements were carried out at 3 points with reflection densities of 1, 1.5, and 2.0. The ozone gas concentration in the box was set by means of an ozone gas monitor (model: OZG-EM-01) manufactured by APPLICS.

The case where the coloring matter residual ratios at all densities were 70% or more was rated as A. The case where the ratios at one or two points were less than 70% was rated as B. The case where the ratios at all the densities were less than 70% was rated as C. Thus, rating was conducted on a scale of three levels.

<Ink Storage Stability>

Each ink was evaluated for the solubility of the dye by conducting tests of the storage stability and the clogging recovery performance. The ink storage stability was evaluated in the following manner. The ink solution was placed in a vessel made of polyethylene, and stored under the condition of −15° C. for 24 hours, and subsequently, stored under the condition of 60° C. for 24 hours; a cycle of −15° C. (24 hr.)→60° C. (24 hr.) was repeatedly performed 10 times. Thus, whether insoluble matters had been deposited or not was checked before and after storage, and rating was conducted according to the following criteria.

[Criteria]

The recording solutions after the elapsed time were each placed in a test tube, and visually observed.

○: No insoluble matter is observed at all.
Δ: A small amount of insoluble matters are observed.
x: The insoluble matters are noticeable, resulting in an impractical level.

<Clogging Recovery Performance>

A printer was charged with each ink solution, and allowed to stand with no cap thereon in an environment of 40° C. for one month. After standing, based on the number of cleaning operations required for all the nozzles to normally eject the ink solution, rating was conducted according to the following criteria.

[Criteria]

A; Recover through two or less cycles of cleaning
B; Recover through 3 to 5 cycles of cleaning
C; Recover through 6 or more cycles of cleaning
NG; No recovery <Solubility>

To 5 ml of ethyl acetate, a dye was mixed, and the mixture was stirred by means of a magnetic stirrer for 30 minutes. After stirring, whether the dye had been completely dissolved in a solvent or not was checked. The rating was defined as follows, and conducted on a scale of three levels.

0.5 g of dye is completely dissolved in 5 ml of a solvent . . . ○
0.5 g of dye is not completely dissolved, but 0.1 g of dye is completely dissolved in 5 ml of a solvent . . . Δ
0.1 g of dye is not completely dissolved in 5 ml of a solvent . . . x <Oxidation Potential: Eox>

The values of oxidation potential of the phthalocyanine dyes (mixtures) used in Examples and Comparative Examples were determined under the following conditions.

The phthalocyanine dye was weighed in an amount in the range of 10.0 mg to 25.0 mg. The measurements were carried out by a direct current polarography with 5 ml to 15 ml of N,N-dimethylformamide containing tetrapropyl ammonium perchlorate in an amount of 0.1 mol·dm$^{-3}$ as a supporting electrolyte (the concentration of the dye being about 0.001 mol·dm−3). For the polarograph, a carbon (GC) electrode was used as a working electrode, and a rotary platinum electrode was used as the counter electrode. The oxidation wave obtained by sweeping on the oxidation side (electropositive side) is approximated with a straight line. The midpoint of the intersection with the peak value and the intersection with the residual current value was taken as the value of the oxidation potential (vs SCE).

The case of the oxidation potential of 1.0 or more was rated as ○, and the case of less than that, as x.

TABLE 6

| Ink solution | Dye | Tone | Paper dependency | Water resistance | Light resistance | Dark heat storability | Ozone gas resistance | Ink storage stability | Solubility | Clogging recovery performance | Oxidation potential (Eox) |
|---|---|---|---|---|---|---|---|---|---|---|---|
| Ink solution A | 101 | ○ | A | A | A | A | A | ○ | ○ | A | ○ |
| Ink solution B | 102 | ○ | A | A | A | A | A | ○ | ○ | A | ○ |
| Ink solution C | 103 | ○ | A | A | A | A | A | ○ | ○ | A | ○ |
| Ink solution D | 107 | ○ | A | A | A | A | A | ○ | ○ | A | ○ |

TABLE 6-continued

| Ink solution | Dye | Tone | Paper dependency | Water resistance | Light resistance | Dark heat storability | Ozone gas resistance | Ink storage stability | Solubility | Clogging recovery performance | Oxidation potential (Eox) |
|---|---|---|---|---|---|---|---|---|---|---|---|
| Ink solution E | 112 | ○ | A | A | A | A | A | ○ | ○ | A | ○ |
| Ink solution 101 | Comparative Compound 1 | Δ | B | B | B | B | C | ○ | ○ | A | x |
| Ink solution 102 | Comparative Compound 2 | Δ | B | B | B | B | C | Δ | Δ | B | x |
| Ink solution 103 | Comparative Compound 3 | Δ | B | B | C | B | C | x | x | C | x |
| Ink solution 104 | Comparative Compound 4 | Δ | B | B | C | B | C | x | x | C | x |

As apparent from Table-6, the ink for ink jet of the invention is excellent in tone, small in paper dependency, and excellent in water resistance and light resistance, and ozone resistance. Particularly, it is apparent that the ink is excellent in image storability such as light resistance or ozone resistance.

Further, it has been shown that, the ink solution according to the preparation method of the invention causes no degradation of printing due to the precipitation of the low solubility components even when exposed to severe storage conditions, and that it is excellent in ink storage stability and clogging recovery performance.

Example 2

With the same cartridge as that manufactured in Example 1, printing was performed on the ink jet paper photo gloss paper EX manufactured by Fuji Photo Film Co., Ltd., by means of the same machine as that in Example 1, to carry out the same evaluations as in Example 1. As a result, the same results as those in Example 1 were obtained.

Example 3

The same ink as that manufactured in Example 1 was charged in a cartridge of an ink jet printer BJ-F850 (manufactured by CANON Corp.). Then, images were printed on the photo gloss paper GP-301 from the same company by means of the same machine, to carry out the same evaluations as in Example 1. As a result, the same results as those in Example 1 were obtained.

Example 4

As for each of the phthalocyanine compounds of the invention (compounds 101, 102, 103 and 107), 3 parts by weight of the compound and 100 parts by weight of a resin for toner [styrene-acrylic acid ester copolymer; trade name HIMER TB-1000F (manufactured by Sanyo Chemical Industries, Ltd.)] were mixed and ground in a ball mill. Then, the mixture was heated to 150° C. to be molten and mixed. After cooling, the mixture was coarsely crushed using a hammer mill, and then, finely pulverized by a pulverizer of an air jet system. The resulting particles were further classified, and 1 to 20 micro was selected, resulting in a toner. To 10 parts of the toner, 900 parts of carrier iron powder (trade name EFV250/400; manufactured by Nippon Iron Powder) was uniformly mixed, resulting in a developer. Similarly, each sample of the comparative coloring agents shown in Table-7 were prepared in the same manner, except that the dye was used in an amount of 3 parts by weight, and the pigment was used in an amount of 6 parts by weight. By the use of these developers, copying was carried out by means of a dry ordinary paper electrophotographic copier [trade name NP-5000; manufactured by CANON, Corp.].

Reflected images (images on paper) and transmitted images (OHP images) were formed on paper and OHP sheets, respectively, with a developer using a color toner containing the compounds of the invention in accordance with the foregoing image forming method, and the evaluation tests were conducted in the following manner. Incidentally, the amount of the toner deposited was evaluated in the range of 0.7±0.05 (mg/cm$^2$).

The resulting images were evaluated for the hue and the light fastness property.

The hue was visually rated on a scale of three levels of best, good, and bad. The evaluation results are shown in Table-7. In Table-7, ○ denotes that the hue is best; Δ denotes that the hue is good; and x denotes that the hue is bad.

The light fastness property was evaluated in the following manner. The image density Ci immediately after recording was measured, and thereafter, the image was irradiated with xenon light (85,000 lux) by means of a weather meter (Atlas C. 165), for 5 days. Then, the image density Cf was measured again, and the coloring matter residual ratio ({Ci-Cf/Ci}×100%) was determined from the difference in image density between before and after xenon light irradiation. The image density was measured by means of a reflection densitometer (X-Rite 310TR). The results are shown in Table-7. In Table-7, the case where the coloring matter residual ratio was 90% or more is indicated with ○; less than 90 to 80%, Δ; and less than 80%, x.

The transparency of the OHP image was evaluated in the following manner. By means of a "330 model autographic spectrophotometer" manufactured by Hitachi Ltd., the visible spectral transmittance of the image was measured with the OHP sheet having no toner carried thereon as a reference. The spectral transmittance at 450 nm was determined, and taken as the scale for the transparency of the OHP sheet. The case of the spectral transmittance of 80% or more is indicated with ○; 70 to less than 80%, Δ; and less than 70%, x. The results up to this point are shown in Table-7.

TABLE 7

|  | Test compound No. | Hue | Light fastness property | Transparency |
|---|---|---|---|---|
| Invention | 101 | ○ | ○ | ○ |
| Invention | 102 | ○ | ○ | ○ |
| Invention | 103 | ○ | ○ | ○ |
| Invention | 107 | ○ | ○ | ○ |

TABLE 7-continued

| | | | | |
|---|---|---|---|---|
| Comparative Example 1 | Comparative dye 5 | Δ | Δ | Δ |
| Comparative Example 2 | Comparative dye 6 | Δ | Δ | Δ |
| Comparative Example 3 | C.I. Solvent Blue 38 | x | ○ | x |
| Comparative Example 4 | C.I. Solvent Blue 70 | x | ○ | x |

Comparative Dye 5

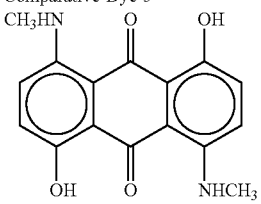

Comparative Dye 6

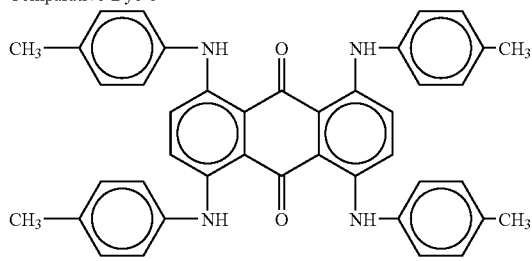

As apparent from Table-7, the phthalocyanine compounds of the invention are more excellent in light fastness property, also have a more vivid hue, and are higher in transparency as compared with the comparative dyes. Use of the color toner of the invention provides more faithful color reproduction and high OHP quality. For this reason, the color toner of the invention is suitable for use as a full color toner. Further, it is good in light resistance, which can provide images storable over a long period.

Example 5

<Method for Manufacturing Color Filter>

In this example, the results when the phthalocyanine compound has been applied to a color filter are shown. The color filter was manufactured in the following manner. Namely, onto a silicon wafer, a positive type resist composition containing a thermosetting resin, a quinonediazido compound, a crosslinking agent, a coloring matter, and a solvent was spin coated. The solvent was evaporated by heating, followed by exposure to light through a mask, to decompose the quinonediazido compound. If required, after heating, development was carried out to obtain a mosaic pattern. The exposure to light was carried out by means of an i-ray exposure stepper HITACHI LD-5010-i (NA=0.40) manufactured by Hitachi Ltd. Whereas, the developer used was SOPD or SOPD-B manufactured by Sumitomo Chemical Co., Ltd.

<Preparation of Positive Type Resist Composition>

3.4 parts by weight of a cresol novolak resin (polystyrene equivalent molecular weight 4300) resulting from a m-cresol/p-cresol/formaldehyde (reaction mole ratio=5/5/7.5) mixture, 1.8 parts by weight of o-naphthoquinonediazide-5-sulfonic acid ester (an average of two hydroxyl groups have been esterified) manufactured by using a phenol compound represented by the following formula:

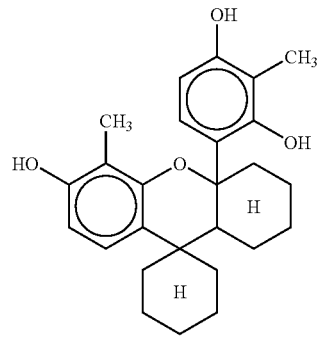

0.8 part by weight of hexamethoxymethylolated melamine, 20 parts by weight of ethyl lactate, and 1 part by weight of the phthalocyanine compound of the invention shown in Table 8 were mixed, resulting in a positive type resist composition.

<Preparation of Color Filter>

The resulting positive type resist composition was spin coated onto a silicon wafer. Then, the solvent was evaporated. The silicon wafer was exposed to light, and then heated at 100° C. Then, the exposed portion was removed b) the alkali development to obtain a positive type colored pattern having a 0.8-μm resolution. This was entirely exposed to light, and then, heated at 150° C. for 15 minutes, resulting in a cyan complementary color type color filter.

Comparative Example

In place of the cyan type phthalocyanine compound of the invention used in the examples, 1 part by weight of the following comparative dye 7 was mixed, resulting in a positive type resist composition. The resulting positive type resist composition was spin coated onto a silicon wafer. Then, the solvent was evaporated. The silicon wafer was exposed to light, and then subjected to alkali development, resulting in a positive type colored pattern having a 1-μm resolution. This was entirely exposed to light, and then, heated at 150° C. for 10 minutes, resulting in a magenta color filter.

<Evaluation>

The transmission spectrum of the resulting cyan color filter was measured, and the cutting on the short wavelength side or the long wavelength side of the spectrum important for color reproduction was relatively evaluated. ○ denotes good; Δ denotes somewhat acceptable level; and x, unacceptable level. Further, the filter was irradiated with xenon light (85000 1x) by means of a weather meter (Atlas C. 165) for 7 days. Then, the image densities before and after xenon irradiation were measured, and evaluation was carried out based on the coloring matter residual ratio.

TABLE 8

| | Dye/Pigment No. | Absorption characteristics | Light fastness property |
|---|---|---|---|
| Invention | 101 | ○ | 98% |
| Invention | 102 | ○ | 95% |
| Comparative Example | Comparative dye 7 | Δ | 18% |

TABLE 8-continued

Comparative Dye 7

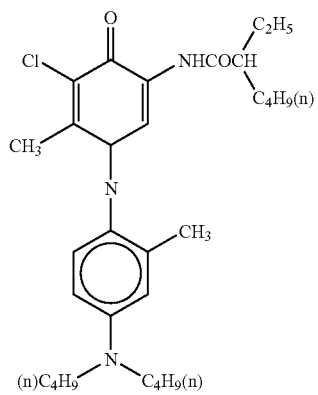

The phthalocyanine compound of the invention exhibits a sharper cutting on the short wavelength side or on the long wavelength side of the spectrum, and is excellent in color reproducibility as compared with Comparative Example.

Further, it has been shore that the phthalocyanine compound of the invention is superior in light fastness property to the comparative compound.

Example 6

The test of Example 7 was carried out by using the same operation as in Example 1, except that the testing method of Example 1 was changed to the following environmental test method. Namely, as the oxidizing gas resistance testing method in which the outdoor environment exposed to oxidizing gases such as car exhaust fumes and irradiation with solar light is simulated, by using an oxidation resistance testing method using a fluorescent light irradiation chamber at a relative humidity of 80% and a hydrogen peroxide concentration of 120 ppm described in H. Iwano et al; Journal of Imaging Science and Technology, Vol. 38, 140–142 (1944), a test was carried out. The test results were the same as the ozone gas resistance of Example 1.

Below, the method for synthesizing the phthalocyanine dye mixture of the invention will be described in details in examples. However, the invention is by no way limited to the examples.

The typical phthalocyanine compounds of the invention can be derived from, for example, the following synthesis route.

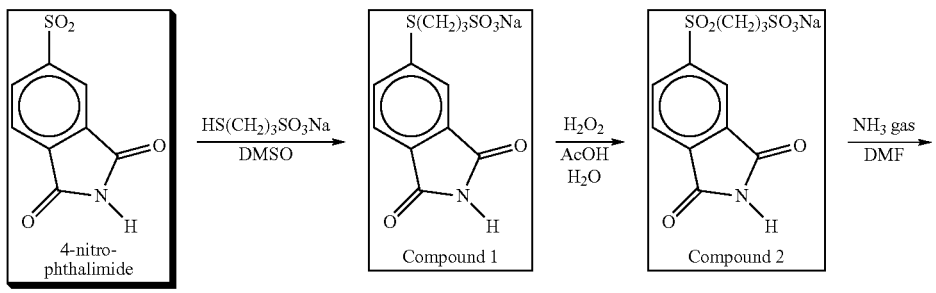

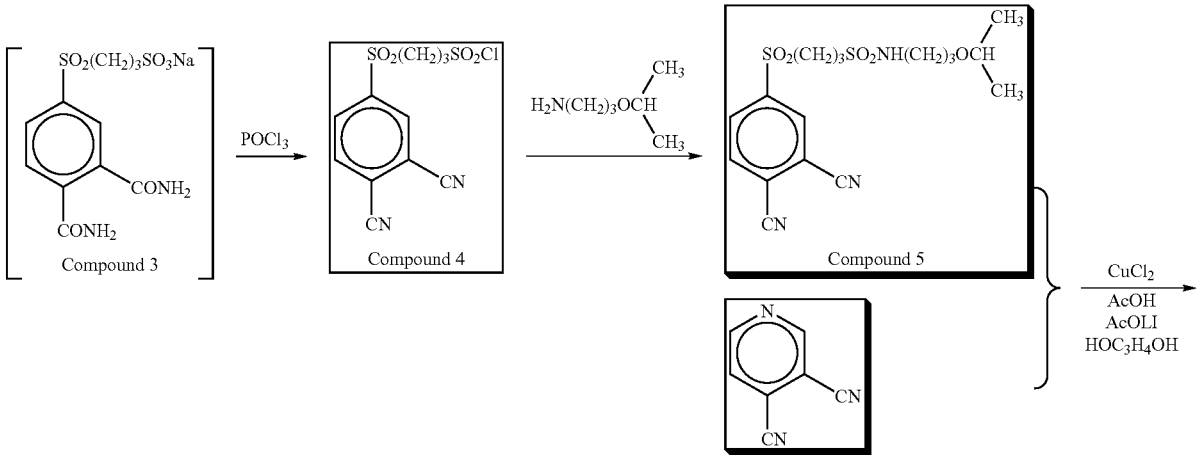

-continued

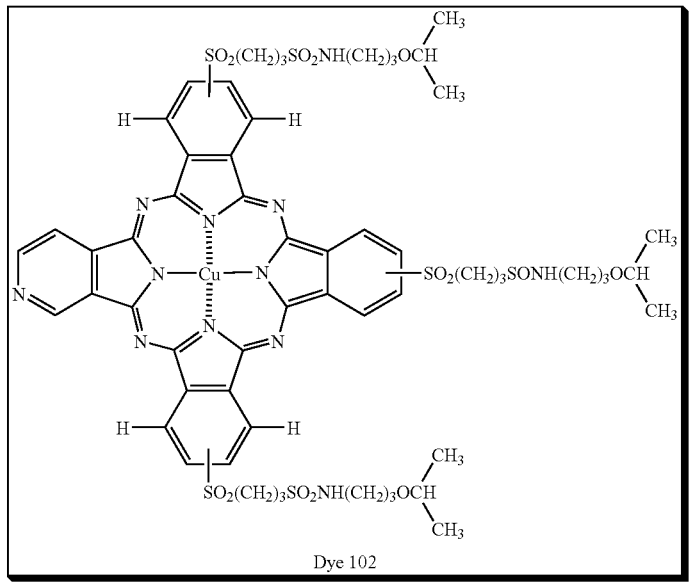

Dye 102

Example 7

Synthesis of Exemplified Compound 102

Synthetic Example 1

Synthesis of Compound 1

Under a nitrogen flow, 288.2 g of 4-nitrophthalimide (Tokyo Kasei Kogyo product) was dissolved in 1442 mL of DMSO (dimethyl sulfoxide) with stirring at an internal temperature of 20° C., to which 333 g of 3-mercaptopropane-sodium sulfonate (85%) was added. Subsequently, to the mixture being stirred at an internal temperature of 50° C., 173.8 g of sodium carbonate anhydride was gradually added. The reaction solution was heated with stirring up to 70° C., and stirred for 1 hour at the same temperature. After cooling down to 40° C., the reaction solution was filtered through a Nutsche. The filtrate was poured into 2885 mL of methanol for crystallization, followed by stirring at room temperature for 30 minutes. Further, 1442 mL of isopropanol was poured thereto, and cooled to an internal temperature of 10° C. with stirring. The precipitated coarse crystals were filtered through a Nutsche, washed with 962 mL of methanol, and dried, resulting in 503.4 g of coarse crystals of a compound 1.

$^1$H-NMR (DMSO-$d_6$), δ value TMS standard: 1.89 to 1.99 (2H, m); 2.51 to 2.65 (2H, t); 3.24 to 3.50 (2H, t); 7.64 to 7.76 (3H, m); 11.29 to 11.41 (1H, s)

Synthetic Example 2

Synthesis of Compound 2

485.0 g the compound 1 was added to a mixed solution of 48.5 mL of acetic acid and 1500 mL of $H_2o$ with stirring at an internal temperature of 25° C., to which 15 g of $Na_2WO_4.2H_2o$ was added. Then, the mixture was heated up to an internal temperature of 45° C. for dissolution. Subsequently, 374 mL of hydrogen peroxide water (30%) was gradually added dropwise with attention paid to heat generation. After stirring at an internal temperature of 50° C. for 60 minutes, an aqueous solution of 88.2 g/400 mL sodium sulfite was added dropwise to the reaction solution with an internal temperature of 50° C., and 532 mL of isopropanol was added dropwise at the same temperature. Then, after cooling down to 10° C., the solution was stirred subsequently at the same temperature for 30 minutes. Then, the precipitated crystals were filtered through a Nutsche, washed with 525 mL of isopropanol, and then dried, resulting in 462.6 g of a compound 2.

$^1$H-NMR (DMSO-$d_6$), δ value TMS standard: 1.25 to 1.89 (2H, m); 2.48 to 2.52(2H, t); 3.59 to 3.65 (2H, t); 8.04 to 8.11 (1H, d); 8.20 (1H, s) 8.29 to 8.33 (1H, d); 11.59 to 1.90 (1H, s)

Synthetic Example 3

Synthesis of Compound 3

300 g of the compound 2 was added to 900 mL of DMF (dimethylformamide) with stirring at an internal temperature of 20° C., into which an $NH_3$ gas was blown for 90 minutes. Subsequently, stirring was performed at the same temperature for 3 hours. Then, while stirring the reaction solution under reduced pressure (<400 mmHg) at an internal temperature of 20° C. or less, the dissolved residual $NH_3$ gas was distilled away. (Compound 2+$NH_3$→reaction solution of Compound 3)

Synthetic Example 4

Synthesis of Compound 4

To 600 mL of DMF (dimethylformamide), at an internal temperature of 5° C., 315.1 mL of $POCl_3$ was added dropwise with the internal temperature kept at 15° C. or less. Subsequently, into the $POCl_3$/DMF solution, the reaction solution of Synthetic Example 3 (Compound 2+$NH_3$→Compound 3) described above was added dropwise with the internal temperature kept at 10° C. or less. At an internal temperature of 17° C., stirring was subsequently performed for 1 hour. Then, to 4500 mL of $H_2o$, the reaction mixture was added dropwise with the internal temperature kept at 35° C. or less to crystallize a compound 4. Subsequently, at an internal temperature of 30° C., stirring was performed for 30 minutes. Then, the precipitated coarse crystals were filtered through a Nutsche, washed with 4200 mL of $H_2O$, and then, washed with 2700 mL of isopropanol, followed by air drying. As a result, 234.6 g of a compound was obtained. $^1$H-NMR (DMSO-$d_6$), δ value TMS standard: 1.81 to 1.91 (2H, m); 2.49 to 2.54 (2H, t); 3.62 to 3.74 (2H, t); 8.07 to 8.16 (1H, d); 8.36 to 8, 49 (1H, d); 8.66 to 8.67 (2H, s)

Synthetic Example 5

Synthesis of Compound 5

100 g of the compound 4 was added to and dissolved in 400 mL of acetonitrile at an internal temperature of 25° C. Then, at an internal temperature of 30° C., 70.4 g of isopropyloxy propylamine was added dropwise, and subsequently, stirring was performed at the same temperature for 1 hour. Then, at the internal temperature, 1200 mL of warm water (70° C.) was poured to the reaction solution. Thereafter, the internal temperature was increased up to 70° C., and stirring was performed at the same temperature for 1 hour. After slow cooling down to an internal temperature of 25° C. with stirring, the precipitated crystals were filtered through a Nutsche, washed with 1000 mL of water, and dried, resulting in 116.4 g of a compound 5. $^1$H-NMR (DMSO-$d_6$), δ value TMS standard: 1.06 to 1.08 (6H, d); 1.58 to 1.63 (2H, t); 1.91 to 1.94 (2H, m); 2.91 to 2.93 (2H, dd); 3.07 to 3.09 (2H, t); 3.33 to 3.38 (2H, m); 3.47 to 3.49 (1H, m); 3.63 to 3.68 (2H, t); 7.12 to 7.16 (1H, t); 8.36 to 8.40 (1H, d); 8.43 to 8.47 (1H, d); 8.68 to 8.70(1H, s)

Synthetic Example 6

Synthesis of Compound 102

24.81 g of the compound 5 and 2.58 g of 3,4-pyridinedicarbonitrile (Aldrich product) were dissolved in a mixed solution of 2.3 mL of acetic acid and 309.6 mL of diethylene glycol at an internal temperature of 70° C. Subsequently, at the same temperature, 2.69 g of cupric chloride (anhydride), and 5.28 g of lithium acetate were added, and the internal temperature was increased up to 100° C. At the same temperature, stirring was performed for 4 hours. Then, cooling was performed down to an internal temperature of 25° C., and 500 mL of 0.9 N hydrochloric acid was added dropwise for crystallization. Subsequently, at the same temperature, stirring was performed for 30 minutes. Then, the crystallized product was filtered, and washed with 1000 mL of water. Then, the product was dried at 70° C. overnight, resulting in 25.53 g of coarse crystals. The coarse crystals were dissolved in THF, and then, purified by methanol/$CH_2Cl_2$=1/10 (v/v): silica gel column chromatography, resulting in a compound 102. Solution absorption: λmax=597.3 nm, ε=32000(ethyl acetate).

In accordance with the present invention, (1) Various coloring compositions are provided which use a phthalocyanine compound of a specific structure as a colorant, and thereby have absorption characteristics excellent in color reproducibility, and have sufficient fastness properties to light, heat, humidity, and the active gases in the environment, such as an ink for printing of ink jet recording or the like, an ink sheet in a heat-sensitive recording material, a color toner for electrophotography, a color filter for use in displays such as LCD and PDPs, and image pickup devices such as CCDs.

(2) The coloring composition provides good long-term storage stability of an ink, and contains dissolved components with high solubility stability, does not cause clogging of the nozzle, and is excellent in rapid drying properties on a recording material;

(3) An ink jet recording ink and an ink jet recording method which use the coloring composition, and thereby can form an image having a good hue, and high fastness properties to light and the active gases in an environment, particularly, an ozone gas, are provided; and (4) A method for improving the ozone gas fading resistance of the image recorded product by utilizing the ink jet recording method is provided.

The entire disclosure of each and every foreign patent application from which the benefit of foreign priority has been claimed in the present application is incorporated herein by reference, as if fully set forth.

What is claimed is:

1. An ink comprising a phthalocyanine compound represented by formula (I):

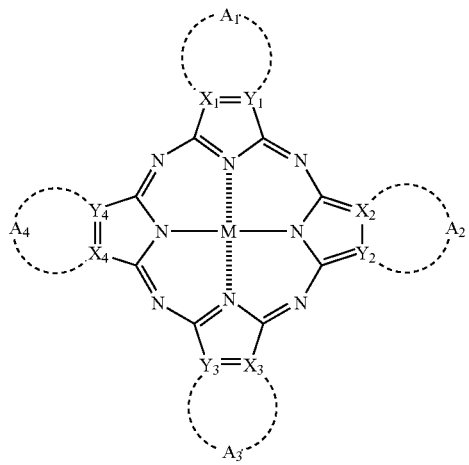

Formula (I)

where $X_1$ to $X_4$ and $Y_1$ to $Y_4$ each independently represents a carbon atom or a nitrogen atom;

$A_1$ to $A_4$ each independently represents an atomic group necessary for forming an aromatic ring or a heterocyclic ring with $X_1$ to $X_4$ and $Y_1$ to $Y_4$, with the proviso that all of four rings containing each of A, X and Y are not aromatic rings at the same time; whereas, when all of the four rings containing each of A, X and Y are pyridine rings at the same time, a pyridine ring in which any one of atoms adjacent to each of X and Y in the pyridine ring is a nitrogen atom is excluded; whereas, when all of the four rings containing each of A, X and Y are pyrazine rings at the same time, a pyrazine ring in which both of atoms adjacent to each of X and Y in the pyrazine ring are nitrogen atoms is excluded; whereas, $A_1$ to $A_4$ each may also have a substituent, with the proviso that at least one of $A_1$ to $A_4$ or at least one of the substituents of $A_1$ to $A_4$ has a substituent with two or more carbon atoms, and the total sum of carbon atoms of the substituents of $A_1$ to $A_4$ is 8 or more, and an ionic hydrophilic group is not contained in a molecule; and M represents a hydrogen atom, a metallic element, a metal oxide, a metal hydroxide or a metal halide.

2. The link according to claim 1, wherein the phthalocyanine compound represented by formula (I) is a phthalocyanine compound represented by formula (II):

Formula (II)

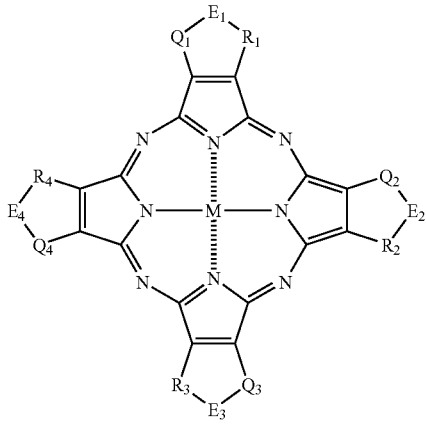

wherein $Q_1$ to $Q_4$ and $R_1$ to $R_4$ each independently represents a carbon atom, a nitrogen atom, a sulfur atom, an oxygen atom or a phosphorus atom;

$E_1$ to $E_4$ each independently represents an atomic group necessary for forming an aromatic ring or a heterocyclic ring which may further form a condensed ring with other rings with $Q_1$ to $Q_4$ and $R_1$ to $R_4$, with the proviso that all of four rings containing each of E, Q, and R are not aromatic rings at the same time; whereas, when all of the four rings are pyridine rings at the same time, a pyridine ring in which any one of each of Q and R is a nitrogen atom is excluded; whereas, a case where all of the four rings are pyrazine rings at the same time is excluded; whereas, $E_1$ to $E_4$ each may also have a substituent, with the proviso that at least one of $E_1$ to $E_4$ or at least one of the substituents of $E_1$ to $E_4$ has a substituent with two or more carbon atoms, and the total sum of carbon atoms of the substituents of $E_1$ to $E_4$ is 8 or more, and an ionic hydrophilic group is not contained in a molecule; and M is defined as the same as in formula (I).

3. The ink according to claim 1, wherein the phthalocyanine compound represented by formula (II) is a phthalocyanine compound represented by formula (III):

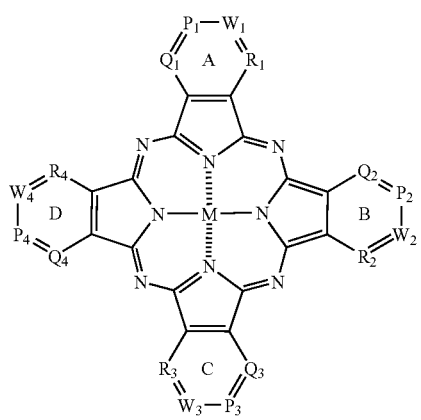

Formula (III)

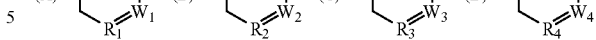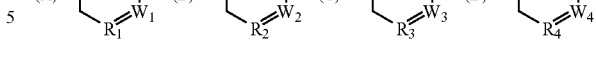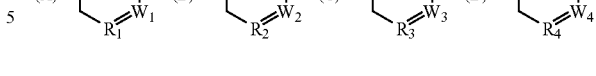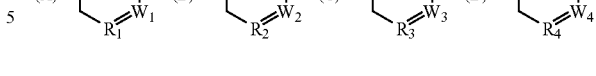

wherein $Q_1$ to $Q_4$, $P_1$ to $P_4$, $W_1$ to $W_4$ and $R_1$ to $R_4$ each independently represents (=C($J_1$)- and or —N=), (=C($J_2$)- and or —N=), (=C($J_3$)- and or —N=) or (=C($J_4$)- and or —N=);

$J_1$ to $J_4$ each independently represents a hydrogen atom or a substituent, with the proviso that all of rings {ring A: (A), ring B: (B), ring C: (C), and ring D: (D)} containing ($Q_1$, $P_1$, $W_1$ and $R_1$), ($Q_2$, $P_2$, $W_2$ and $R_2$), ($Q_3$, $P_3$, $W_3$ and $R_3$) and ($Q_4$, $P_4$, $W_4$ and $R_4$), respectively, are not aromatic rings at the same time; whereas, when all of the four rings are pyridine rings at the same time, a pyridine ring in which any one of $Q_1$ and $R_1$ is a nitrogen atom, a pyridine ring in which any one of $Q_2$ and $R_2$ is a nitrogen atom, a pyridine ring in which any one of $Q_3$ and $R_3$ is a nitrogen atom and a pyridine ring in which any one of $Q_4$ and $R_4$ is a nitrogen atom are excluded; whereas, a case where all of the four rings are pyrazine rings at the same time is excluded; whereas, when $J_1$ to $J_4$ each represents a substituent, $J_1$ to $J_4$ may each further have a substituent, with proviso that at least one of $J_3$ to $J_4$ or at least one of the substituents which $J_1$ to $J_4$ have, has a substituent with two or more carbon atoms, and the total sum of the carbon atoms of the substituents of $J_1$ to $J_4$ is 8 or more, and an ionic hydrophilic group is not contained in a molecule; and M is defined as the same as in formula (II).

4. The ink according to claim 3, wherein in the phthalocyanine compound represented by formula (III), at least one heterocyclic ring of the four rings (A), (B), (C) and (D) is represented by formula (IV):

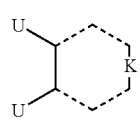

Formula (IV)

wherein K represents an atomic group necessary for forming a 6-membered nitrogen-containing heterocyclic ring; and U represents a bonding site with a phthalocyanine skeleton.

5. The ink according to claim 3, wherein in the phthalocyanine compound represented by formula (III), at least one of the four rings (A), (B), (C) and (D) represents an aromatic ring, and at least one of the four rings (A), (B), (C) and (D) represents a pyridine ring or a pyrazine ring.

6. The ink according to claim 5, wherein in the phthalocyanine compound represented by formula (III), the at least one aromatic ring of the four rings (A), (B), (C) and (D) is represented by formula (V):

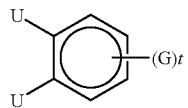

Formula (V)

wherein G represents —SO-$Z_1$, —$SO_2$-$Z_1$, —$SO_2NZ_1Z_2$, —$CONZ_1Z_2$, —$CO_2Z_1$, or —$COZ_1$;

t represents an integer of 0 to 4;

$Z_1$ may be the same or different, and represents a substituted or unsubstituted alkyl group having a total of 1 to 20 carbon atoms, a substituted or unsubstituted cycloalkyl group having a total of 3 to 20 carbon atoms, a substituted or unsubstituted alkenyl group having a total of 2 to 20 carbon atoms, a substituted or unsubstituted alkynyl group having a total of 2 to 12 carbon atoms, a substituted or unsubstituted aralkyl group having a total of 7 to 20 carbon atoms, a substituted or unsubstituted aryl group having a total of 6 to 20 carbon atoms, or a substituted or unsubstituted heterocyclic group having a total of 4 to 20 carbon atoms;

$Z_2$ may be the same or different, and represents a hydrogen atom, a substituted or unsubstituted alkyl group having a total of 1 to 20 carbon atoms, a substituted or unsubstituted cycloalkyl group having a total of 3 to 20 carbon atoms, a substituted or unsubstituted alkenyl group having a total of 2 to 20 carbon atoms, a substituted or unsubstituted alkynyl group having a total of 2 to 12 carbon atoms, a substituted or unsubstituted aralkyl group having a total of 7 to 20 carbon atoms, a substituted or unsubstituted aryl group having a total of 6 to 20 carbon atoms or a substituted or unsubstituted heterocyclic group having a total of 4 to 20 carbon atoms; and U represents a bonding site with a phthalocyanine skeleton.

7. The ink according to claim 5, wherein the at least one aromatic ring of the four rings (A), (B), (C) and (D) is represented by formula (V-1):

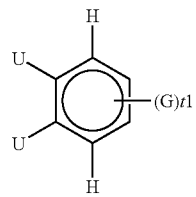

Formula (V-1)

wherein G is defined as the same as in formula (V);

t1 represents an integer of 0 to 2; and

U represents a bonding site with a phthalocyanine skeleton.

8. The ink according to claim 1, wherein the ink is an ink jet recording ink.

9. An ink jet recording method, which comprises forming an image with an ink jet recording ink according to claim 8 on an image-receiving material comprising a support and ail ink receptive layer containing white inorganic pigment particles.

10. An image forming method, which comprises forming an image by utilizing an ink according to claim 1.

\* \* \* \* \*